US011635010B1

(12) United States Patent
Sharp et al.

(10) Patent No.: US 11,635,010 B1
(45) Date of Patent: Apr. 25, 2023

(54) COMBUSTION TURBINE AND HEAT RECOVERY SYSTEM COMBINATION WITH SCR REACTOR ASSEMBLY, AND METHODS OF ASSEMBLING AND USING THE SAME

(71) Applicant: Umicore AG & Co. KG, Hanau-Wolfgang (DE)

(72) Inventors: Joseph Craig Sharp, Sugarland, TX (US); Wayne Spencer Jones, Houston, TX (US); Kim Hougaard Pedersen, Virum (DK)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 17/494,434

(22) Filed: Oct. 5, 2021

(51) Int. Cl.
*F01N 3/20* (2006.01)
*B01D 53/94* (2006.01)

(52) U.S. Cl.
CPC ........ *F01N 3/2066* (2013.01); *B01D 53/9418* (2013.01); *B01D 53/9436* (2013.01);
(Continued)

(58) Field of Classification Search
CPC .............. F01N 3/2066; F01N 2370/02; F01N 2570/14; F01N 2610/02; B01D 53/9418; B01D 53/9436
See application file for complete search history.

(56) References Cited

U.S. PATENT DOCUMENTS 6,141,956 A * 11/2000 Iijima .................. F22B 1/1815
60/39.5
6,550,250 B2   4/2003 Mikkelsen et al.
(Continued)

FOREIGN PATENT DOCUMENTS

CN   204140170 U   2/2015
EP   0 899 505 A2  3/1999
(Continued)

OTHER PUBLICATIONS

CB Energy Recovery. Modular HRSG Illustration. 1 Page.
Doyle, Brian W. Chapter 7, Controlling NOx Formation in Gas Turbines. 2009. https://www.apti-learn.net/lms/register/display_document.aspx?dID=39. 20 Pages.
Doyle, Brian W. Chapter 8, Back End NOx Controls. 2009. https://www.apti-learn.net/lms/register/display_document.aspx?dID=40. 23 Pages.
(Continued)

*Primary Examiner* — Brandon D Lee
(74) *Attorney, Agent, or Firm* — Smith, Gambrell & Russell, LLP

(57) ABSTRACT

An apparatus for reducing emissions that has a combustion turbine that feeds exhaust into a heat recovery steam generator (or HRSG) casing in which is positioned an emission reduction system featuring, in gas flow sequence, a first reducing reductant injector (RRI1), as in an ammonia injection grid, for providing reducing reductant, preferably ammonia, into turbine exhaust travelling within the HRSG, followed by a first SCR reactor positioned downstream of the first RRI1, followed by one of either (i) a turbulence generator (TG) as in a static mixer, or (ii) a second RRI2 as in a second ammonia injection grid, or (iii) an RRI2 with integrated TG supported on injectors of RRI2, then followed by a second SCR reactor. The emission reduction system preferably is free of a separate body oxidation catalyst or a separate body ammonia slip catalyst in an effort to utilize a limited volume within the HRSG. Methods of assembling and operating the ERS or T-H combination with ERS are also featured.

25 Claims, 17 Drawing Sheets

(52) U.S. Cl.
CPC ...... *F01N 2370/02* (2013.01); *F01N 2570/14* (2013.01); *F01N 2610/02* (2013.01)

(56) References Cited

U.S. PATENT DOCUMENTS

| | | | |
|---|---|---|---|
| 7,431,904 | B2 | 10/2008 | Høj et al. |
| 7,727,499 | B2 | 6/2010 | Liu et al. |
| 7,749,938 | B2 | 7/2010 | Obayashi et al. |
| 7,776,297 | B2 | 8/2010 | Cichanowicz |
| 8,017,084 | B1 | 9/2011 | Wirt et al. |
| 8,323,600 | B2 | 12/2012 | Thøgersen |
| 9,062,569 | B2 | 6/2015 | Kraemer |
| 9,399,927 | B2 | 7/2016 | McDeed et al. |
| 2005/0190643 | A1 | 9/2005 | Hansen |
| 2010/0024379 | A1* | 2/2010 | Sengar ............ F01N 3/208 60/39.5 |
| 2013/0104519 | A1 | 5/2013 | Zhang et al. |
| 2014/0096532 | A1 | 4/2014 | Broderick et al. |
| 2015/0096287 | A1* | 4/2015 | Qi ............ F01N 3/208 60/286 |
| 2015/0360178 | A1* | 12/2015 | Kalwei ............ B01J 29/7015 502/79 |
| 2015/0361850 | A1 | 12/2015 | Forwerck et al. |
| 2017/0058742 | A1 | 3/2017 | Zhang et al. |
| 2017/0175604 | A1 | 6/2017 | Devarakonda et al. |
| 2017/0259209 | A1 | 9/2017 | Nilsson et al. |
| 2018/0045097 | A1* | 2/2018 | Tang ............ B01J 29/76 |
| 2018/0058698 | A1 | 3/2018 | Czarnecki |
| 2019/0383174 | A1* | 12/2019 | Andersen ............ F01N 13/009 |
| 2020/0078732 | A1 | 3/2020 | Difrancesco et al. |
| 2021/0033005 | A1* | 2/2021 | Hirota ............ F01K 23/10 |
| 2022/0065162 | A1* | 3/2022 | Hunt ............ F01K 23/101 |

FOREIGN PATENT DOCUMENTS

| | | |
|---|---|---|
| WO | 2007/090692 A2 | 8/2007 |
| WO | 2014/124830 A1 | 8/2014 |
| WO | 2016/132138 A1 | 8/2016 |
| WO | 2017/220473 A1 | 12/2017 |
| WO | 2018/100368 A1 | 6/2018 |

OTHER PUBLICATIONS

Umicore Catalysts. SCR Catalyst Operation and Maintenance Manual Standard. 63 Pages, Jun. 6, 2020.

Rutherford, S, et al. SCR Catalyst Management. 2009 Energy Efficiency and Air Pollutant Control Conference. 14 Pages.

Ferco.com. SCR Experience. http://ferco.com/SCR-Experience.html. Accessed Apr. 7, 2021. 2 Pages.

US Department of Energy. Combined Heat and Power Technology Fact Sheet Series: Gas Turbines. Jul. 2016. 4 Pages.

Fcs.umicore.com. Gas Turbines | Fuel Cell & Stationary Catalysts. https://fcs.umicore.com/en/stationary-catalysts/power-generation/gas-turbines/. Accessed Apr. 2, 2021. 4 Pages.

Fcs.umicore.com. SCR DeNOx catalyst DNX-series | Fuel Cell & Stationary Catalysts. https://fcs.umicore.com/en/stationary-catalysts/dnx-gt-scr-denox-catalyst-dnx-series/. Accessed Apr. 7, 2021. 5 Pages.

CCJ-online.com. Welcome to Combined Cycle Journal. https://www.ccj-online.com/bg/companies/umicore-catalyst/. Accessed Apr. 7, 2021. 3 Pages.

Fcs.umicore.com. Stationary Emission Control Catalysis | Fuel Cell & Stationary Catalysts. https://fcs.umicore.com/en/stationary-catalysts/. Accessed Apr. 7, 2021. 8 Pages.

Umicore. Dual Function Catalyst: Reduction of Nox & CO /VOC for Power and Refinery Units. https://wcsawma.starchapter.com/images/downloads/Presentations_from_2020_Annual_Conference/2.5_david_taylor.pdf. Accessed Apr. 7, 2021. 16 Pages.

Powerengineeringint.com. Heat recovery steam generators design options and benefits—Power Engineering International. https://www.powerengineeringint.com/coal-fired/equipment-coal-fired/heat-recovery-steam-generators-design-options-and-benefits/. Accessed Apr. 7, 2021. 11 Pages.

International Search Report dated Jan. 10, 2023 for International Patent Application No. PCT/EP2022/075880 (5 pages).

Written Opinion of the International Searching Authority dated Jan. 10, 2023 for International Patent Application No. PCT/EP2022/075880 (8 pages).

* cited by examiner

COMBUSTION TURBINE AND HEAT RECOVERY SYSTEM COMBINATION WITH SCR REACTOR ASSEMBLY, AND METHODS OF ASSEMBLING AND USING THE SAME

FIELD OF INVENTION

The inventive subject matter is inclusive of a combination combustion turbine power generating apparatus and heat recovery system, as in a heat recovery steam generator ("HRSG"), wherein the exhaust of the combustion turbine, that is travelling through the heat recovery system (e.g., HRSG), is treated by an emission reduction system that comprises a reducing reagent (as in ammonia) feed and a receiving SCR reactor assembly. The invention further relates to the emission reduction system specially designed for use in the combination combustion turbine power generating apparatus and heat recovery system, and methods of using and assembling each.

BACKGROUND OF THE INVENTION

Global demand for power continues to increase and, accordingly, the global production of power using fossil and renewable fuels continues to increase to feed this increasing demand. However, combusting these fuels produces emissions, which leads to air pollution when released into the atmosphere. This contribution to air pollution may lead to environmental concerns, such as smog, fine particulate, and ozone. More stringent pollution requirements and regulations are being imposed in an attempt to reduce the production of air pollution. Thus, reducing emissions, such as NOx, would benefit the environment while being commercially advantageous as well.

In an effort to help satisfy the global demand for power in an efficient manner there has been developed a combination of a combustion (gas driven) turbine generator apparatus and a heat recovery system ("T-H combination").

A T-H combination features a combustion turbine engine that typically operates by drawing air into a compressor to increase the gas pressure. A fuel, often a hydrocarbon fuel such as natural gas, is combusted using the compressed air. This combustion often takes place under relatively "lean" conditions, where more than the stoichiometric amount of oxygen necessary for complete combustion of the hydrocarbon fuel components is used. This helps to maintain a relatively low combustion temperature, which can improve the durability of materials used to make the turbines.

The high temperature, high pressure gas from a combustor is fed into a gas turbine engine where the gas expands and the temperature of the gas drops. In most applications, the gas turbine drives the compressor, as well as a generator that generates electric power. The exhaust gas leaving the turbine is at a relatively high temperature and can be used in a heat recovery system such as a heat recovery steam generator ("HRSG") before being exhausted or treated in downstream or integrated operations to reduce unwanted emissions. When utilizing an HRSG, the steam created by the heat recovery steam generator can be used as part of a combined cycle plant to drive a steam turbine. This increases the power generation efficiency of a power plant using the HRSG. One of the problems with such a system is that the exhaust gas contains pollutants; such as, when utilizing hydrocarbon based fuels, hydrocarbons (HC), carbon monoxide (CO), volatile organic compounds (VOC) and oxides of nitrogen (NOx), all of which are being controlled by various regulatory agencies. Moreover, NOx generation can be particularly problematic relative to some fuels, such as direct hydrogen and ammonia based fuels, that have high NOx output upon combustion.

One known technology for use in controlling NOx in stack emissions is selective catalytic reduction (SCR). In an SCR system, NOx that is present in the exhaust gas is reduced to nitrogen and water by mixing the NOx with, for instance, ammonia over an SCR element at a suitable temperature prior to being released into the atmosphere. The ammonia can be provided in the form of anhydrous ammonia. Alternatively, the ammonia used as a reducing agent may be made available by feeding an ammonia precursor compound into the exhaust gas which is thermalized and hydrolyzed to form ammonia. Examples of such precursors are ammonium carbamate, ammonium formate and urea. It is preferred to feed the ammonia precursor compound into the exhaust gas in the form of an aqueous solution. Preferably, urea is the preferred ammonia precursor compound, and it is fed into the exhaust gas in the form of an aqueous solution.

FIG. 1 schematically shows a conventional combined cycle plant (i.e., a conventional example of a T-H combination) featuring a combustion turbine cycle 1 and a water/steam cycle 2. In the turbine cycle 1, air A comes into the air compressor 10 and is mixed with fuel F in the combustion chamber 11 and combusted. The combustion products are then fed into the turbine section 13 causing the turbine shaft 14 to rotate the generator 15 which generates electricity.

Exhaust E from the turbine section 13 enters the transition duct 19 of HRSG 20, and passes to the pressure parts containment structure portion of HRSG 20 wherein the exhaust is cooled as it passes over the water/steam circuit, heating and boiling the water to steam. After the exhaust has given up its practical amount of energy (cooled) to the water/steam cycle, it is exhausted out the HRSG stack 21. It is here, in the exhaust stack, where emissions are measured for reporting, as in (with respect to the USA) to the Environmental Protection Agency (EPA) and/or local state or regional offices for determining emissions compliance.

The water/steam cycle 2 in the FIG. 1 illustrated conventional T-H combination consists of the HRSG 20, the Steam Turbine (ST) 70, a generator 75, and a condenser 76. The ST 70 consists of a high-pressure ("HP") section 71, an intermediate-pressure ("IP") section 72, and a low-pressure ("LP") section 73. The three ST sections 70, and the generator 75, are all on a common shaft 74. When the steam flows through the ST 70, it turns the shaft 74 and electricity is generated by the generator 75. This steam exits the ST 70 and flows to the condenser 76. The high pressure section, intermediate pressure section, and low pressure section feature stepped down pressure levels as in: HP at 2500 to 2600 psig; IP at 500 to 600 psig; LP at 50 to 100 psig.

As also shown in FIG. 1, a conventional combined cycle plant typically includes additional conventional elements, for example, low pressure condensate 22, low pressure (LP) economizer 23, LP steam drum 31, LP downcomer 32, LP evaporator 33, LP superheater 34, pipe to LP section (73) of ST 35, LP bypass valve & de-superheater 37, IP economizer 40, IP steam drum 41, IP downcomer 42, IP evaporator 43, IP superheater 44, pipe to cold reheat pipe (61) 45, HP economizer 50, HP economizer 51, HP boiler drum 52, HP downcomer 53, pipe to HP section (71) of ST 56, HP bypass Valve & de-superheater 58, cold reheat pipe 61, hot reheat pipe to IP section (72) of ST 63, reheat ("RH") bypass valve & de-superheater 65 and boiler feed pump 81, the operations of which are known and therefore not discussed in further detail.

During normal operation between full load and some minimum load, all the steam produced in the HRSG goes to the ST and exits the ST LP section 73 into the condenser 76 where it is condensed into water to cycle back through the water/steam cycle 2 starting at pump 80.

The steam exiting the HRSG flows through valves [HP: 57, RH: 64 and LP: 36] going to the ST (ST inlet valves) to generate power as stated above.

In the FIG. 1 illustrated arrangement, the emissions control equipment is shown downstream of the HP boiler drum 52 in the exhaust stream. Further shown in FIG. 1 is a medium temperature carbon monoxide or CO catalyst independent body (i.e., oxidation catalyst) 130, then an ammonia injection grid 120, and finally an SCR Catalyst 110 for NOx control.

During normal operation of the combined cycle plant configuration shown in FIG. 1, the exhaust gas from the gas turbine ("GT") is cooled through the HP superheater 55 and reheater 62, and then further cooled through the HP boiler drum tubes 54. The oxidation catalyst 130, is designed to operate in the range of exhaust temperature in an effort to maintain the emissions at the required stack 21 levels. The ammonia injection grid 120 then injects ammonia into the gas stream, and the mixture is then carried to the SCR catalyst 110 where the NOx is reduced in an effort to reach permit compliant levels.

As the emission standards have tightened, efforts have been made to enhance the NOx removal without the development of ammonia slip. These include, for example, the addition of oxidation catalysts ("OC") such as that referenced above and/or ammonia slip catalysts (ASC) at regions within the HRSG where they are considered to assist in meeting the emission standards. Examples of such efforts can be further seen in, for instance, U.S. Pat. No. 9,399,927 B2 to McDeed; WO 2016/132138 A1 to Repp; WO 2018/100368 A1 to Andersen, US 2017/0259209 A1 to Nilsson, and CN 204140170 U to Bibble.

There is also seen in the prior art (e.g., see US 2015/0361850 A1 to Forwerck, US 2013/0104519 A1 to Zhang, and U.S. Pat. No. 6,550,250 B2 to Mikkelsen) concerning ammonia supply to the exhaust feed for SCR treatment of that exhaust feed; as through the use of an ammonia injection grid ("AIG").

An additional trend in the prior art, in an effort to meet the more stringent requirements, is to have high resolution AIGs (e.g., AIGs having sufficient tunable injection zones and often flow turbulence baffles as to be able to maintain NH3/NOx mal-distribution levels at or below 10% root mean square). These high resolution AIG supply arrangements are arranged upstream of the SCR reactor (with the SCR reactor often positioned downstream of an OC and/or upstream of an OC (with or without an additional ASC)) such as those noted in the prior art references described in the paragraph above. This being based on the prior art belief that, to satisfy the increasingly more stringent emission settings for NOx percentage removal at the outlet of the HRSG, there is needed good mixing of the ammonia in with the exhaust flow prior to reaching the conventional SCR reactor ("SCRconv"). That is, as seen from FIG. 1A, a reduction in the mal-distribution of the ammonia injected into the NOx carrying exhaust flow can lead to significant NOx removal levels at a common ammonia slip level. As further depicted in FIG. 1A, a reduction in the NH3/NOx mal-distribution level, represented by the "RMS" (root mean square) or standard deviation values in the graph key, results in a shifting of NOx percentage removal amounts, with lower mal-distribution values deemed required to achieve the higher NOx percentage of removal values.

In other words, an SCR catalyst is designed to achieve a desired performance based on prescribed inlet conditions. In operation, these parameters will vary both spatially and temporally. The catalyst is designed to account for a specified amount of variation, which is defined in the technical specification under the mal-distribution criteria. These criteria reflect the boundaries of variations in temperature, flow rate, and NH3/NOx molar (or volumetric) ratio, which will deliver adequate SCR system performance.

A determination of high mal-distribution levels for an NH3 and NOx mix leading to an SCR catalyst system is informative as to the potential for increased NOx output and/or increased NH3 slippage through the SCR catalyst (and associated difficulty with keeping within emission level standards). In other words, a higher mal-distribution is informative of a higher potential for flow regions lacking a sufficient level of NH3 in the proper NH3/NOx reacting mix (leading to untreated NOx through-put through the SCR catalyst), and flow regions with an overabundance of NH3 in the NH3/NOx mix (leading to ammonia slippage through the SCR and to the emission stack—absent extra features such as the noted additional downstream ASC).

Typically, an allowable variation in temperature is expressed as a mean temperature and ±tolerance. The allowable variation in flow rate and NH3/NOx molar ratio is also expressed in % standard deviation. The % standard deviation can be calculated as follows:

The standard deviation is defined as:

$$\sqrt{\frac{\sum_{i=1}^{N}(X_i - X_{average})^2}{N-1}}$$

Where:
Xi=Measures value (flow rate or NH3/NOx ratio at specific point i)
N=Total number of individual data
$X_{average}$=average value Mal-distribution values of at or below 10% RMS (root mean square) at the receiving inlet of the SCR catalyst is illustrative of that which is sought out in the prior art in an effort to reach the emissions standard requirements for many locations. This mal-distribution control, relative to downstream SCR coatings, is also discussed in the prior art, such as in U.S. Pat. No. 7,776,297 B2 to Cichanowicz.

There has also been a tendency in the art to maximize HRSG sizes in coordination with greater and greater sized turbine generators (e.g., large sized turbine generator systems that produce above 600 megawatts like those suited for central station power generation). For instance, HRSGs of late typically involve large size construction projects (e.g., an HRSG in a horizontal setting that is 40 to 45 feet wide and 70 to 80 feet high and over 120 feet long). However, this increase in heat recovery system size to accommodate ever larger turbine generator sizes has created a problem in the art in that, relative to the associated cost for typical construction materials and assembly costs (e.g., concrete and steel work featured in many HRSGs), there is generated undesirably high per added foot construction costs.

Thus, there is a trend in the art to increase the size of the turbine driven generators, and hence the amount of NOx that needs to be removed due to increased NOx exhaust flow amounts associated with the larger turbines (e.g., larger and more efficient turbines feature an increase in the maximum firing temperature resulting in an increase in outlet NOx). There is also a need to limit the amount of ammonia slip out from the HRSG relative to efforts for SCR treatment of the higher NOx amounts passing into the HRSG (with many emission standards being at or below 5 ppmvdc (or parts per million on a volumetric basis, dry gas and corrected to standard conditions with "ppm" used for convenience below) NH3 leakage inclusive of a requirement for at or below 2 ppm NH3 leakage in some regions). At the same time there is a desire to prevent associated increases in the volume or linear length in HRSGs, which, in turn, means limiting the volume or linear length of emission reduction systems within the HRSG. This desire to limit the linear length in emission reduction systems also leads to a reduction in NOx/NH3 mixing time relative to the higher input levels of NOx within the HRSG before reaching an SCR reactor inlet. These competing facets associated with T-H combinations has led to the manufacture of conventional plants that cannot satisfy, or have difficulty reaching, the more stringent requirements under desired T-H combination operation levels. This being so despite various efforts such as the aforementioned high resolution AIG assemblies and/or high catalyst loading for the SCR reactor, and the presentment of OCs and/or ASCs in the flow path (which can also lead to back pressure issues if too many obstacles to flow are presented in the HRSG).

In other words, in the conventional T-H combination systems, with only one SCR catalytic reactor ("SCRconv") positioned in the exhaust flow line together with one or more OCs and/or ASC reactors, the (HRSG) space constraints result in the AIG inlet zone being positioned relatively close to the face of the SCRconv. There is also arranged in some systems (e.g., see CN 204140170 U) a static mixer ("SM") device arranged downstream of the AIG and upstream of the SCRconv reactor. In view of the limited spacing between the AIG and the SCRconv there is often featured in the conventional systems high resolution AIG supply systems designed in an effort to have low levels of mal-distributed NH3/NOx ratios (as in at or less than 10% RMS) reaching the face of SCR reactor wall (see again FIG. 1A showing the higher NOx removal with lower mal-distribution percentage for a given ammonia slip level).

Despite these efforts, due to the high input levels of NOx contained in the exhaust, particularly in the larger (e.g., natural gas fueled) combustion turbines (e.g., with NOx outputs of, for instance, 50 to 60 ppm NOx at the HRSG inlet) there has been experienced difficulty in reaching required emission reduction levels (e.g., at least 95% NOx reduction), while also attaining required ammonia slip levels (e.g., those satisfying regional requirements as in not exceeding 5 ppm (or 4, 3, 2 ppm in other regions). Even with added steps taken, as in high catalyst loading provided on the SCRconv, it can still not be possible to achieve the noted emission levels in the heat recovery steam generators (HRSG) receiving the gas turbine exhaust. That is, for instance, even with high catalyst material loadings on the SCRconv, an overloading of NH3 in the NH3/NOx ratio in one sub-zone can still lead to ammonia slippage, while an under-loading in another sub-zone of NH3 can lead to inadequate NOx removal zones, which in the aggregate can preclude reaching the emission NOx reduction threshold (e.g., 95%) and/or lead to overage in ammonia slip, as in >5 ppm. As noted, this difficulty and competing interests has led to large gas turbine T-H combinations having difficulty meeting, or not meeting at all, the desired emission overall reduction levels.

Relative to T-H combination emissions performance, there are many factors that affect that emissions performance such as temperature, exhaust flow levels/patterns, and the ratio of NH3/NOx. However, due to typical design constrains associated with the T-H combination systems relative to driven turbine exhaust temperature and flow patterns within the HRSG, the NH3 introduction levels and arrangements relative to the exhaust gas flow and the ratio of NH3/NOx represent areas of heavy focus in the prior art, particularly the NH3/NOx ratio supplied to the SCR reactor is deemed one of high importance. For these reasons the prior art techniques are directed at intense mixing of the NH3 within the receiving exhaust gas in an effort to achieve high NOx removal as through the inclusion of a static mixer upstream of the initial SCR reactor (e.g., upstream of the HRSG heat exchanger bundle as per CN 204140170 U), coupled together with perceived strategic locating of OC(s) and/or ASC(s) (e.g., see the CN 204140170 U positioning of both an ASC and an OC downstream of the SCRconv in view of upstream space limitations) in an effort to present at the SCRconv reactor inlet a desired NH3/NOx ratio or to enable an overabundance of NH3 in that ratio with post SCRconv reactor treatment as with an ASC to prevent ammonia slippage from exhausting out the HRSG outlet (e.g., see again CN 204140170 U, as well as WO 2016/132138 A1 and U.S. Pat. No. 9,399,927 B2). Despite these efforts, there is still present issues with reaching the desired (e.g., standards driven) levels of NOx removal and/or NH3 slippage, particularly relative to the present trend to increase the size of turbine generators (or to use fuels of high NOx output) while avoiding enlarging the size of the heat recovery system and/or adding more and more emission reduction components in the exhaust stream.

SUMMARY OF THE INVENTION

Under the various embodiments of the present invention, Applicant has taken alternative approaches to that promoted in the prior art. For example, under a first embodiment of the present invention a reducing reagent (preferably ammonia or a precursor thereto) is supplied to a pair of SCR reactors arranged in sequence within the heat recovery system (e.g., an HRSG) together with an intermediate turbulence generator (as in a static or dynamic mixer) between the SCR reactors. This arrangement has led to a lessening of the prior art need to focus on reaching lower-and-lower mal-distribution levels in the NH3/NOx mix reaching a downstream SCR reactor, and has also led to the benefit of reduced overall ammonia slippage past/around the SCR reactors received within respective heat recovery system receiving regions (e.g., an HRSG containment space).

The nature of the catalyst assembly of the present invention has also enabled the avoidance of usage of either one or more independent body OCs, or one or more independent body ASCs, which in the prior art assemblies take up space in the limited HRSG containment volume. In some environments, however, the present invention is inclusive of the presence of one or more independent or separate body OCs or ASCs in strategic locations. However, in view of the noted premium for catalyst reactor assembly minimization (and associated HRSG length minimization) the avoidance of OC and/or ASC separate body usage is preferred under the present invention. Moreover, the avoidance of having to use a prior art separate body OC reactor(s) as well as separate body ASC reactor(s) enables the addition, under the present invention, of the second SCR reactor within a similar volume region of the heat recovery system (that would otherwise have been occupied by that OC and/or ASC reactor body) while retaining desired pressure drop levels (e.g., preferably avoiding, under examples of the present invention, a pressure drop of more than 3.5 inches water column from the inlet to outlet of the HRSG, as in a preferred pressure drop maintenance range of 1.5 to 3.5 inches water column).

Hence, an arrangement of the present invention features an emission reduction system (ERS) having a reducing reagent supply source as in a reducing reagent injector system (RRI1). Under embodiments of the present invention, the RRI1 is represented by an ammonia supply source ((e.g., an ammonia injection grid) generally referenced as "AIG1" going forward) to feed ammonia (e.g., anhydrous ammonia, aqueous ammonia, urea (as in aqueous urea solutions) or other ammonia supply means) into the turbine exhaust gas with its NOx, such that the NH3/NOx mix comes into contact with the catalyst assembly having, in exhaust flow sequence, a first SCR reactor (SCR1), a turbulence generator ("TG"—as in a static mixer "SM"), and a second SCR reactor (SCR2).

In an alternate embodiment of the present invention, there is presented a common arrangement as featured in the above described embodiment example, but for the inclusion of a second reducing reagent supply source such as a second reducing reagent supply injection location (RRI2), as in a second ammonia injection location (referenced as "AIG2") preferably in place of the TG (SM) in the earlier described embodiment. The RRI2 can constitute, for example, a separate reducing reagent (e.g., ammonia) source than that of RRI1 (e.g., separate reducing reagent supply tanks such as a separate ammonia or urea tanks) or can constitute a common source (a single reducing reagent supply tank (e.g., an ammonia or urea tank), with appropriate piping and valving, feeding both injection RRI1 and RRI2 locations). In preferred aspects of the invention, there is either the TG or RRI2 but not both between SCR1 and SCR2. However, under an alternate approach of the present invention, there is provided integrated turbulence generating means and RRI means, such as turbulence generating mixers positioned for redirecting outflow of reducing agent exiting from (and preferably also supported by) injectors/piping of the RRI.

An additional advantage that has resulted from the present invention arrangements is that there is less of need for high resolution and even intermediate resolution reducing reagent supply units. That is, with reference to an ammonia supply as an example of the reducing reagent supply, a low resolution AIG is one with fewer tunable zones and lower required resolution (and hence an RRI with less initial assembly and maintenance costs).

For instance, a typical conventional high resolution AIG (suited for the above described HRSGs) can have more than 24 independently controlled zones, as in an AIG with 3 vertical columns of zones and 9 rows of horizontal zones for 27 separate tunable zones (with or without added integrated injection mixers, and with or without multiple generally Y-axis separated injection locations upstream of a common SCR). Alternative conventional high resolution AIG examples feature more than 18 tunable zones as in 21 or more zones (3 vertical columns of zones with 7 horizontal zones resulting in 21 separate tunable zones) plus added integrated mixers supported by the injection system and used to disrupt (add turbulence) to the injection reducing reagent flow, with such added piping mixers being illustrated by U.S. Pat. No. 8,017,084 B1 to Wirt et al. The fastening of mixers to piping increases substantially the production costs and time of manufacture, but is required in many prior art systems in an effort to attain a less than or at 10% RMS mal-distribution level. In still further examples of high resolution AIGs there is separate Y-axis spaced AIG injector assemblies often requiring multi-side HRSG insertion, and with high resolution embodiments also having total zones greater than 18 in sum relative to the multiple Y-axis injection locations.

A low resolution AIG suited for use under many embodiments of the present invention features less than the above noted 21 separate tunable zones, and preferably at or less than 18 tunable zones free of separate Y-axis injection locations and/or free of integrated piping mixers, as in RRI units (e.g., AIG unit) that function with, for instance, a higher ammonia to NOx mal-distribution, as in those functioning with a mal-distribution higher than 10% RMS. An RRI (e.g., AIG) with 6 to 18 total tunable reducing reagent zones, more preferably 10 to 16, as in 12 or 16 total tunable zones and free of integrated piping supported mixers (and preferably also free of Y-axis separation) are examples of low resolution RRI units. Thus, low resolution RRIs are preferably free of added integrated piping supported mixers and also are preferably limited to one general Y-axis insertion location (preferably only on one side or limited to opposite side insertions with a central common supporting frame structure).

Examples of low resolution RRI units include those with 3 or less (e.g. preferably less than 3 as in only 1 or 2) vertical column(s) of zones (as in an AIG with 16 independently tunable horizontal zones presented in one vertical column). A variety of other RRI configurations representing low resolution RRI units can be utilized, as in those comprised of any XxZ combination that provides the desired "low resolution" total zones (e.g., 3 vertical×4 horizontal for 12 total tunable zones or 2 vertical×8 horizontal for a total of 16 total tunable zones).

In alternate embodiments, either of RRI1 and RRI2, or both of RRI1 and RRI2, are provided with added flow disruption integrated piping mixers such as that described above (as in adding integrated piping supported mixer plating such as that described in U.S. Pat. No. 8,017,084 B1 above) to the injector pipes in RRI2 in place of an SM insertion or together with the SM insertion). Again, however, there are benefits made available under the present invention configuration in allowing for usage of each RRI in the ERS to be a low resolution RRI.

Additional examples of suitable RRI (e.g., AIG) reducing agent supply means under the present invention (although less preferable than low resolution from, for example, a cost and complexity standpoint) include those falling within the intermediate resolution category, which preferably feature more than 18 and 24 or less tunable zones, and which are, like the low resolution category, free of added integrated piping supported mixers and preferably also free of additional Y-axis spaced reducing agent injection systems leading to a common SCR. By being free of added integrated piping supported mixers (and like mixing means) there is made available the use of simple supply pipes with injections ports formed (e.g., drilled) therein, and without the added complexity associated with adding mixer plating (often by work intense welding) on to the supply piping. Further, the intermediate resolution RRIs are also preferably arranged generally with just a single Y-axis injection location. Thus RRIs with zones of between 21 and 24 zones and being free of any added piping assembly mixers, and also limited to one Y-axis general injection location are also representative of intermediate category RRIs under aspects of the present invention.

The present invention is directed at providing a T-H combination that features a design directed at meeting the more stringent emission requirements, both with respect to NOx level reduction and ammonia slip output levels, as taken at the heat recovery system's (e.g., HRSG) outlet. This being inclusive of T-H combinations having the aforementioned larger sized combustion turbines; (as in those with 50 to 60 ppm NOx at turbine outlet running on natural gas) or the same size or smaller turbine generators running on fuels that generate greater than 60 ppm NOx in their exhaust output. For instance, the present invention is directed toward advanced NOx reduction (e.g., 96% NOx reduction or higher, including 97%, 98% and 99%) while retaining NH3 slip at or below 5 ppm (as in at or less than 4, 3 or 2 ppm NH3 slip). The present invention is thus directed at attaining high NOx removal with low slippage values even relative to systems with relatively high NOx generation levels (as in the noted larger natural gas driving turbine generators and systems featuring alternate fuels other than natural gas, that, upon combustion, have even higher NOx generation (e.g., >60 ppm NOx) at the turbine outlet).

For instance, fuels, such as hydrogen based fuels (e.g., direct hydrogen or indirect hydrogen as in through ammonia (including green ammonia) sourcing) are considered illustrative of fuels that can have a relatively higher NOx output, such as $\geq 60$ to $\leq 100$ ppm NOx. This advanced NOx reduction with limited NH3 slip is achieved through an efficient emission reduction system ERS having an SCR catalyst assembly. The invention includes an emission reduction system or ERS that has a combination of SCR reactors (SCR1 and SCR2) downstream of a first reducing reagent supplier/injector (RRI1) (e.g., an AIG1), with the SCR1 and SCR2 having an intermediate turbulence generator TG, as in a mixer device (e.g., a static mixer SM); or a second RRI2 supply (e.g., AIG2). The RRI2 is provided preferably instead of the TG (SM), or, alternatively, the aforementioned RRI (RRI1 and/or RRI2) feature an integrated turbulence generator, as in flow redirecting mixing means supported on injector piping of the applicable RRI (e.g., see the above and below described integrated piping supported mixers as examples of the noted mixing means).

By avoiding usage of an independent body oxidation catalyst ("OC") or independent body ammonia slip catalyst ("ASC") (whether upstream of the first or second RRI or downstream of the first or second SCR reactor), the present invention avoids a requirement for increased heat recovery system space to accommodate the added SCR2, as compared to the conventional arrangements where there is but one SCR reactor (wall of modular SCR catalyst inserts); while also avoiding problematic pressure loss levels.

For example, a present invention catalyst assembly having SCR1/TG (e.g., an SM)/SCR2 for the ERS can be designed for reception within the same limited space allotted for minimized HRSG designs desired in the field (e.g., a conventional allotted linear HRSG length of 20 to 24 feet for receiving the emission reduction components of the HRSG). For instance, an emission reduction system of the prior art featuring, in combination, an OC/AIG/SCRconv or an AIG/SCRconv/OC (and/or ASC) is replaced in design with an emission reduction system represented by RRI1/SCR1/TG/SCR2; or RRI1/SCR1/RRI2/SCR2; or RRI1/SCR1/RRI2 (with integrated turbulence mixing means or the like)/SCR2 within a common linear occupation length in the applicable HRSG despite having the added independent body SCR2 (e.g., an occupation space limited to 20 to 24 feet of the HRSG).

Furthermore, contrary to the trend in the prior art to seek relatively lower mal-distribution percentages (e.g., via the aforementioned high resolution AIG supply injector systems and/or static mixers positioned upstream of the SCRconv) in an effort to increase the NOx percentage of removal via the SCRconv, the present invention provides for a higher or "looser" mal-distribution value X (standard deviation or "Xsd"). For example, suitable Xsd values reaching the inlet of SCR1 include Xsd as being greater than 10% and less than 20% (or 12%$\leq$Xsd$\leq$15%). For instance, a mal-distribution range of >10 to 15% heading into SCR1 and >10 to 20% heading into SCR2 (i.e., a looser standard mal-distribution level reaching the SCR2 as compared to that reaching the SCR1 is acceptable in view of the step down of NOx between the SCR1 and SCR2) are representative mal-distribution ranges under the present invention. For example, a 95% NOx reduction level across the SCR1 and a higher overall NOx reduction downstream of the SCR2, inclusive of 99% for some embodiments (particularly with a retention of the mal-distribution reaching the SCR being closer to the >10% range point than the higher 20% when such a high NOx reduction goal of 99% is desired). Under many present invention environments, the noted low resolution RRI is suitable or in some instances an intermediate resolution might be required, noting that with larger and larger HRSG sizes there is added area which can increase the total zones involved. Nonetheless, the added mal-distribution flexibility level under the present invention often allows for usage of regulation satisfying low resolution RRI, even for the largest HRSGs described herein.

Under embodiment examples of the present invention, the spaced sequence of SCR1 and SCR2 is able to accommodate larger slip levels through the SCR1 (such as those generated due to relatively higher Xsd mal-distribution values reaching the inlet of the SCR1); since the positioned SCR2 is able to sufficiently react the NOx and/or NH3 slippage through/past the SCR1 to achieve the desired output emission levels relative to both NOx percentage of removal and ammonia slip avoidance. In this regard, it should be noted that slippage past a SCRconv includes slippage though the SCRconv due to the noted mal-distribution, but also includes slippage of NOx and particularly NH3 past the exterior frame structure of the SCRconv relative to the reception or general seal region between the SCRconv and the HRSG frame structure. The prior art also includes, in an effort to drop the mal-distribution levels, extensive added sealing steps such as multiple sealing fiber "pillows" and added upstream seal-off baffling to the SCR in an effort to block flow around the periphery of the SCRconv. A general seal relationship is one without these added sealing steps.

Thus, while a higher or looser mal-distribution level is allowed under the present invention relative to the exhaust with intermingled ammonia reaching the face of SCR1, the two general seals nature associated with the dual SCR1 and SCR2 sequence is able to lower the overall slippage through the emission reduction system. In other words, while there is allowed, under embodiment examples of the present invention, higher or looser mal-distribution based ("interior") slippage past SCR1, the two general seal arrangement for the SCR1 and SCR2 combination represents a lowering of the overall "exterior" slippage amount as compared to the exterior slippage amount associated with SCRconv systems (e.g., two general seals resulting in at least 50% less NH3 slippage external/downstream of the SCR2 compared to SCRconv).

Thus, a benefit resulting from the combination of SCR1 and SCR2 in the present invention is the ability to better prevent external SCR reactor slippage relative to the injected reagent material as in ammonia as well as NOx. Since there are, under embodiments of the present invention, two porous SCR reactor "walls" (with each wall featuring preferably a frame structure and a plurality of modular SCR1 and SCR2 inserts or units), with respective associated general seal relationships, the present invention is better able to preclude undesirable levels of ammonia slippage around-past the reactor walls. For instance, any slippage of AIG1 supplied ammonia around the exterior periphery of the SCR1 reactor wall only slips into the volume that is flowing to the reactor SCR2 (and potentially also subjected to the TG (e.g., an SM) prior to reaching that second SCR2 for added intermingling before reaching the SCR2). The same situation exists relative to NOx exterior periphery slippage as well.

The invention is inclusive of the noted SCR1 and SCR2 each presenting a common SCR "wall" design/construction with relatively common general seal relationships between the reactors SCR1 and SCR2 and the receiving surfaces of the heat recovery system (e.g., HRSG) containment device. This potentially includes each of the modules in the walls representing SCR1 and SCR2 being of a common material (e.g., common SCR catalyst composition, catalyst support substrate material and framing for the modular SCR units), and configuration (although different materials and/or configurations can be utilized for the two porous (allowing exhaust flow through) "walls" representing SCR1 and SCR2).

Also, while a low resolution reducing reagent (e.g., ammonia) supply device is suitable for RRI1 (AIG1) (and/or RRI2 (AIG2) when featured), examples of the present invention also include intermediate resolution ammonia supply(ies) feeding into the exhaust gas leading to the SCR1 (or SCR2 or both SCR1 and SCR2) under alternate embodiments of the present invention, or even high resolution RRI (RRI1 and/or RRI2) under still further alternate embodiments (as in a retrofit situation with preexisting AIG1 since the utilization of low or intermediate resolution RRI represents significant cost savings). That is, due to the present invention's ERS configuration, and its ability to handle increased mal-distribution percentage levels, there is made available the advantage (in design and actual usage and servicing) of utilization of preferably intermediate and even more preferably low resolution (e.g., fewer tunable zones and avoidance of having to add mixing means on the piping) RRI supply systems. Also, under embodiment examples of the present invention, the overall emission reduction system ERS configuration can provide for a lowering of overall SCR catalyst material load (e.g., washcoat loads or WCL) volumes. This is considered inclusive of not only each of the SCR1 and SCR2 individually having less catalyst loading than a conventional T-H combination SCRconv; but, at least in some embodiment examples, the lowering of overall catalyst loading is considered applicable to the summation of catalyst material load volume amounts on SCR1 and SCR2 being less than or equal to the catalyst material load volume required in an SCRconv that is utilized in a conventional T-H combination arrangement.

Accordingly, relative to a first aspect of the present invention, there is featured a combination combustion turbine power generating apparatus and heat recovery system (e.g., a heat recovery steam generator ("HRSG")) or "T-H combination", comprising a turbine and heat recovery system, wherein the exhaust of the turbine, that is travelling through the heat recovery system (e.g., HRSG), is treated by an emission reduction system that includes:
  a) a first reducing reagent supply system RRI (e.g., an ammonia injection grid or AIG) that supplies reducing reagent such as NH3 into exhaust output by the turbine,
  b) a first SCR reactor (SCR1) positioned downstream of the first RRI1 (AIG1) relative to turbine exhaust flow through the heat recovery system (e.g., HRSG),
  c) one of either (i) a turbulence generator (TG), as in a static mixer, or (ii) a second RRI2 (AIG2) or (iii) an RRI2 with integrated turbulence generator (TG), as in an RRI2 with injector supported mixers placed in flow contact with reagent passing the RRI2—(also referenced as RRI2')
  d) a second SCR reactor (SCR2) downstream of the applicable (i), (ii) or (iii).

A second aspect of the present invention includes having the aforementioned turbine of the T-H combination being a turbine that is configured for operation with natural gas as its fuel supply and with the heat recovery system being an HRSG.

A third aspect of the present invention includes, relative to the first or second aspect, an emission reduction system of RRI1/SCR1/TG (or RRI2 or RRI2'))/SCR2 capable of reducing a flow of NOx at the inlet of the HRSG by at least 95%, more preferably at least 96% and still more preferably at least 97% (inclusive of up to 99% reduction) at the outlet of the heat recovery system (e.g., HRSG) with a reducing reagent (e.g., ammonia) slippage of at or less than 5 ppm, more preferably at or less than 4 ppm, still more preferably at or less than 3 ppm, and most preferably at or less than 2 ppm (and preferably while having steady state NH3/NOx mal-distributions levels in excess of 10% RMS).

The $NO_x$ concentration is usually measured at the outlet end of the SCR conversion means (and potentially as well at an inlet of the SCR conversion means, which under the present invention can include the unique arrangement of upstream of the SCR1 and downstream of the SCR2, or upstream of the SCR1, downstream of the SCR1, upstream of the SCR2 and downstream of the SCR2, or any combination of the noted upstream and/or downstream positions that can provide the desired level of detail as to the $NO_x$ conversion information). Sensing under the present invention is also inclusive of sensing only the downstream output of the SCR2 relative to desired information as in the $NO_x$ concentration.

The respective $NO_x$ concentration can be determined, for instance, by a chemiluminescence detector (CLD), Fourier transform infrared spectroscopy (FTIR), or infrared spectroscopy (IR). These methods to determine $NO_x$ concentrations are well known, per se, to the skilled artisan and can be applied in the present invention without departing from the scope of the claims. The $NO_x$ concentrations measured at, for instance, the outlet end of an SCR conversion means can be used to determine (e.g., to calculate) the $NO_x$ conversion within the catalyst system as well as the activity of the catalyst system.

As a supplement (e.g., regulation driven) or alternative to the measurement of the relative activity as described above, it is also possible to measure the ammonia slip ($NH_3$ slip) at the outlet end of the SCR conversion means (e.g., downstream of SCR2, and optionally also any one of the above described SCR1 and SCR2 (upstream/downstream sensor) positioning combinations featured above for NOx monitoring, as well as the downstream of SCR2 only sensing when the sensing technique so allows). The ammonia slip is usually measured by the noted FTIR, or in alternate techniques 2 CLDS (upstream/downstream of the SCR2) or a tunable diode laser.

The referenced reducing reagent (e.g., NH3) slip measurement techniques represent methods that are also, per se, well known to the skilled artisan, and can be applied in the present invention without departing from the scope of the claims (noting as well the unique usage of these known techniques under the present invention as in detecting NOx and/or ammonia slip, not only downstream from the SCR2, but also, optionally, in the intermediate region between the SCR1 and SCR2, for instance under any one of the above noted upstream/downstream SCR1 and SCR2 combinations).

A fourth aspect of the present invention includes, relative to the first, second or third aspect, having the turbine(s) of the T-H combination described in each of the first to third aspect above as having a power rating of greater than or equal 400 megawatts for a single cycle (inclusive of up to 571 megawatts attainable with the larger 50 Hz turbine-generators) or greater than 600 megawatts output for a dual cycle (e.g., up to about 840 megawatts for a dual cycle featuring both the combustion turbine-generator output and the output of the HRSG steam turbine generator associated with the HRSG).

A fifth aspect of the present invention includes, relative to any one of the preceding aspects in the alternative, having the heat recovery system in the form of an HRSG oriented in a horizontal flow line fashion.

A sixth aspect of the present invention includes, relative to any one of the preceding aspects in the alternative, having a static mixer as the turbulence generator TG (and no RRI2 or RRI2') between SCR1 and SCR2.

A seventh aspect of the present invention includes, relative to any one of the preceding first to fifth aspects in the alternative, having the RRI2 or RRI2' and no independent turbulence generator (e.g., no independent static mixer) between the SCR1 and SCR2.

An eighth aspect of the present invention includes, relative to any one of the preceding aspects in the alternative, the turbine of the T-H combination being of a type that produces an exhaust output that presents, at the point of inlet into the HRSG, of at least 50 ppm NOx and less than 275 ppm NOx, or 50 to 150 ppm, inclusive of 50 to 60 ppm NOx output as in that often associated with natural gas running turbines, or 60 to 100 ppm NOx output as in that often associated with direct or indirect hydrogen fuel sources.

A ninth aspect of the present invention includes, relative to any one of the preceding aspects in the alternative, at least one of (or both of) SCR1 and SCR2 being an NH3-SCR catalyst that comprises oxides of vanadium and titanium, and preferably further comprises one or any combination of oxides of tungsten, oxides of molybdenum, and silica.

A tenth aspect of the present invention includes, relative to any one of the preceding aspects in the alternative, at least one of (or both of) SCR1 and SCR2 having a corrugated support body provided with SCR material.

An eleventh aspect of the present invention includes, relative to any one of the preceding aspects in the alternative, at least one of (or both of) SCR1 and SCR2 being a dual function or multi-function SCR catalyst reactor having as a material component (as by way of a washcoat component) one, all, or any sub-combination of PGM materials (PGMs represented by Pt, Pd, Rh, Ir, Ru and Os, with a subset of Pt, Pd and Rh being that which is preferred in the present environment, with the most preferred being one with Pd as the dominant PGM as in Pd alone, Pd and Pt, or Pd and Rh). Under this aspect, the noted PGM material is preferably arranged in a zone, as in a downstream zone comprised of an SCR catalyst material with PGM (e.g., a Pd dominant SCR zone that provides an ammonia slippage catalyst or "ASC" function). The preferably common substrate upstream zone preferably being free of a PGM or lesser in PGM)).

As an example of a multi-zone arrangement: a no-SCR, OC upstream zone (e.g., an OC with alumina substrate supporting PGM such as Pd, Pt or both)); a no-PGM, SCR material intermediate zone; and a third ASC zone with SCR material and PGM. Preferably all these zones are provided on a common supporting substrate as in the one noted in the ninth aspect of the present invention.

A twelfth aspect of the present invention includes, relative to any one of the preceding aspects in the alternative, SCR1 as in a single function catalyst containing oxides of vanadium and oxides of titanium without PGM, or a multifunction SCR1 as in one with a PGM (e.g., with palladium or with palladium and platinum) over all or a part of the SCR1 substrate, and SCR2 being also either a single or multi-functional catalyst as in a dual function SCR catalyst with a first zone comprising the same as that of SCR1 and being single functional (e.g., no palladium or no PGM) and a more downstream zone having added PGM as in added palladium (or Pd and Pt), although additional embodiments include having PGM (as in Pd and/or Pt over the entire length of the first and/or second SCR) as well as three zone catalyst (SCR1 and/or SCR2) having, for instance, a first (upstream) no-SCR with PGM zone (as in an OC zone featuring a substrate with PGM), an intermediate no-PGM with SCR material second zone, and a downstream SCR with PGM as in an ASC with Pd and/or Pt zone.

A thirteenth aspect of the present invention includes, relative to any one of the preceding aspects in the alternative, a catalyst with a monolithic no-PGM containing washcoat loading on SCR1 and with SCR2 being at least a multi-zone washcoat loading preferably on a common supporting substrate with a no-PGM SCR material upstream zone and a PGM containing downstream zone.

A fourteenth aspect of the present invention includes, relative to any one of the preceding aspects in the alternative, the SCR1 with an integrated TG as in a SM mounted on brackets to the SCR1 framing as to provide a common integrated combination SCR1-SM that can be mounted as an integrated unit or connected in place within the heat recover system, as in the HRSG.

A fifteenth aspect of the present invention features a T-H combination featuring
  a combustion turbine that generates exhaust;
  a heat recovery system as in an HRSG having an inlet for receiving the exhaust; and
  reduction means for reducing NOx content in the exhaust while maintaining a reducing agent (preferably ammonia) slip at or below 5 ppm.

A sixteenth aspect of the present invention features the fifteenth aspect as having said reduction means so as to include, in exhaust flow sequence within the heat recovery system (e.g., HRSG), a first RRI1 injection device, a first SCR reactor, turbulence generating means as in independent body static mixer, or an independent RRI2 with no TG involved between the SCR1 and SCR2, or an RRI2 with integrated (e.g., injection piping supported) turbulence generating means as in injection piping supported turbulence mixers, and a second SCR reactor.

A seventeenth aspect of the present invention features the sixteenth aspect as having the turbulence generating means in the form of a static mixer, and with the heat recovery system (e.g., HRSG) preferably being free from inlet to outlet of at least one of, but preferably both, of an independent body OC and an independent body ASC.

An eighteenth aspect of the present invention features the seventeenth aspect as having the turbulence generator, preferably the static mixer, within a first third of horizontal (upstream to downstream) linear spacing between the outlet end of the SCR1 and the inlet end of the SCR2, as in an arrangement featuring a static mixer within the first quadrant of that linear spacing, inclusive of an arrangement within one inch to six inches of the downstream end of the SCR1 as in such a spacing provided by a bracket extension off of the SCR framing to which is secured the TG (SM) within the noted one to six inch range.

A nineteenth aspect of the present invention features the fifteenth aspect with said reduction means including, in exhaust flow sequence within the HRSG, a first RRI (RRI1), a first SCR (SCR1) reactor, a second RRI (RRI2), and a second SCR (SCR2), within the HRSG, with the HRSG preferably being free from inlet to outlet of at least one of, but preferably both, of an independent body OC and ASC.

A twentieth aspect of the present invention features, relative to any one of the fifteenth to nineteenth aspects in the alternative, as having an RIM that supplies ammonia as the reducing reagent to the exhaust directed toward the SCR1, under a preferred looser mal-distribution level as attributable to, for example, an intermediate (and more preferably a low) resolution RRI (e.g., an AIG that results in a greater than 10% mal-distribution leading to the closest downstream SCR reactor).

A twenty first aspect of the present invention features an emission reduction system configured for use with a T-H combination and sized for receipt by a heat recovery system (e.g., HRSG) of the T-H combination and having a reducing reagent supply assembly as in an ammonia supply assembly and a catalyst reactor assembly, with the emission reduction system having in sequence and relative to turbine exhaust flow through the heat recovery system (e.g., HRSG), a first reducing reagent injector RRI1 (e.g., ammonia injector AIG1) as part of the reducing reagent (ammonia supply) assembly, a first SCR reactor, a turbulence generator (TG) preferably as a static mixer SM (or optionally a second RRI2 (e.g., an AIG2) instead of the TG), or an RRI2 with integrated TG as in integrated injector pipe mixer means for flow deflection, and a second SCR reactor, and wherein the ERS is configured to reduce, relative to the outlet of the heat recovery system (e.g., HRSG), at least 96% (preferably at least 97%, 98% or 99%) of turbine exhaust NOx while retaining slip levels at that outlet of the HRSG at or below 5 ppm (more preferably at or below one of 4 ppm, 3 ppm or 2 ppm) (and also preferably having the NH3/NOx mal-distributions levels in excess of 10% RMS (e.g., maintaining a greater than 10% RMS level during at least a majority of the time of the emission reduction process as through use of an intermediate resolution RRI, or at least a low resolution RRI leading to the upstream SCR1 and, more preferably, a low resolution RRI feeding to each of SCR1 and SCR2).

A twenty second aspect of the present invention features the emission reduction system of the twenty first aspect, wherein the catalyst reactor assembly is represented by said SCR1, said TG (e.g., SM), and said SCR2, with the TG (e.g., SM) being positioned closer to the downstream end of the SCR1 than the upstream end of the SCR2.

A twenty third aspect of the present invention features the emission reduction system of the twenty first aspect as comprising the AIG1 and the AIG2 together with the catalyst reactor assembly comprised of said SCR1 and said SCR2.

A twenty fourth aspect of the present invention, relative to any one of the preceding aspects in the alternative, features the HRSG being free, between an inlet and outlet of the HRSG, of an independent OC body, or an independent ASC body, or each of an independent OC body and ASC independent body.

A twenty fifth aspect of the present invention, relative to any one of the preceding aspects in the alternative, wherein the SCR1 is a single function catalyst and the SCR2 is a multi-function SCR catalyst.

A twenty sixth aspect of the present invention features a method of assembling a T-H combination comprising positioning the emission reduction system of the twenty first aspect within the heat recovery system, as in the HRSG.

A twenty seventh aspect of the present invention features a method of operating a T-H combination comprising running a combustion turbine as to generate exhaust gas and passing the exhaust gas through an emission reduction system which comprises;
  a first RRI1 for providing a reducing reagent such as ammonia (using an ammonia injection grid (AIG1), for example) into exhaust output by the turbine,
  a first SCR reactor positioned downstream of the first RRI relative to turbine exhaust flow,
  at a location downstream of the first SCR reactor one of either (i) an independent body turbulence generator (TG) as in a static mixer (SM) or (ii) a second RRI (e.g., a second AIG2) or (iii) an integrated RRI2 (e.g., AIG2) and TG, as in turbulence generating baffling provided at the injection porting of the RRI2; and
  a second SCR reactor downstream of the utilized (i), (ii) or (iii).

A twenty eighth aspect of the present invention features passing the gas turbine exhaust gas of the twenty seventh aspect through the ERS which is positioned within a horizontally oriented heat recovery system such as an HRSG, and wherein the ERS comprises (i).

A twenty ninth aspect of the present invention features passing the gas turbine exhaust gas of the twenty seventh aspect through a horizontally oriented heat recovery system (e.g., HRSG), and wherein the ERS comprises (ii) or (iii).

A thirtieth aspect of the present invention features, relative to any one of the preceding aspects in the alternative, only SCR1 and SCR2 as NOx selective catalyst reduction catalysts in a horizontally oriented heat recovery system (e.g., HRSG); or, stated differently, between the inlet and outlet of a horizontally oriented heat recovery system (e.g., HRSG) there is a total of two SCR reactor walls.

A thirty first aspect of the present invention features, relative to any one of the preceding aspects in the alternative, no OC and no ASC independent catalyst bodies between the inlet and outlet of the heat recovery system (e.g., HRSG).

A thirty second aspect of the present invention features, relative to any one of the preceding aspects in the alternative, an RRI1 having an intermediate, and more preferably, a low, resolution RRI, as in having less than 21 independently tunable reducing reagent (as in liquid urea) injection zones, and more preferably 18 or less (e.g., 6 to 16), (preferably with 3 or less, and more preferably 2 or 1 columns of tunable zones, as well as the avoidance of Y-axis separated injection locations and/or the avoidance of added flow deflection mixers supported on the inlet piping assembly), and when RRI2 is present, preferably that is also an intermediate (or more preferably a low) resolution RRI2 and, particularly when there is an SM present between SCR1 and SCR2, the RRI is preferably free of any of the aforementioned integrated piping supported mixers for injected reducing reagent flow disruption).

A thirty second aspect of the present invention features, relative to any one of the preceding aspects in the alternative, having the NH3/NOx steady state mal-distributions levels in excess of 10% RMS (e.g., maintaining a greater than 10% RMS level during at least a majority of the time of the emission reduction process), and preferably a range of greater than 10% to 15% RMS relative to the exhaust reaching SCR1, and greater than 10% to 20%. RMS relative to the exhaust reaching SCR2).

A thirty third aspect of the present invention features, relative to any one of the preceding aspects in the alternative, having the SCR1 positioned downstream of an HRSG high pressure evaporator and preferably between the upstream end of an HP evaporator and a downstream positioned HP economizer.

BRIEF DESCRIPTION OF THE DRAWINGS

FIG. 3B shows an enlarged view of the circled region in FIG. 3A.

FIG. 6C shows a three-zone SCR with OC PGM, no-SCR/no-PGM, SCR/ASC PGM in sequenced zones; and FIG. 6D shows a 100% length SCR with full length PGM coating example.

DETAILED DESCRIPTION OF THE INVENTION

The present invention is inclusive of a T-H combination with improved emission reduction system that is particularly adept at handling combustion turbine outputs such as those with relatively large NOx content (as in that generated by the larger sized combustion turbines or those running on turbine fuel producing relatively high NOx) within an efficiently sized heat recovery system such as a Heat Recovery Steam Generator ("HRSG") system.

T-H Combination (THC)

Figure 1:
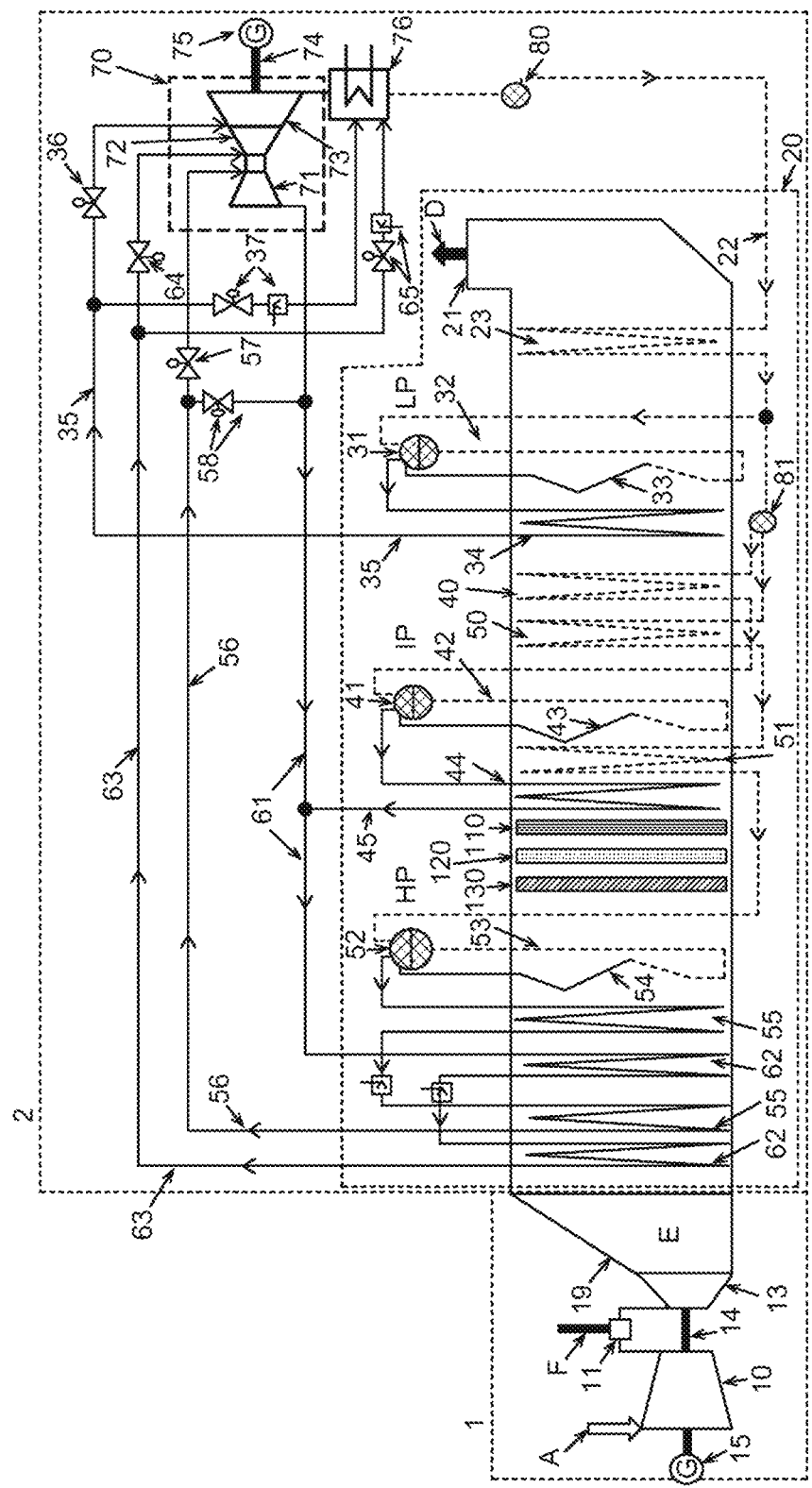
FIG. 1 shows a conventional T-H combination with conventional emission reduction system.
Figure 1A:
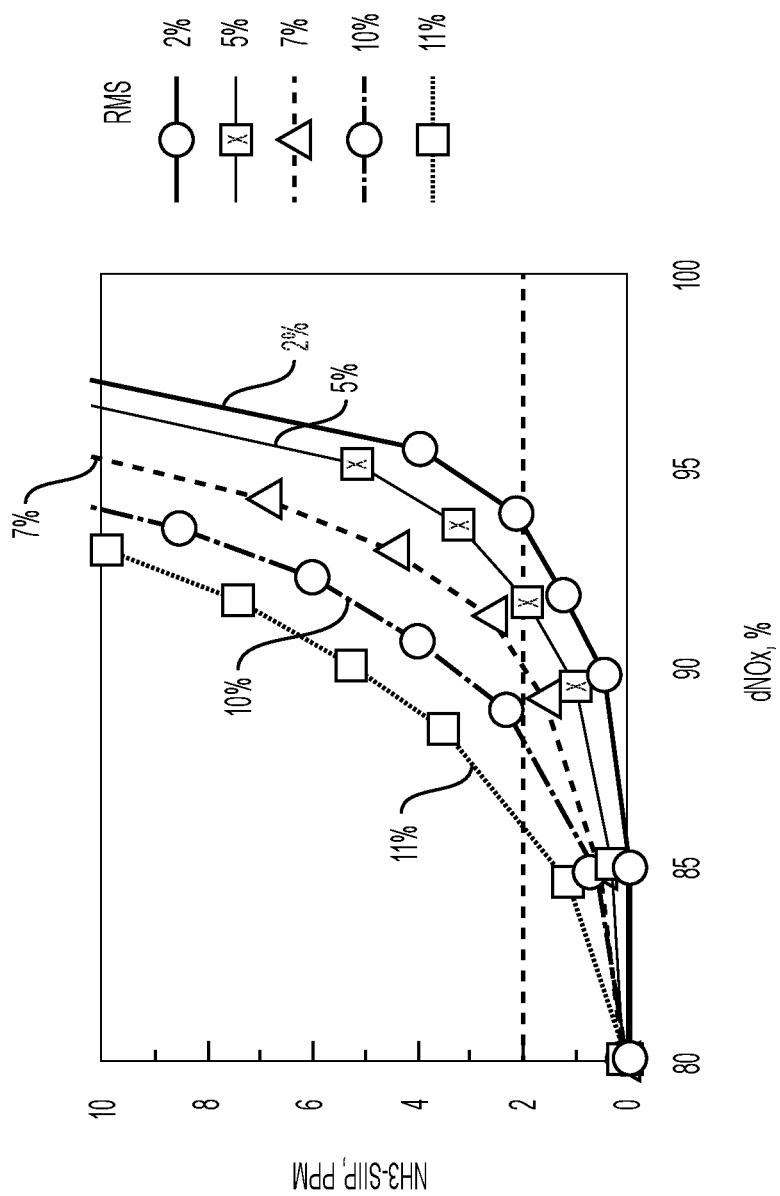
FIG. 1A shows a graph comparing ammonia slip levels and deNOx performance at various mal-distribution levels for NH3/NOx in an exhaust stream (i.e., a graph showing the effect of NH3/NOx mal-distributions on SCR performance).
Figure 2A:
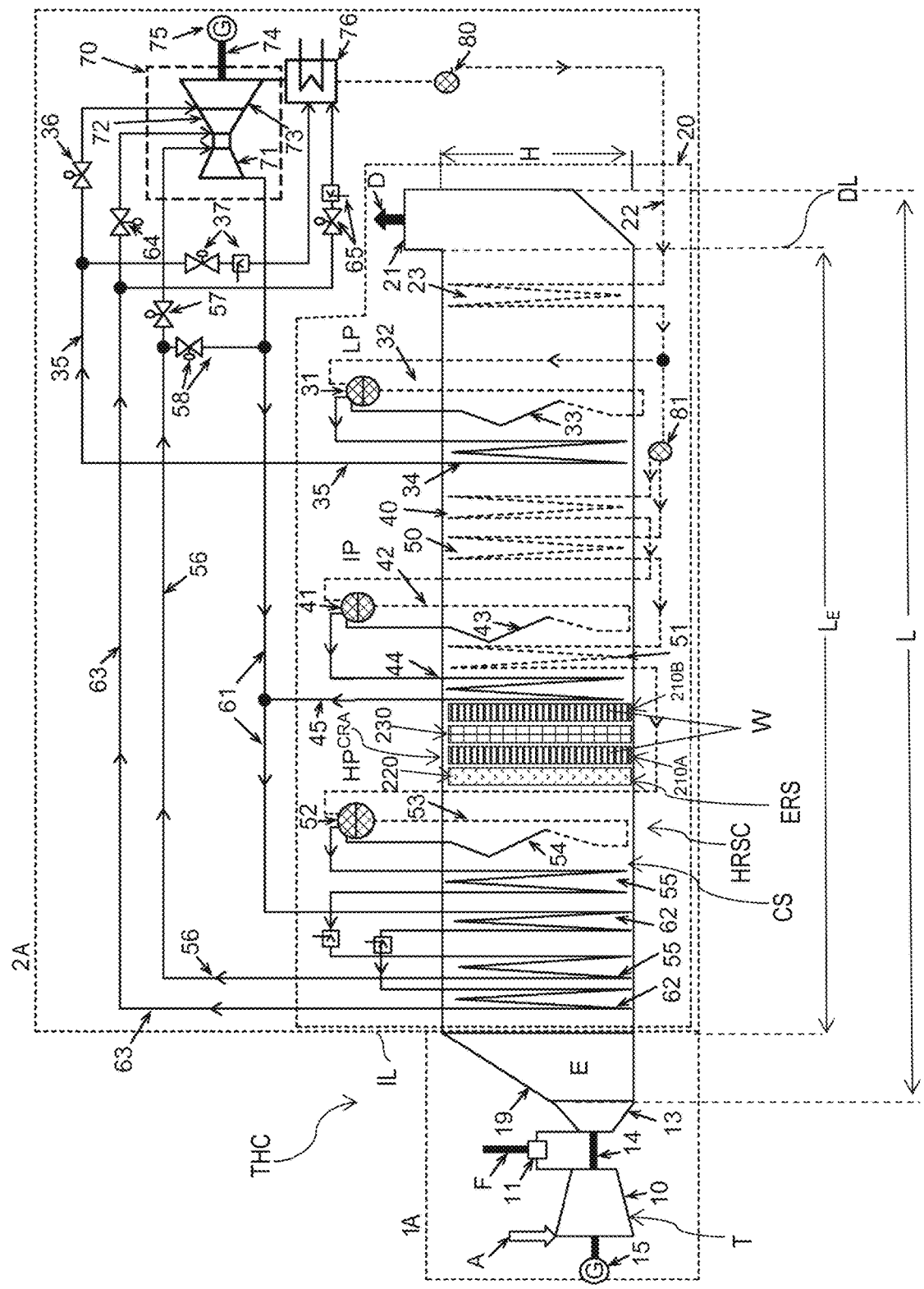
FIG. 2A shows an example of a first embodiment of the T-H combination of the present invention, inclusive of a present invention emission reduction system embodiment example having, in exhaust flow sequence, RRI1/SCR1/TG/SCR2.

FIG. 2A shows an illustrative embodiment of a T-H combination (THC) under the present invention having, in general terms, a similar set up as the T-H combination featured in FIG. 1 (with variations described and referenced in the discussion below, while common referenced components are not again described). The T-H combination shown in FIG. 2A is, thus, but one example of a suitable T-H combination general set up for which the present invention's emission recovery system (ERS (ERS(2a) for the FIG. 2A embodiment or ERS(2b) or ERS' for the FIG. 2B embodiment)) is well suited. Various other T-H combinations are also contemplated. For example, the present invention is inclusive of various exhaust gas passageway containment structures as in that which is provided by a heat recovery system configuration such as that represented by an HRSG. When the exhaust containment structure is an HRSG there can be a variety of HRSG arrangements, inclusive of varying heat exchange tubing types and placement for steam generation in a water/steam cycle 2A of the T-H combination. Additionally, the combustion turbine associated with the exhaust being sent to the heat recovery system can also be varied under the present invention, inclusive of different turbine types such as those designed for different fuel sources with some examples of different fuel/turbine types described above and below.

In the illustrated embodiment of the present invention shown in FIG. 2A, THC includes turbine (first) cycle 1A, which is preferably of a type with electric power generator 15, fueled, for example, by relatively clean fuels F (e.g., those avoiding high ash content in the exhaust stream) such as natural gas, light distillates or syngases (derived e.g., from coal). The first cycle turbine can be run, however, on other types of fuels F that are suited for running the turbine operation (e.g., a T-H combination in which the fuel is combusted in the first cycle turbine T to generate electricity in the first cycle with the heat generated from combustion of the gas in the first cycle turbine being recovered in a steam-operated heat engine in second cycle 2A inclusive of a steam driven turbine-generator). The combination of these two cycles increases the net overall efficiency of the system.

Further fuel examples include fuels (and turbines designed to run with such fuel) such as fossil or hydrocarbon based fuels (e.g., natural gas or diesel), or non-hydrocarbon type fuels such as direct hydrogen or indirect hydrogen fuels such as those based on ammonia (e.g., "green ammonia") turbine fuel sources. The present invention is well suited to operate with a variety of fuel types (and hence different turbine types running on said fuel(s)), as the present invention is able to step down in an efficient fashion the NOx levels, even when the fuel type utilized has a relatively high NOx output upon combustion. For instance, as noted, the present invention is designed to reduce NOx by 95% or more (as in at least 96% or more preferably at least 97%, as in up to 99%) while retaining ammonia slip levels at or below 5 ppm (as in 4 ppm or less, 3 ppm or less and 2 ppm or less) relative to turbines such as natural gas operating turbine generators which, when using such fuel, often have an output of 50 to 60 ppm of NOx. A combustion turbine operating under, for example, direct hydrogen, will have a higher output level as in 60 to 100 ppm NOx. Moreover, these noted values of NOx reduction and NH3 slip are achievable under the present invention while having "looser" NH3/NOx mal-distribution levels, as in greater than 10% RMS (e.g., 10 to 20% RMS) in the exhaust flowing to the applicable SCR means.

Heat exchange type operations in the second cycle 2A are typically conducted extensively within the interior of the pressure parts containment structure of the HRSG. An example of an HRSG is one that is a relatively large assembly of metal framework and concrete support walls designed to confine the various ERS components described above in the background for the T-H combination (or "THC") in FIG. 1. Hence, the THC of the present invention is inclusive of a containment structure (CS) defining a "containment space" for receipt of pressure parts of the heat recovery system, as in the noted HRSG components positioned within the HRSG, together with the emission reduction system ERS embodiment of the present invention. The ERS in this embodiment includes catalytic components for treating desired pollutants such as oxides of nitrogen (NOx), (and, when present in the exhaust), can be designed to additionally treat carbon monoxide (CO), unburned hydrocarbons (HC) and volatile organic compounds (VOC)) resulting from the combustion of the turbine fuel in the first cycle 1A. Catalytic activity of these catalytic components is promoted by transfer of the heat of the exhaust gas being treated to the catalytic components themselves. Location of the catalytic components within the HRSG system can be selected for temperature-optimized catalytic activity.

Turbine-Generator

As described above, the THC in FIG. 2A features turbine T within first cycle 1A which is operated preferably under one of the above noted fuel types, as in the noted "clean" fuel types. Further, as described in the background of the present invention, the present invention is particularly adept at handling exhaust output from relatively large turbines (e.g., gas turbines in sizes above 400 megawatts in simple cycle applications and over 600 megawatts in combined cycle applications, like those suited for central station power generation). As a non-limiting illustrative example of a relatively larger turbine having such attributes, reference is made to the General Electric Company GE7HA.03 60 cycle gas turbine at 430 Mw in simple cycle.

The present invention is also suited for smaller turbine sizes than those noted above, but has the noted advantages of being able to handle large turbine sizes having high NOx output such as those noted above and below, as well as other types of exhaust generating devices inclusive of turbines that have relatively high NOx output, due to, for example, the type of fuel they run on (e.g., direct hydrogen), which devices may output high NOx even when not being necessarily large in size.

Exhaust Containment Structure Such as a Heat Recovery System (with an HRSG as an Example)

As noted above, and with reference again to FIG. 2A, the heat recovery system of the present invention can be an HRSG. Thus, reference is made below to the present invention emission reduction system as used in a T-H combination featuring an HRSG. In this regard, there is shown within the exhaust containment structure CS of the HRSG, the present invention's emission reduction system ERS as well as, relative to the illustrated HRSG example, the various other HRSG cycle 2 components (such as those described above in the background section of the present application).

Containment structure CS is designed to confine the exhaust flow E from the cycle 1A turbine T from the inlet opening to the discharge opening D of the HRSG, and also to receive the emission reduction system ERS together with the background referenced additional cycle 2 components portions of which are also received in the HRSG for purposes such as heat exchanger transfer of exhaust heat in the cycle 2 operation to enable steam turbine 70 operation.

Containment structure CS is sized to accommodate the exhaust output of the first cycle 1A turbine T and to provide the required cycle 2 heat exchange and sufficient room for ERS operation. A conventional HRSG having conventional emission reduction systems such as those described in the background and for use with larger sized turbines typically are in the range of >100 (e.g., 120) feet L x>30 (e.g., 40) feet W x>70 (e.g., 80) feet H (with the HRSG length L representing the length between the upstream positioned diverging inlet leading to the pressure part containment structure or main body of the HRSG (having length LE) until reaching the downstream end of the stack duck work exiting the pressure part of the containment structure of the HRSG. The containment structure CS of the present invention is designed to avoid added expense in HRSG manufacture and thus is preferably maintained with L at or below the noted 120×40×80 (L×W×H) size range and, more preferably, is ≤100 feet L x≤30 feet W x≤70 feet H even relative to the above described "larger' megawatt generating turbines). This sizing is suitable for an ERS reception space of, for example, 20 to 24 feet along the linear length of the HRSG (with a common height and width of the illustrated CS or an expanded or bulged H×W region matching the linear length of the ERS). The bulging allows for a larger cross section for the catalyst and does reduce the gas velocity to some extent (but can increase construction cost due to the added HRSG configuration complexity).

Figure 8:
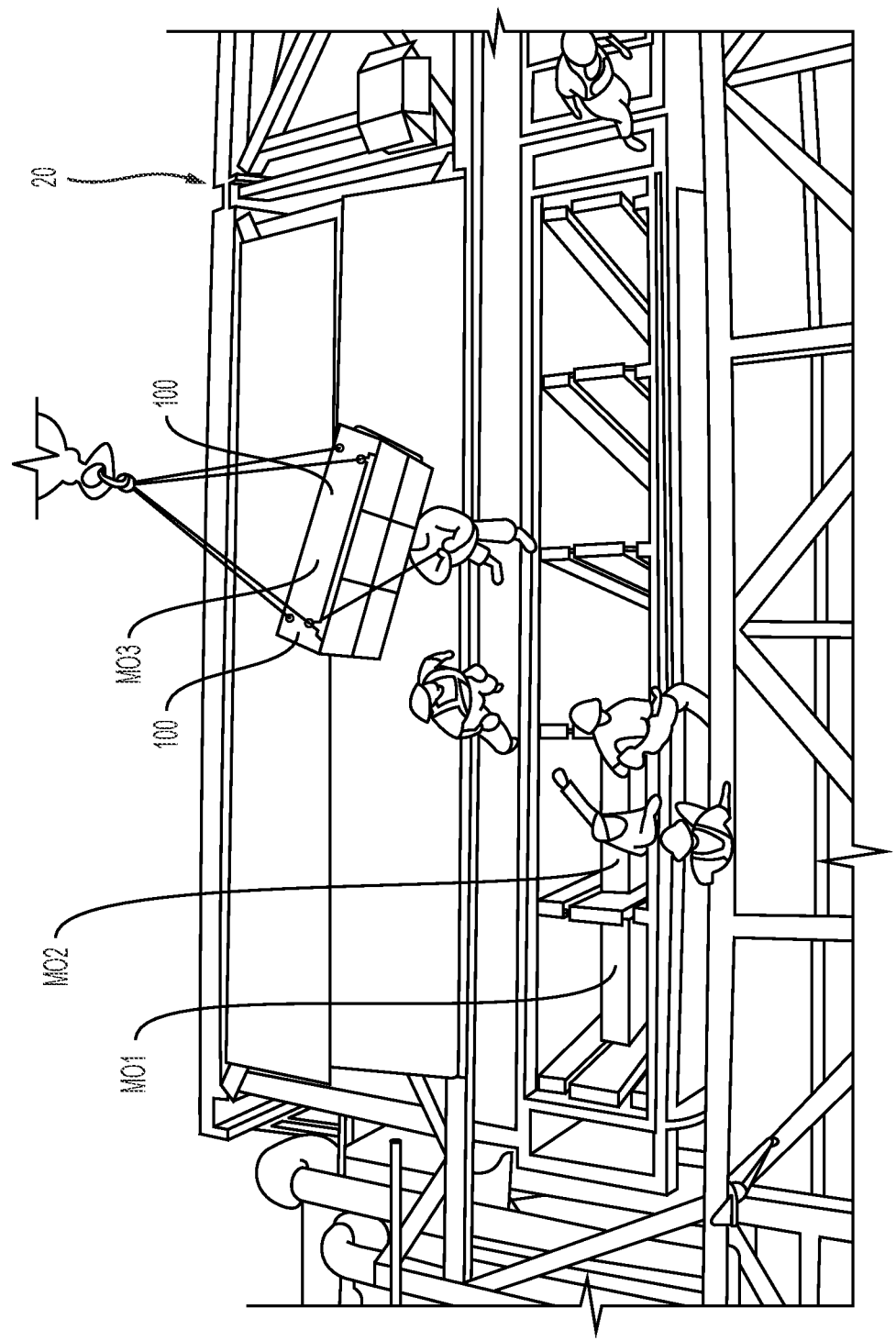
FIG. 8 shows the formation of a full SCR reactor wall made up of a plurality of the FIG. 7 modules that are inserted and fixed relative to the supporting frame structure of the receiving region of the heat recovery system (e.g., HRSG) partially shown.

FIG. 8 further shows a technique (conventional technique when dealing with conventional components) that can be utilized to assemble the unique ERS components of the present invention, and which technique involves the insertion (stacking) by workers of individual SCR modules, MO1, MO2, MO3, etc., to form the SCR walls (SCR1 and SCR2) within the confines of the CS in the partially illustrated HRSG 20. The FIG. 8 modules are SCR only components, although, in alternate embodiments, the modular units that are joined together to form the modules (or the frame structures of the modules themselves) can respectively support (e.g., bracket supports extending downstream of the modular units 100) turbulence generators as in static mixers (See the below discussion as to FIGS. 11 and 11A).

Also, the utilization of SCR1 and SCR2 under the present invention in conjunction with the turbulence generator (static mixer) in FIG. 2A is designed to provide sufficient through-flow for optimizing turbine operation while avoiding an undesirable increase in pressure loss due to too many obstructing components along the length of the HRSG. For example, an exhaust gas flow through the HRSG that is maintained at or less than 9 million pounds/hr (e.g., within 6 to 9 or 6 to 8 million pounds/hr) is illustrative of flow rates suited under the present invention (particularly for large power generation) while still ensuring a desired (e.g., regulated) level of NOx reduction with minimized ammonia slip.

Emission Reduction System (ERS) with SCR Reactor Assembly—Embodiment 1 i) Compound/Reducing Reagent Supply System RRI (e.g., Ammonia Injection Grid—AIG)

FIG. 2A shows (schematically) an example of a compound/reducing reagent supply system 220 (also referenced as RRI); which, in an embodiment of the present inventions features a reducing reagent suitable for SCR reaction such as one that comprises aqueous ammonia, anhydrous ammonia, and/or aqueous urea. When ammonia is used as the reducing agent it may be made available by feeding an ammonia precursor compound, e.g., urea, ammonium carbamate, or ammonium formate, into the exhaust gas stream, and by subsequent hydrolysis. The injection systems and methods disclosed herein may inject the reducing reagent (e.g., the reagent may be injected in a liquid state, a gas state or a vapor state) into a stream of exhaust gases passing from the combustion turbine T source and through the HRSG and into contact with an ERS of the present invention. Hence, with reference to the preferred reagent types noted above, an aspect of the present invention features a supply system 220 providing a reducing reagent injection supply system (RRI) as in an ammonia injection grid (AIG). Also, for convenience, there is made reference to supply system 220 below in an illustrative (preferred in many environments) form of an ammonia injection system AIG (and AIG1 and AIG2 when multiple Y-axis spaced ammonia injection independent zones feeding respective SCR reactors are involved).

As further represented in FIG. 2A, supply system 220 is a first in line component of an illustrative ERS embodiment of the presents invention. Supply system 220 preferably is an intermediate or low resolution RRI, preferably also with a single Y-axis injection location upstream of the first SCR1 (in alternate embodiments the noted single zone can be supplemented with a further upstream and/or downstream zone, although an ERS having the one only injection of reducing reagent zone upstream of SCR1 is preferred for many intended uses).

Figure 3A:
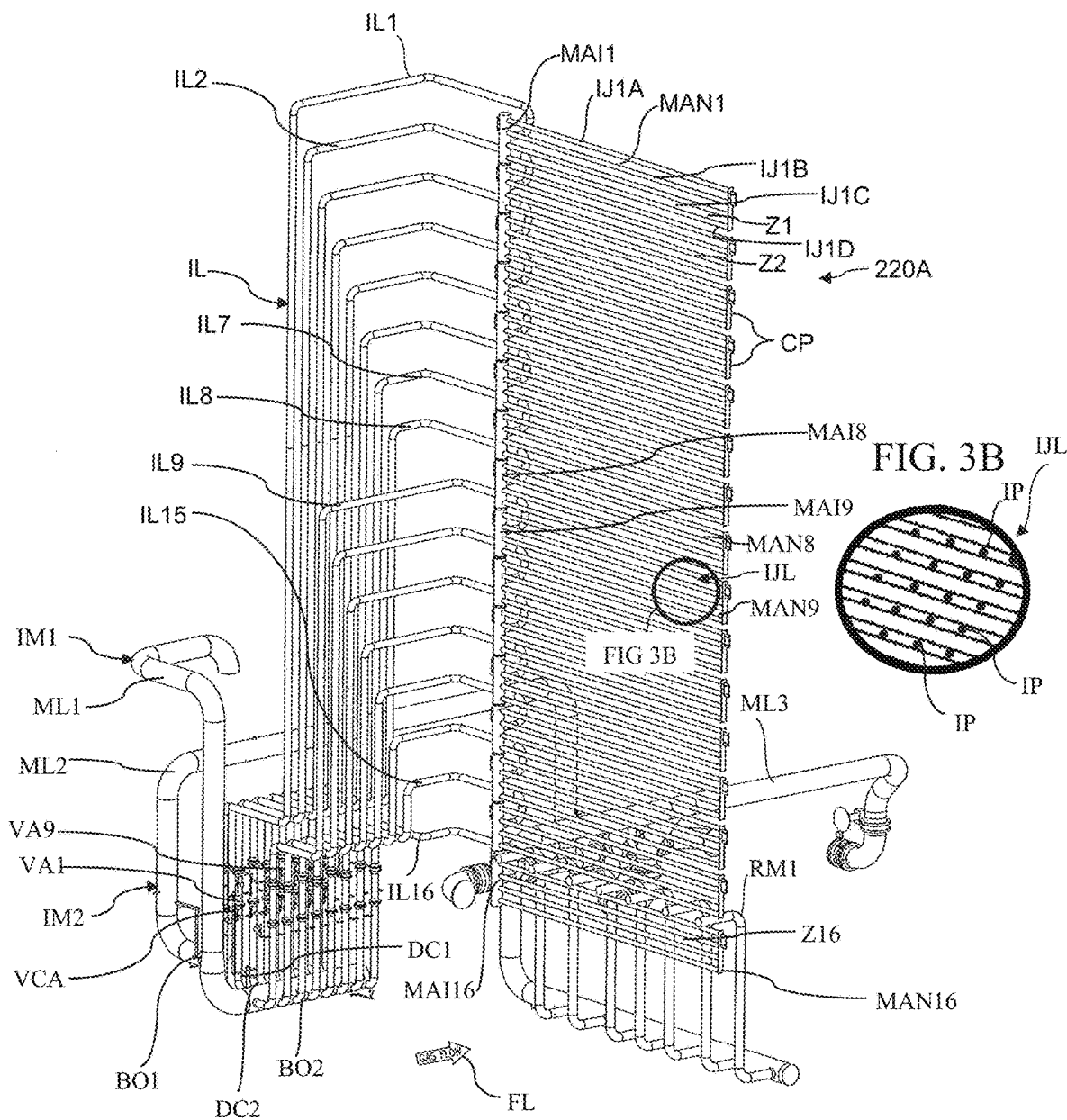
FIG. 3A shows a perspective view of a "low resolution" (single side HRSG support reducing reagent injection system (RRI) as in an ammonia injection grid (AIG) suitable for the RRI1 (e.g., AIG1) of the present invention (as well as RRI2 (e.g., AIG2) if utilized).

In this regard, FIG. 3A shows compound/reagent supply system 220A in the form of a low resolution RRI, which is supported by a suitable HRSG support structure as to have reducing reagent supply piping extending through the containment structure (one side wall in this embodiment) and terminating within the interior walls of the heat recovery system, such as an HRSG, as to face the flow stream FL passing in the containment structure/space CS of the heat recovery system (e.g., HRSG). FIG. 3A presents a perspective view of the system 220A in a flow facing/passage-past perspective. Supply system 220A is illustrative of an injection system (RRI) as in an ammonia injection grid (AIG) suitable for the RRI1 (AIG1) of the present invention (as well as RRI2(AIG2) if utilized per the discussion below).

As shown in FIG. 3A compound/reagent supply system 220A (RRI), includes a plurality of main inlet pipe assemblies IM1 and IM2, which are main inlet conduits for the reagent such as the aforementioned ammonia sources. Pipe assembly IM1 includes main feed line ML1, and, correspondingly, piping assembly IM2 includes main feed line ML2. Each of main feed line ML1 and main feed line ML2 are shown as having break out region BO1 and BO2, respectively. Each breakout region features a distribution conduit DC1 and DC2 (each shown as a horizontal Y axis extending larger pipe section) out from which extends (vertically in this embodiment) inlet lines IL (with each inlet line IL being assigned a reference number shown as IL1, IL2 . . . IL7, IL8 for ML1, and IL9, IL10 . . . IL15, IL16 for ML2). Main line ML3 represents an exhaust conduit through which the illustrated removal lines (RM1 only referenced) draw out heated exhaust to facilitate a heat exchange with incoming reagent to help raise the temperature thereof at the time of injection.

As further seen from FIG. 3A, the various inlet lines IL are each shown as having a vertical section (extending along the Z axis) that leads to a horizontal first section (extending along the Y-axis) and a downstream X-axis extension. Each downstream X-axis extension leads to a respective curved intermediate section joining with a respective one of the stacked manifold segments MAI1 to MAI16 (with only the MAI1 and MAI8 of the IM1 group labeled, and only MAI9 and MAI16 referenced for the IM2 group). The manifold segments can be stacked along the HRSG containment surface adjoining wall such that only one inlet pipe need be inserted through the side wall of the HRSG.

The manifold segments MAI1 to MAI16 each, respectively, lead into one of the manifolds MAN1 to MAN16 which are shown as pipe segments with an intermediate size in an end-to-end stacked support arrangement. Thus, a portion of the piping associated with pipe assemblies IM1 and IM2 is designed for exterior to the containment structure positioning (external to a wall defining the containment space CS) as to avoid undue flow disruption relative to the exhaust flow FL and to avoid increased potential pressure loss.

Each of manifold segments MAI1 to MAI16 are further shown as providing support for a plurality of injection lances IJL, with each injection lance IJL extending in a widthwise direction within HRSG (X-axis) direction out from the supporting respective manifold segments and amongst MAN1 to MAN16, and with each injection lance within the respective four in number sets being respectively capped at the free ends by capping CP (that represent the supported ends of the injection lances at the opposite side wall of the HRSG which defines the containment space of containment structure CS, with the support being, for instance, open top pipe stubs attached to the HRSG interior side wall in which the capped manifold ends can nest with X-axis expansion room).

Thus, with consideration of MAN1, as an example, there is shown IPA to IJ1D as a set of four injection lances extending off from MAI1 of IM1. In the embodiment illustrated for RRI 220A there is shown a stack of 16 manifold segments (MAI1 to MAI16) each supporting manifolds MAN1 to MAN16, respectively, and with each respective manifold represented by MAN1 to MAN16 being individually capped at their most downstream end.

With reference to FIG. 3B there can further be seen that each injection lance includes a plurality of injection ports IP arranged, for example, to have the openings that spray out reducing reagent (e.g., an ammonia source such as described herein). For instance, if the exhaust flow is headed in an upstream-to-downstream, positive Y-axis direction through the HRSG, the injection ports are shown arranged to spray out the reducing reagent in the negative Y-axis direction into the oncoming exhaust flow FL. In alternate embodiments of the invention, the injection ports can be arranged to have the injected reducing reagent flow in a common flow direction with the exhaust flow if there is sufficient space and turbulence in the flow to achieve a desired degree of intermixing. Further, the injection ports are each spaced apart along the X-axis direction in common with the direction of extension of each injection IJL in the various manifolds MAN1 to MAN16 depicted.

With each of the 16 shown manifolds MAN1 to MAN16 including a set of four injection lances IJL in similar fashion to the above described IPA to IJ1D, there can be seen that a great deal of Z axis-X axis cross-section area (at essentially a common Y-axis location along the length of the HRSG) is generally covered relative to reagent supply coverage into the flowing exhaust stream FL.

Reference is also made to valve assembly area VCA that comprises a plurality of valves individually and respectively associated with each of the IL1 to IL16. For convenience, only valve VA1 (associated with inlet line IL1 of IM1) and valve VA9 (associated with IL9 of IM2) are labeled, but it is understood that each of IL1 to IL16 has an associated valve within the valve assembly area VCA. Each valve thus can control whether the respective manifold associated therewith is open or closed as to either allow for or not allow for reagent supply to the ultimate release ports IP of the associated manifold extending within the HRSG containment space CS within the flow of exhaust there-past. Also, in preferred embodiments there can be provided a sliding scale as to the amount of reagent fed from the main conduit IM1 or IM2 (whichever one is associated with the valve in question) as by having a variable positionable valve (e.g., a butterfly valve). Further, the valves are preferably each in electronic control relationship with one or more control means such as those described above (with control CN shown in FIGS. 4A and 4B being illustrative).

The combination of the reagent supply piping and associated individual manifold regions (e.g. MAN1) as well as the ability to control the overall output of the IPs within each of the manifolds (16 manifolds shown in FIG. 3A) is illustrative of presenting different tunable zone regions relative to the exhaust flow FL with each zone being individually and independently controllable as to no-flow or full flow (and more preferably a variable flow valve arrangement wherein there is the ability to choose percentage levels between 0% (no flow) and 100% (full available flow output) as in any percentage level such as 1%, 2% . . . 98%, 99% relative to the open-close valve status of the controlled and adjustable valve for that particular line (and hence also for that particular manifold)). Despite this valve flow adjustability, the nature of FIG. 3A supply system 220A (RRI or AIG) is one that is deemed in the art as being of "low resolution". That is, system 220A represents a low resolution example in that, for instance, the number of tunable zones is limited (e.g., 16 zones being within 18 or less), there is not involved added integrated piping support mixers to the piping, and the source of reagent is supplied solely from one side of the HRSG, and at one general Y-axis location within the HRSG upstream of an SCR. In other words, the nature of the system 220A, with only 16 tunable zones, no integrated piping supported mixing means added, only one side of the HRSG injection supply, and one general Y-axis location, is representative of a relatively easy piping assembly construction as compared to injection systems that are more complex such as those involving one or more of the following criteria (i) a high number of tunable zones (e.g., greater than 24), (ii) added mixing means to the piping, (iii) multiple Y-axis separated supply locations with each having its own independent tunable zones sets, and (iv) more than one side wall (or a combination of any two or more of side/top/bottom) piping insertion sites into the containment space, as in ones coming from both sides of the HRSG (and/or from a top-down location) coupled with at least one of (i), (ii) or (iii).

The additional or alternative characteristic of a limited number of independently flow controllable zones that are presented to the inflow of the exhaust within the containment space simplifies the piping complexity and is illustrative of a low resolution RRI (e.g., AIG). Each "tunable zone" can be generally defined as an injection system source that can be individually adjusted as to alter the amount of reagent supplied into the flow stream FL. With each of valves VA1 to VA16 shown in FIG. 3A being individually adjusted to alter the flow of reagent (e.g., from the more simplified aspect of on/off or preferably from the aspect of varying adjustability between the two extremes of no-flow and full-flow) there is provided 16 independently controllable or tunable zones for reagent supply. FIG. 3A shows each of manifolds MAN1 to MAN16 with their associated injection ports IP, with each of manifolds MAN1 to MAN16 representing a respective one of the 16 zones (Z1 to Z16—with only Z1 (top) and Z16 (bottom) labeled). The arrangement in FIG. 3A also shows only vertical zone control. That is, while there are 16 independently controllable zones in the one column, each manifold shown sprays out based on the upstream valving across its entire X-axis length via the ports IP (FIG. 3B). As such, an upper region of mal-distribution or high NOx throughput region can be addressed; but a left region of excessive mal-distribution or high NOx throughput may not be corrected due to the vertical zone adjustment capability alone.

Thus, with 16 (vertical spacing controllable only) zones, the FIG. 3A embodiment can be considered an example of a "low resolution" RRI (AIG). As noted, individual zones of 18 or less is also illustrative of a low resolution characteristic zone number. There is also a correlation with achieving lower mal-distribution % values through reliance on high resolution injection assemblies (RRI as in an AIG). For example, to achieve at or below 10%, as in 8%, mal-distribution values there can be expected a need to have one or more of (i) to (iv) applicable: (i) a high number of zones as in 25 or more; (ii) added piping supported mixer attachments in the HRSG relative to the RRI injectors; (iii) a plurality of different (Y-axis separated) RRI injection locations upstream of an SCRconv to work on the flowing exhaust and (iv) a plurality of HRSG wall piping insertions coupled with one or more of (i) to (iii). All of these characteristics of (i) to (iv) are representative of undesirable added complexity and cost. Moreover, when conventional T-H systems are considered, such as those using only a SCRconv (as in a single wall of dual DNX® material SCRconv) there is an associated need for low value (below 10%) mal-distribution values; and, hence, a high resolution RRI if there is any chance of reaching many requisite NOx reduction values (e.g., 96%)).

Thus, in the present application the term "low resolution" in an RRI system is one based on meeting one or more of the following characteristics: (A) piping extending through only one surface of the HRSG (only one introduction location at the top/either side/or bottom); (B) piping supply in only one general Y-axis zone in the HRSG ("general" including the potential for piping from a common main line extending from a common HRSG surface inlet location somewhat upstream and downstream relative to each other, but not separate Y-axis injection zoned piping sets extending through a common or different side walls at different Y-axis locations); (C) not having any added mixing means, as in added plating directed at redirecting injection piping supplied reducing reagent and typically supported on that same piping; and (D) having 18 or less zones. Preferably the level of "low resolution" is an RRI that satisfies two, three or all four, of the above (A) to (D) characteristics, as in the FIG. 3A embodiment which satisfies each of the characteristics (A), (B), (C) and (D) with its 16 zones being fed from piping extending through only one side of the HRSG at a common Y-axis location, and which piping is free of added pipe supported mixing means.

The present invention preferably avoids usage of a high resolution RRI which is made possible by the above described "loose" mal-distribution level potential. Also, in alternate embodiments of the present invention there is featured the noted intermediate level resolution, which is also made possible under the present invention's "looser" mal-distribution flexibility, and can facilitate reaching the uppermost levels of NOx control described above, while still avoiding the complexity of high resolution RRIs. An intermediate resolution RRI is preferably one that satisfies (B) and (C) of the above low resolution categories, and has modified (A) and (D) with modified (A) or (A') featuring the potential of multiple side insertions as in left and right side wall piping set insertions; and with modified (D) or (D') featuring the number of tunable zones being greater than 18 and up to 24 tunable zones.

Figure 3C:
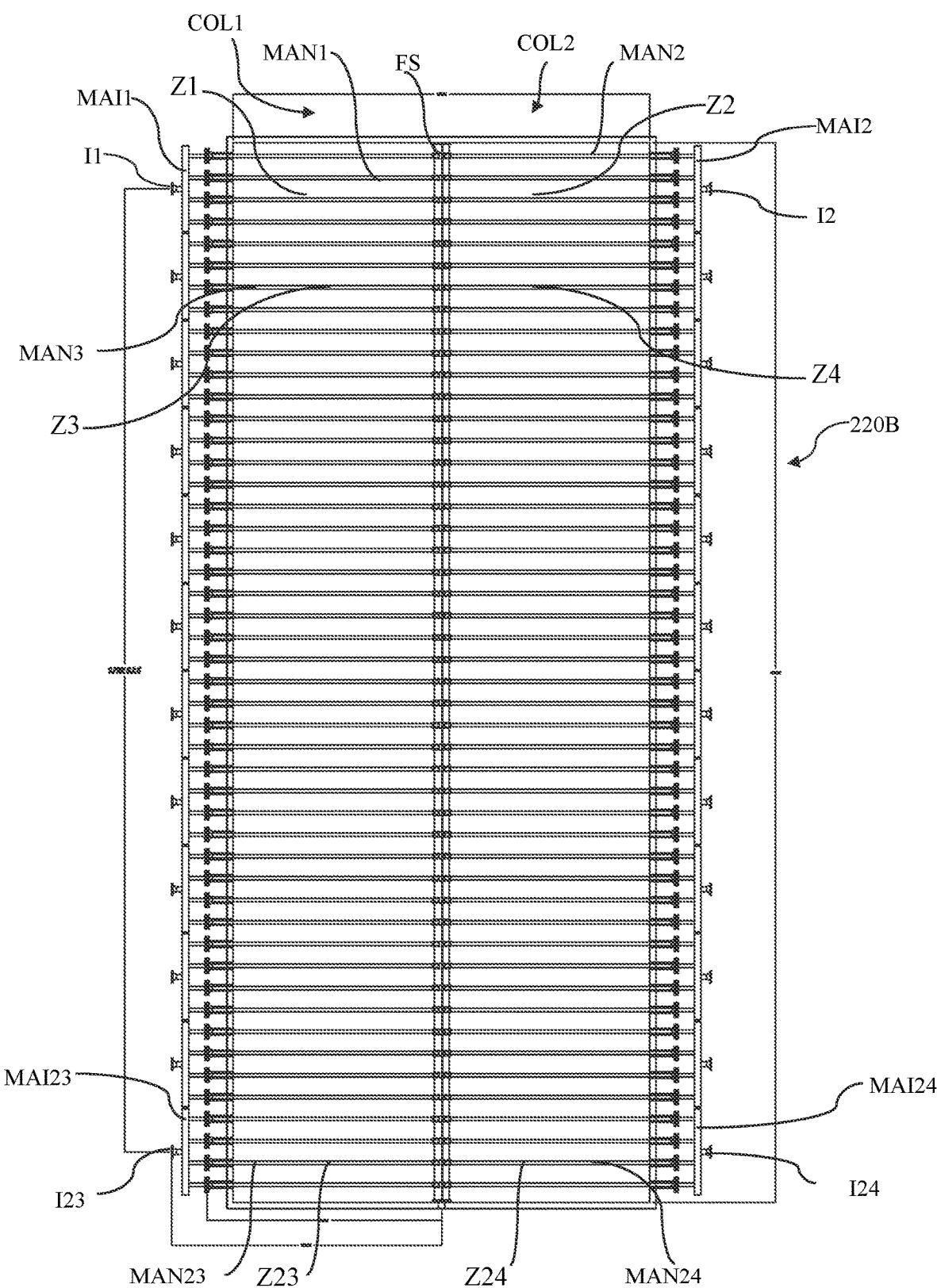
FIG. 3C shows a perspective view of another embodiment of an RRI that is of intermediate resolution (shown with opposite sides entry of the HRSG and with a total of 21 tunable zones, but free of any turbulence generated mixers supported by the RRI piping).

An example of an intermediate resolution RRI can be seen in the compound/reagent supply system 220B (RRI) shown in FIG. 3C, which satisfies (B) and (C), but not (A), based on opposite side wall piping extension through the HRSG, and not (D) based on having greater than 18 tunable zones (24 tunable zones as described below). FIG. 3C features a somewhat similar zoning arrangement as shown in FIG. 3A, but has two columns of zones as represented by columns COL1 and COL2 and 12 horizontally spaced tunable zones in each column (as opposed to the one column of 16 spaced tunable zones in FIG. 3A). Similar source piping such as that shown in FIG. 3A can be used, but in this intermediate resolution RRI, there is source piping positioned on each external side of the HRSG containment structure CS. A central frame structure FS is also featured to support the interior ends of each of the left and right column manifolds. Thus, the source piping is designed to input reagent such as the ammonia sources described herein through each of the injection passageways I1 to I24 (with only I1, I2, I23 and I24 referenced for convenience). As with the FIG. 3A embodiment, there are a plurality of sealed off and stacked independent manifold segments MAI1 to MAI24 (with only MAI1, MAI2, MAI23 and MAI24 referenced for convenience) each feeding reagent into an associated manifold MAN1 to MAN24 (with each manifold being fed by a feed system with valving to provide for the aforementioned individual and independent reagent flow quantity adjustment (on/off or more preferably individually variable with adjustments preferably made by control system monitoring and proactive (e.g., feedback) valve adjustment). Also, there are a plurality of ports IP (not shown in FIG. 3C but equivalent to the ports IP shown in the enlarged view of FIG. 3B).

Accordingly, while the compound/reagent supply system 220B (RRI) has dual side wall inserted piping (and thus does not satisfy the low resolution character (A)); it does satisfy the intermediate criteria; in that is satisfies (B) piping supply in only one general Y-axis zone (since the left and right side wall inserted piping is at a generally common Y-axis location which facilitates interior end support of the manifolds with a common frame structure FS) as well as (C) since it is free of pipe supported mixing means, and (D) as it has 24 or less zones (24 shown in FIG. 3C).

It can be seen that there is a correlation between the characteristics (A) to (D) (as in the number of injection zones) and the ability to avoid areas where a desired amount of the reagent is not supplied to the exhaust to create the desired reagent (NH3)/NOx mix. Thus, a high resolution reagent supply system having extensive piping and porting to enable a large number of tunable injection areas (whether that be by having 25 plus zones, or less than 25 zones per Y-axis location, but a plurality of separated Y-axis injection locations upstream of the SCR. or three sides for injection locations (often resulting in multiple Y-axis locations to provide room) or added pipe supported mixers with, for instance, more than 18 in the number of tunable zones) has the ability to achieve more universal mixing relative to the exhaust flowing thereby and thus a lower mal-distribution % potential (e.g., less areas where there is improper NH3/NOx mixing, and in those areas where there is an injection zone the output of the injection zone is designed with a suitable injection ratio for the passing exhaust based on the independent tunable nature of the injection). While a high resolution RRI supply system can facilitate avoidance of higher mal-distribution levels, the higher resolution and associated added complexity comes at a high cost in materials, assembly and maintenance; and, thus, the avoidance of such higher complexity is beneficial, if there can still be achieved the desired overall emissions reduction such as that generated by regulatory provisions.

The arrangement of the present invention is well suited at providing a lowered need for reagent supply system complexity, while still providing an ERS that can achieve high NOx removal and low reagent (e.g., NH3) slippage as per the reduction levels described above and below under the present invention. The FIGS. 3A and 3C supply systems 220A and 220B are examples of a low resolution and an intermediate resolution supply system, respectively, that avoids the above noted disadvantages of high cost in materials, assembly and maintenance relative to a high resolution RRI.

Figure 3D:
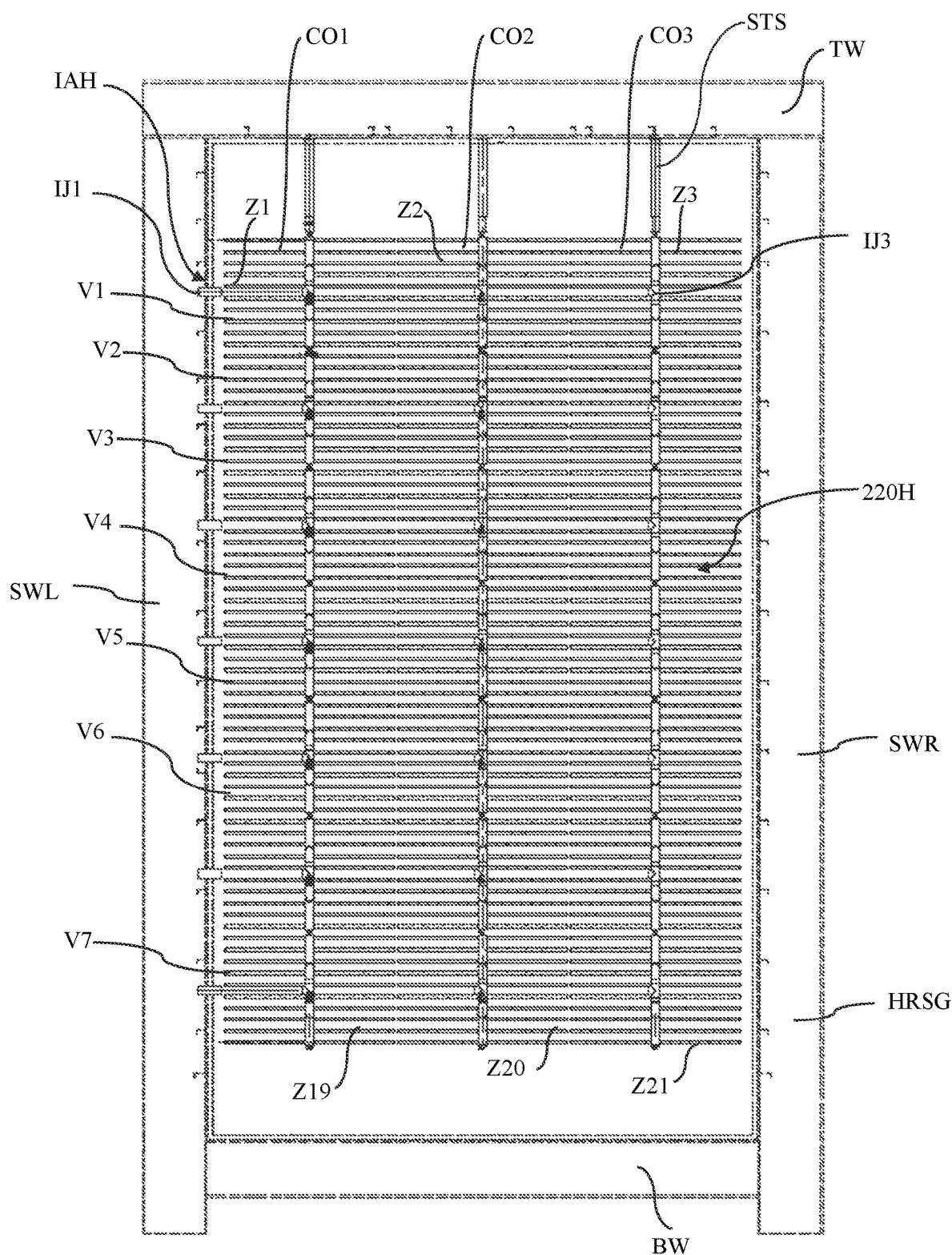
FIG. 3D shows a flow face frontal view of a high resolution 21 zone RRI (e.g., AIG) with flow mixers on the piping, which represents an example of a high resolution RRI embodiment based on the combination of the number of zones and the inclusion of mixers.
Figure 3E:
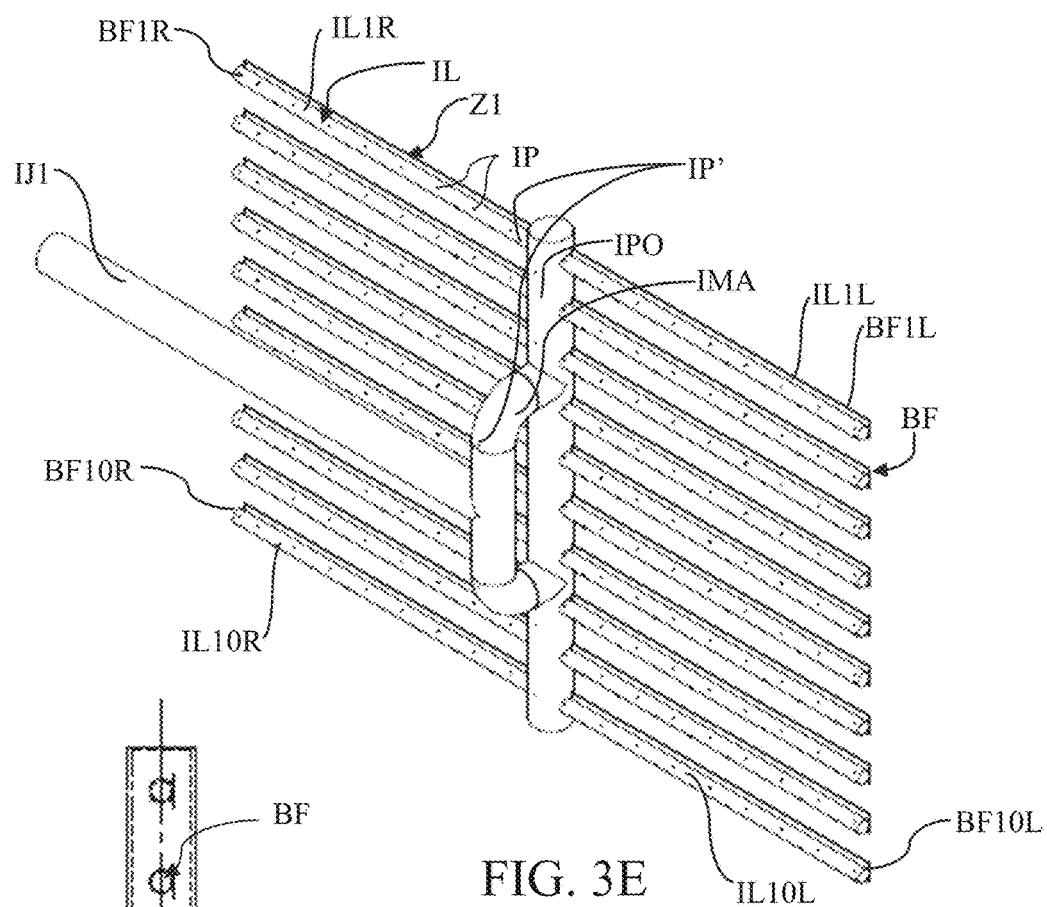
FIG. 3E shows a perspective view of the piping and piping supported mixers of one of the zones (with "each" of the 21 zones based on a common general configuration of piping and mixers) featured in the FIG. 3D RRI.
Figure 3F:
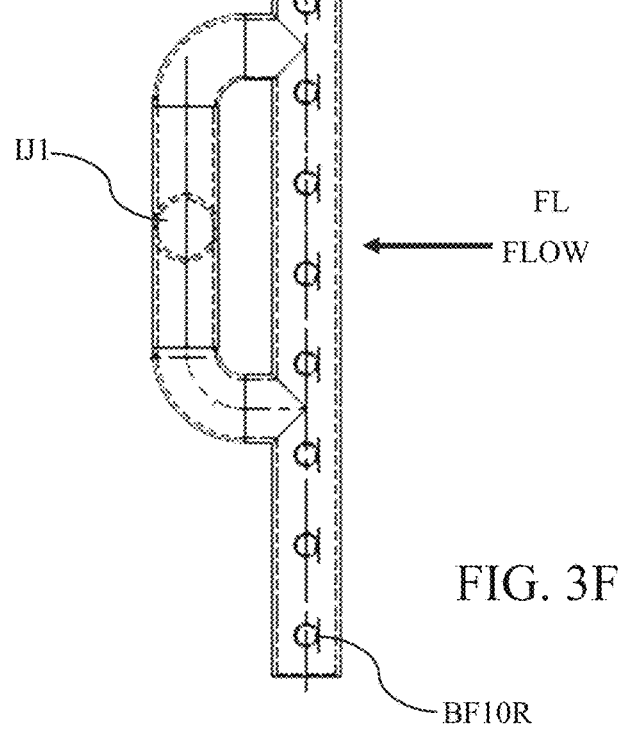
FIG. 3F shows a cross-sectional view of the pipe assembly and mixers for the zone featured in FIG. 3E.

FIGS. 3D to 3F show an example of a high resolution reagent supply system 220H having an injector assembly IAH having 21 tunable zones represented by 3 columns (CO1, CO2 and CO3) and 7 tunable zones at vertical locations V1 to V7 such that, not only can there be modified the injection flow in each of the seven vertical levels V1 to V7, but there also can be modified the independent tunable zones in the left, right and center via the independent columns of CO1, CO2 and CO3 across the X-axis. The RRI 220H has an injector assembly IAH with 21 independent injector conduits (with IJ1 feeding zone Z1 and IJ3 feeding zone Z3 being representative of 2 of the 21).

FIGS. 3E and 3F illustrate injector conduit IJ1 relative to the one zone Z1 shown, and its location on the downstream side of the zone Z1 per the depicted flow direction FL. Further shown is a bi-pass manifold IMA leading to a central manifold/support pipe post IPO that feeds the X-axis piping IL that includes 10 injection lances IL1L to IL10L (only the first and tenth referenced) to the left and 10 injection lances IL1R to IL10R on the right (only the first and tenth referenced). A similar set of inlet pipes such as IJ1 shown in FIGS. 3E and 3F are set up to respectively supply the other 20 zones such that each zone is independently tunable. RRI 220H is shown to have 21 independent zones which is in the intermediate zone number level, but due to the added inclusion of pipe mixers BF on each of the injection lances IL (with BF1L, BFL10 and BFR1 and BFR10 only depicted for convenience) there is a great deal of added complexity as to render RRI 220H a high resolution embodiment. Pipe supported mixing means BF represents added plating that is placed on the upstream of the pipe (e.g., by welding) as to generate turbulence in the flow over the individual injection lances IL, whereupon the injection port feed of reducing reagent intermixes (with the FIG. 3D embodiment feeding the reagent in a common flow direction of the exhaust).

FIG. 3D further shows the high resolution RRI 220H in its support relationship in the space of containment structure CS represented by the interior surface of the HRSG featuring left side wall SWL, right side wall SWR, top wall TW and bottom wall BW. There is also shown Z-axis frame structure struts STS supports to facilitate central suspension positioning of the entire RRI. In this embodiment the feed piping represented by bi-pass manifold IMA and the central manifold/support pipe post IPO are also provided with independent ports drilled therein as to avoid blind spot areas relative to the comprehensive RRI shown in FIG. 3D. Further, although not shown, there would be positioned suitable plating to cover the peripheral area of the 21 zone flow facing region as to preclude peripheral exhaust slip past the SCR reactor shown.

A conventional sourcing system (not shown) can be used to supply the reagent to the injectors of the supply systems 220, 220A,220B and 220H, with a non-exclusive example of such a conventional sourcing system being found in U.S. Pat. No. 6,550,250 B2 to Mikkelsen et al.

Compound/reagent supply system 220 (or 220A or 220B—with 220 used below generically to represent each of 220, 220A and 220B (as well as 220H such as in a retrofit situation or wherein a high resolution RRI is deemed acceptable despite the added complexity and cost absent a contrary indication) is designed to supply, in an upstream region of the ERS, a reagent compound suited for use under the present invention. The schematic presentation in FIG. 2A is thus representative of, for example, an ammonia supply zone that occupies a limited linear length region (e.g., the interior piping occupies some length of the HRSG limited length/volume to be afforded the ERS of the present invention-which is generally relatively minimal for 220 with its single Y-axis insertion location).

The reducing reagent (e.g., NH3) provided by supply system 220 into exhaust gas E containing the NOx to be reduced is mixed and distributed to the concentration criteria for achieving a desired NH3/NOx ratio to achieve expected ERS performance. Increasing the NH3/NOx ratio will help in increasing the NOx conversion in the SCR reactor, but this will also increase the NH3 slip after the SCR reactor. The NH3 supply amount can be adjusted via a suitable controller (e.g., see controller CN in FIG. 4A) by appropriate sensing (e.g., monitoring the overall slippage level of NH3 and/or NOx downstream of SCR2 and potentially also SCR1, such as with the aforementioned NOx and reagent slip sensing means) and a feedback and/or feedforward control loop relative to the controller to adjust the NH3 injected supply amount.

Thus, an aspect of the invention includes the compound/reagent supply system 220 being in communication with a controller such as controller CN (or a sub-component thereof if the controller CN is one that is also associated with general control of the T-H combination (e.g., a sub-control associated with ERS functioning)). The controller CN (whether the noted generic T-H combination controller with ERS function sub-control or a dedicated, independent ERS controller) can include non-transitory code or instructions stored in a machine-readable medium (e.g., memory) and used by a processor to implement the techniques disclosed herein. In certain embodiments, the controller CN may utilize the memory to store instructions (e.g., code) and the processor (e.g., multiple microprocessors, one or more "general-purpose" microprocessors, one or more special-purpose microprocessors, and/or some other processor configuration) to execute the instructions. The memory may store various tables and/or models (e.g., software models representing and/or simulating various aspects of the ERS, as well as historical data based on past performance, as with similar variables as in catalyst type and loading relative to known exhaust flow characteristics). The various input signals to the controller may include turbine outputs (e.g., temperature, flow rate), emissions concentrations (e.g., NOx concentration), or other operating conditions of the T-H combination).

The output signals may include an adjustment to an injection command for the reagent supply system 220 (as in an AIG when an ammonia injection grid is utilized) to adjust the amount of NH3 transferred from the respective tunable zones to the exhaust flow E prior to entering the first in line SCR (SCR1 described below as part of a catalyst reactor assembly) or each of two RRIs (e.g., AIGs) as in the additional ERS' embodiment of the present invention described below). The controller CN may utilize one or more types of models (e.g., software-based models executable by a processor). For example, the models may include statistical models, such as regression analysis models. Regression analysis may be used to find functions capable of modeling future trends within a certain error range. Association techniques may be used to find relationship between variables. Also, the data utilized with the models may include historical data, empirical data, knowledge-based data, and so forth. Controller CN can also be hard wired to any sensing means utilized or configured to operate solely or partially in wireless fashion with the sensing means (e.g., transmitting sensors and corresponding receiving units that provide data to the processing system (e.g., processor circuitry for carrying out the above described functioning)). A feature of the present invention includes the ability to loosen the level of rigidity associated with setting up the NH3/NOx mal-distribution value ahead of at least the SCR1 and preferably both the SCR1 and SCR2, and thus the controller can be set to provide and maintain that less strict mal-distribution Xsd.

For instance, conventional TH-combination configurations (often using independent body OC and/or ASC at perceived strategic locations within the HRSG) typically attempt to satisfy the emission standards through maintenance of the mal-distribution level at or below 10% as a maximum value. Under the present invention, while such "lower" or "tighter" value mal-distribution levels will work well, the present invention also provides for the freedom to allow for higher mal-distribution levels than the aforementioned maximum value level sought under that prior art (relative to a steady state mal-distribution operation level). For instance, a new maximum level mal-distribution level of, for example 15%, leading up to SCR1 is featured as an aspect of the present invention. For example, the present invention is inclusive of configuring and/or setting the controller to allow for, via RRI1 (e.g., an AIG1) supply, a mal-distribution value of greater than 10% and less than or equal to 20%, with a greater than 10 to 15% range being illustrative of a preferred range reaching SCR1, and a greater than 10 to 20% range being illustrative of a suitable range reaching SCR2, which ranges are well suited for handling of anticipated NOx reduction and minimized slip levels requirements such as those values for NOx reduction and ammonia slip being >95% (including values of 96, 97, 98 and 99%) and ≤5 ppm, (including values of 4, 3, 2, 1 ppm), respectively.

Further, the ERS described above (and ERS' described below—with or without integrated TG) represents an efficient emission reduction system means ("or SCR Reactor") that is considered available for alternate uses. As for example, reducing NOx to the noted levels while avoiding reagent slip (also at the noted levels described herein) relative to alternate sources of NOx containing exhaust input (e.g., other than a turbine) as well as relative to different exhaust flow containment structures other than the heat recovery system (e.g., HRSG) described herein. However, the SCR Reactor of the present invention (ERS or ERS') is designed to be particularly well suited for handling the NOx output of a turbine such as those described herein with exhaust being fed to a heat recovery system such as an HRSG.

ii. Catalyst Reactor Assembly (Embodiment 1 Example)

Relative to the illustrated embodiment of the present invention exemplified in FIG. 2A there is featured catalyst reactor assembly CRA (as part of the illustrated ERS) which in the FIG. 2A illustrated embodiment is downstream of supply system 220 and includes first and second selective catalytic reduction reactors (SCR1 and SCR2) referenced in FIG. 2A by 210A and 210B together with an intermediate turbulence generator (TG) as in a static mixer (SM) referenced in FIG. 2A by 230.

a) SCR1 (and/or SCR2)

SCR1 (as well as SCR2—whether SCR2 is the same as SCR1 or different than SCR2—with reference to "SCR" in this paragraph being in reference to SCR1, SCR2, or both when in appropriate context) of catalyst reactor assembly CRA can take on a variety of forms. According to an exemplary embodiment, SCR comprises base metal catalysts, typically utilizing a titanium dioxide carrier impregnated with the active components (e.g., oxides of tungsten and vanadium), and/or any suitable other NOx reduction catalyst may be utilized in the systems and methods. The SCR should be suited for handling the exhaust flow temperature reaching it as to provide for a suitable life cycle. Embodiments under the invention are inclusive of having SCR1 and SCR2 being the same (as in entirely the same in configuration, SCR catalyst material, SCR substrate, and SCR frame structure) such that a universal approach can be taken when assembling the walls for SCR1 and SCR2. Alternate embodiments, however, are inclusive of having SCR1 and SCR2 not exactly the same, although potentially having one or more of the remaining attributes in common, as in having a different catalyst material on SCR1 as compared to SCR2, but a common configuration. For instance, in view of the downstream positioning of SCR2 (and hence typically a cooler location (absent the addition of a heater between SCR1 and SCR2, which is possible under the present invention, but presents generally undesirable added operation fuel and/or power usage and/or backflow with associated downsides; and thus the ERS is preferably free of any dedicated catalyst temperature heater)) the SCR2 catalyst material can include materials that are different than that of SCR1. For instance, the SCR2 at a cooler location may include PGM material that is not present in SCR1 or a higher PGM load as compared to the upstream SCR1, as in Pd or more Pd in SCR2 as compared to SCR1 as to reduce the potential for PGM (e.g., Pd) volatility.

Further the SCR (SCR1 and/or SCR2) can be either one that is single functioning (designed with a focus on NOx reduction) or multi-functional (such as a dual function SCR designed with a focus on NOx reduction as well as, for example, a secondary function as in an oxidizing catalyst (OC) of HC, CO and VOCs as well). Still further, a triple functioning SCR or an alternate dual functioning (with ammonia slip avoidance focus in place of an OC function or in place of the non-PGM zone or layer as to have an OC and ASC dual function) are featured under the present invention. For instance, an added avoidance slip catalyst ASC PGM loading is further envisioned under aspects of the invention as in a third zone on a common substrate (e.g., an upstream OC zone without SCR material/an intermediate SCR only zone and a downstream ASC zone); or relatively less or no-PGM SCR upstream/ASC alternate dual zone arrangement, or OC PGM/SCR no PGM alternate dual zone configuration. The first, second (and third or more when present) zones are preferably in the noted upstream to downstream listing sequence, although alternate embodiments include having alternate zone sequences if the requirements dictate. In addition, particularly from the standpoint of avoiding relatively high pressure losses through the HRSG, the SCR1 and/or SCR2 are stationary emission control catalysts such as those with monolithic catalyst bodies, as in corrugated or honeycomb monolithic catalytic bodies with encompassing structural framing to withstand stacking loads. Preferably the SCR1 and SCR2 are provided as independent wall formations, with each wall made up of (relative to the Y-axis length of the HRSG) a single metal containment structure or integrated (in the linear length) multi-containment unitary wall building block structures with respective SCR material per containment structure, with the former single containment structure arrangement being typically well suited even for the higher removal rates of NOx and low reduction reagent slippage amounts mentioned above.

Examples of suitable stationary emission control catalysts that are available on the market and well suited for the nature of primary intended use under the present invention, include Umicore AG's "DNX" type catalysts. Umicore's DNX® catalysts are based on a corrugated fiber-reinforced titanium dioxide (TiO2) carrier plate. The plates are homogeneously impregnated with the active components, in that the entire ceramic plate is composed of a uniform distribution of tungsten trioxide (WO3) and vanadium pentoxide (V2O5). An illustrative material composition table for the noted "DNX" type catalysts can be seen in Table 1 below.

TABLE 1

| (sourced from Safety Data information for Umicore "DNX" type catalyst) | | |
|---|---|---|
| Catalyst DNX Version 2.1 US | SDS Number 300000005837 Components | Revision Date: Jun. 8, 2020 |
| Chemical Name | CAS-No | Concentration |
| titanium dioxide | 13463-67-7 | <=89.99 |
| silica | 7631-86-9 | <=19.99 |
| tungsten trioxide | 1314-35-8 | <=9.99 |
| glass, oxide, chemicals | 65997-17-3 | <=9.99 |
| divanadium pentaoxide | 1314-62-1 | <=4.99 |

The aforementioned "DNX" series of Umicore AG catalyst is inclusive of the aforementioned "single" or "non-dual" type SCRs, with an example of a suitable constitution for the "single" version being U.S. Pat. No. 7,431,904 B2 to Høj, while examples of the dual function catalyst DNX type catalyst being represented by WO 2014/124830 A1 to Castellino et al. and WO 2017/220473 A1 to Pedersen et al. As seen therein, the dual "DNX" catalyst can include a corrugated fiber-reinforced titanium dioxide (TiO2) carrier plate with the plates homogeneously impregnated with the active components such that the entire ceramic plate is composed of a uniform distribution of tungsten trioxide (WO3) and vanadium pentoxide (V2O5), plus (in conjunction with providing a dual function attribute) a zone (e.g., a downstream zone under illustrative embodiments of the present invention) that features the addition of an impregnated precious metal solution (as in impregnation with a PGM such as a palladium solution with an example described in WO 2017/220473 A1).

As earlier noted, under aspects of the present invention each of SCR1 and SCR2 can be represented by a common (preferably both commonly configured and common composition throughout) catalyst. Thus, in the event of "DNX" type catalyst usage, there can be featured a set of the non-dual function "DNX" type catalyst described above at each of SCR1 and SCR2; or, alternatively, each of SCR1 and SCR2 can be a dual function "DNX" type catalyst such as that described in WO 2017/220473 A1.

Under certain environments of intended usage, rather than each of SCR1 and SCR2 being the same, one or both of the composition or configuration can be altered. For example, in the event of "DNX" type catalyst usage, there can be featured SCR1 being of a non-dual "DNX" type and SCR2 of a dual "DNX" type catalyst. Under still other environments of intended usage, a reversed arrangement can be implemented featuring SCR1 as the dual "DNX" type and SCR2 of the non-dual "DNX" type.

Also, in view of environments of intended usage for the present invention being inclusive of the aforementioned larger sized HRSGs, there is utilized the aforementioned SCR catalyst "wall" for the catalyst reduction assembly with SCR1 constituting a first wall and SCR2 representing a second wall, that is spaced and independent of SCR1 (e.g., no direct contact between SCR1 and SCR2 walls other than through an indirect contact via a common supporting HRSG containment structure CS region). Thus, in FIG. 2A of the present invention reference numbers 210A and 210B are representative of such "walls" provided in the containment structure CS in the HRSG. Further, under the noted desire to avoid an increase of the size (as in a length increase) to accommodate, for example, larger NOx outputting turbines of the T-H combinations, there is avoided too much spacing (despite the advantage of such added spacing providing added mixing time before SCR contact) between the outlet end of the SCR1 and the inlet end of the SCR2, with a spacing of 8 to 15 feet being well suited for many intended usages under the present invention.

Again, in view of the large size potential usage of the SCR1 and SCR2 under the present invention, each wall is preferably made up of modules, which in turn are made up of stacked (and preferably fixed, as by welding) modular units. Designs of modular units that are suited for assembly into modules, which in turn can be combined (e.g., stacked on top of each other and/or stacked side by side and secured to form the catalyst SCR wall) can be seen in U.S. Pat. No. 8,323,600 B2 to Thøgersen which discloses a corrugated monolithic substrate featuring plates and wave corrugated sheets therebetween; and a peripherally encompassing box, with the box configuration being well suited for anticipated "stacked" wall formations under the present invention.

For example, the aforementioned Umicore's DNX® catalyst is supplied in aluminized carbon-steel elements (illustrative of the above noted "metal containment structure") with a square cross-section of 466 mm×466 mm (18.4 inches×18.4 inches), which modular units can be carried by two personnel and then stacked and secured to one another (e.g., relative to a plane perpendicular to the linear length of the HRSG) to provide a module (inclusive of module framing), which module (comprised of a selected stack configuration of modular units held together with suitable framing) can be, for example, fork-lift trucked and craned into a desired wall formation location in the HRSG (e.g., see FIG. 8). Thus, under this aspect of the SCR wall formation under the present invention, the single elements or modular units are assembled to form modules, having multiple modular units joined together, which modules represent building blocks that represent multi-wall segments to be assembled together to form the wall. Each SCR wall is preferably of only one modular unit in linear depth or length as to avoid too much backpressure (e.g., by tack welding the elements in a support frame suited for the preferred horizontal reactor applications).

Figures 5A, 5B:
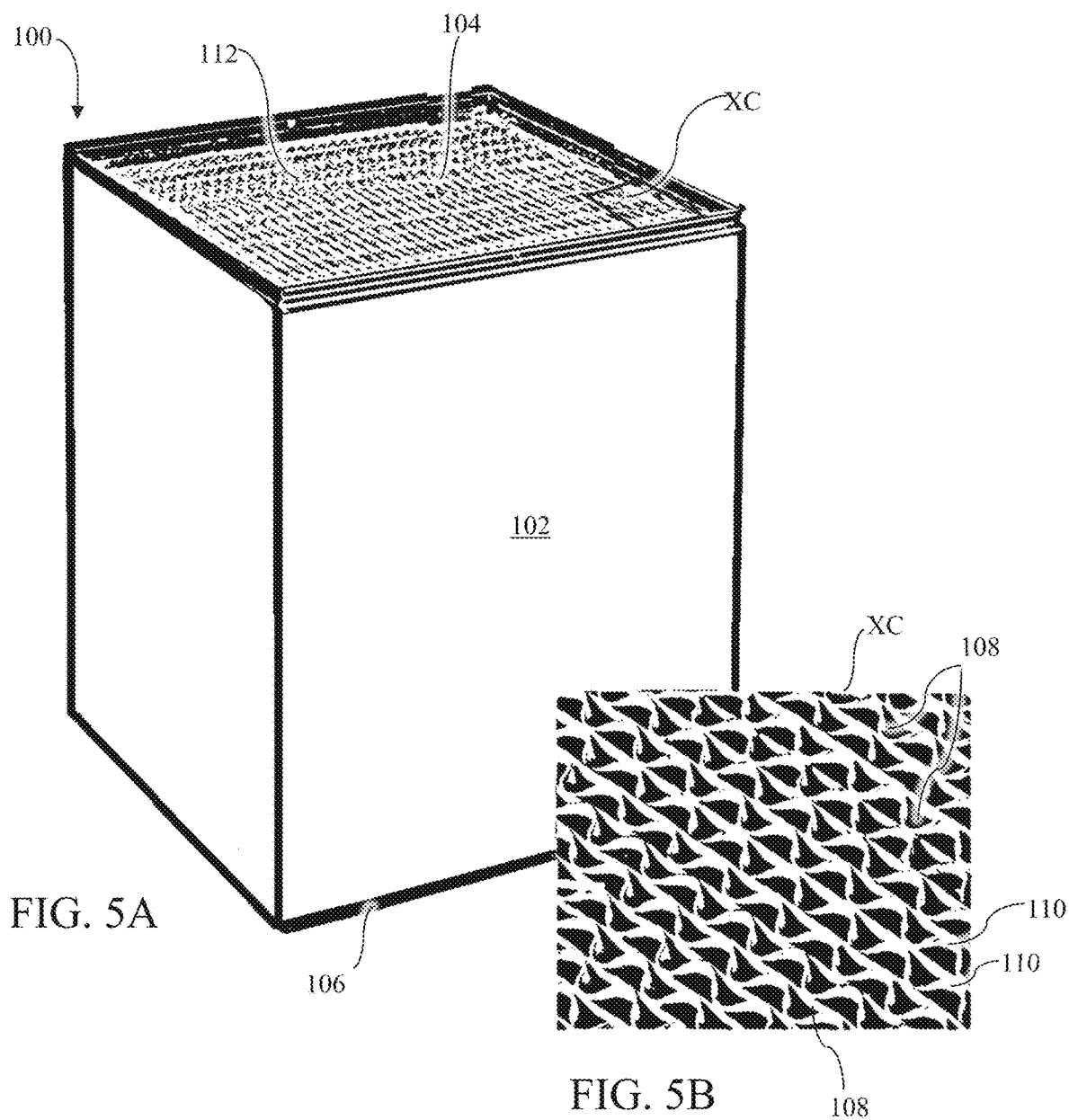
FIG. 5A shows an SCR individual reactor modular unit in a first orientation.
FIG. 5B shows an enlarged depiction of the designated section in FIG. 5A.
Figure 5C:
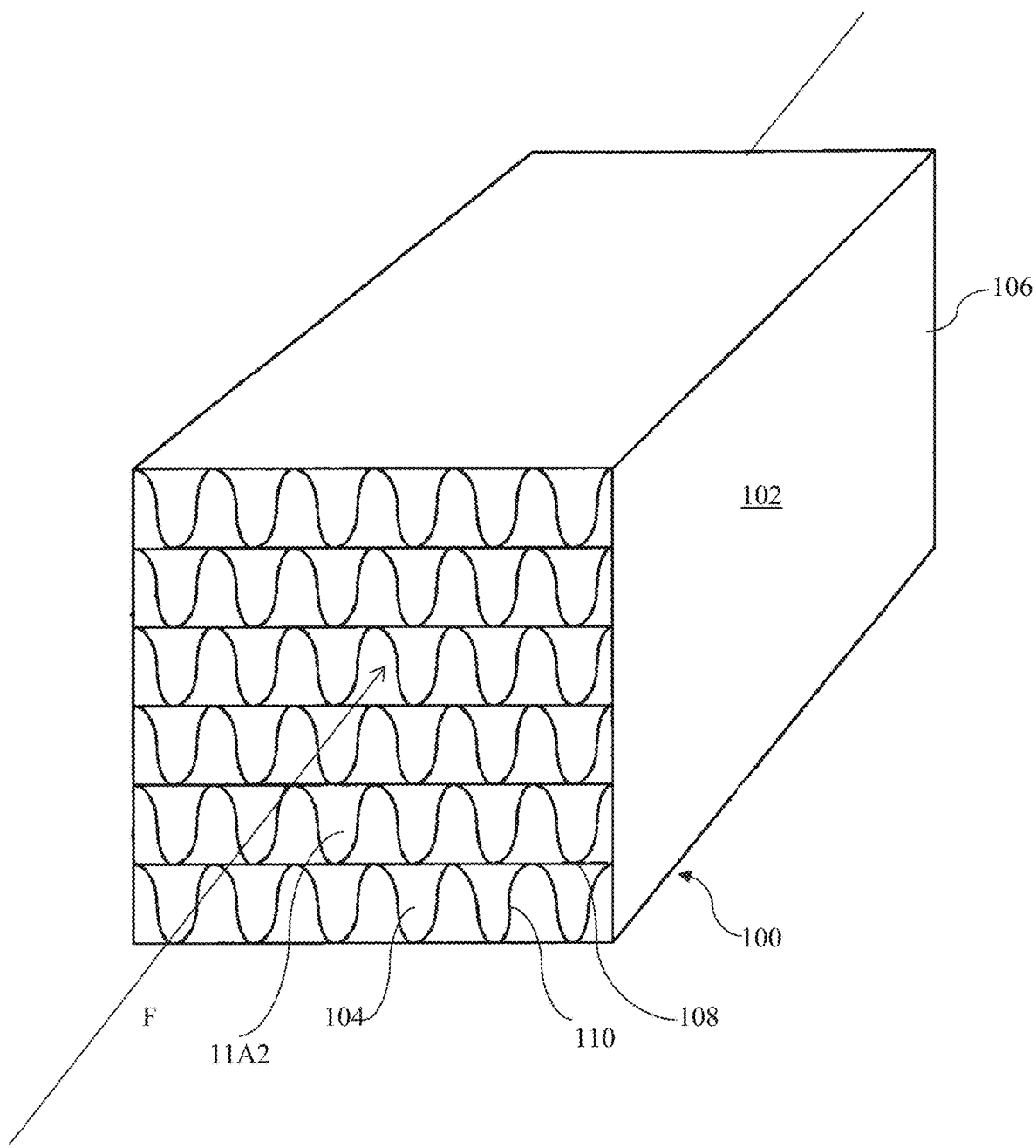
FIG. 5C shows the SCR individual reactor modular unit of FIG. 5A in a different (horizontal flow through) orientation.

With reference to FIGS. 5A-5C there is provided a further discussion of modular unit 100 having peripheral metal wall housing 102 with open inlet end 104 and open outlet end 106. Extending within the area defined by the interior surface of housing 102 for the full length thereof, from inlet 104 to outlet 106, there is provided the aforementioned corrugated fiber-reinforced titanium dioxide (TiO2) carrier plate with the plates homogeneously impregnated with the active components such that the entire ceramic plate is composed of a uniform distribution of tungsten trioxide (WO3) and vanadium pentoxide (V2O5) (as well as in dual function situations a PGM material of palladium).

Depending on the environment in which the ERS is utilized there may be incentive to have PGM loading on all or a portion of the SCR. For example, there can be a variation in the PGM material loading, when present, directed at the emission reduction (e.g., the Pd provides an oxidation function as to oxidize particularly CO to CO2). This variation can be seen in the length of PGM (loading of preferably Pd, Pd+Pt, or Pt) starting from the downstream end 106 and extending toward the upstream end in preferred embodiments. For instance, SCR1 can be provided with 0% length PGM loading (no PGM supplied) as well as SCR2. Alternatively, there can an arrangement wherein each of the SCR1 and SCR2 are provided with 100% PGM loading along the respective full lengths of SCR1 and SCR2 between outlet 106 to inlet 104 (common PGM loading over the full length or a gradient arrangement, as in lower at inlet and gradually rising to maximum load at the outlet region). Still further variations in the percentage length coverage of PGM addition from outlet to inlet are also featured, as in each of SCR1 and SCR2 with 50%, as to have each of SCR1 and SCR2 having a dual function. There is also featured a sliding zone length percentage potential wherein either or both of SCR1 and SCR2 are altered to any percentage point between 0% and 100% to better suit an intended environment of usage as in 25% PGM coating coverage on SCR1 and 75% PGM coating coverage on SCR2, as but one example.

Again the PGM coatings are designed to be suited for the intended usage as in Pd or Pt directed at oxidation catalyst (and/or ASC) effect and the percentage of coverage suited for the PGM on either the SCR1, the SCR2, or both being variable to suit the desired environment (e.g., fuel type, turbine size, etc.). The manner of PGM inclusion can vary as well as in a PGM solution absorbed by a common full length no-PGM washcoat or the addition of an overlay added washcoat containing PGM layer to an underlying non-PGM layer (or vice versa with non-PGM overcoat and PGM undercoat).

In addition, while the noted Umicore's DNX® catalysts (with ceramic plate with a uniform distribution of tungsten trioxide (WO3) and vanadium pentoxide (V2O5)) is illustrative of an SCR material and configuration well suited under embodiments of the present invention, various other types of SCR materials and configurations are also contemplated under the present invention. For instance, where the environment of the T-H combination is suitable, alternate SCR material, as in micro-porous material (e.g., zeolites) alone, or as supports for added catalytic material (e.g., iron and/or copper or PGM zoning are illustrative), are featured.

FIG. 5B represents an enlarged depiction of section XC shown in the inlet end of modular unit 100. In FIG. 5B there can be better seen the aforementioned carrier plates 108 that act to sandwich the internal corrugated layer 110 integrally joined therewith under the catalyst formation process. A catalytic coating is provided to the combination carrier plates and sandwiched corrugation sheets in accordance with standard practice as in washcoat loading techniques (e.g., dipping with vacuum and/or pressurized washcoat slurry flow generation). This coating has the catalytic material content such as described above (with and without PGM loading).

FIG. 5C shows a further view of modular unit 100 in a typical orientation assumed in a horizontally oriented HRSG with a schematic designation of exhaust flow direction F (shown as well as representing a central axis for the modular unit 100 which extends parallel with the extension direction of the HRSG (and perpendicular to the SCR catalyst inlet reception wall face 112 provided as the initial first contact for the catalytic material at inlet 104 of modular unit 100)).

Figure 6A:
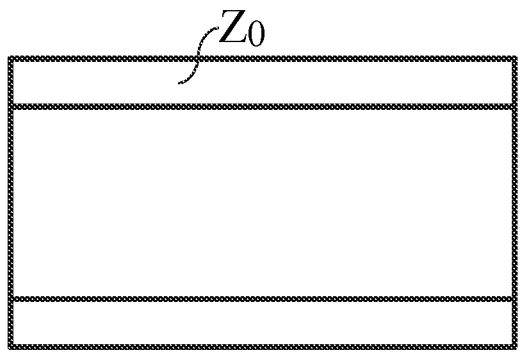
FIG. 6A to 6D show examples of different SCR substrate coatings on a common supporting substrate with FIG. 6A being SCR and free of added PGM (e.g., single function), FIG. 6B showing a dual function SCR with downstream PGM addition.
Figure 6B:
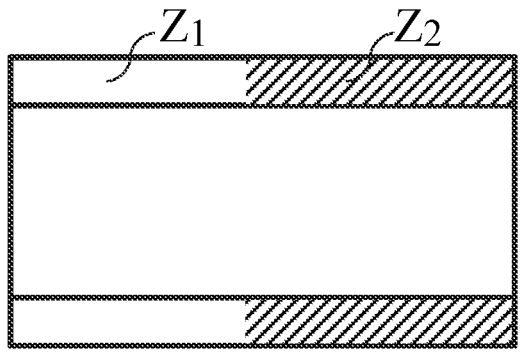
Figure 6C:
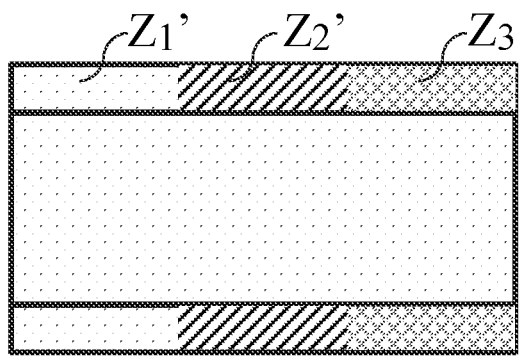
Figure 6D:
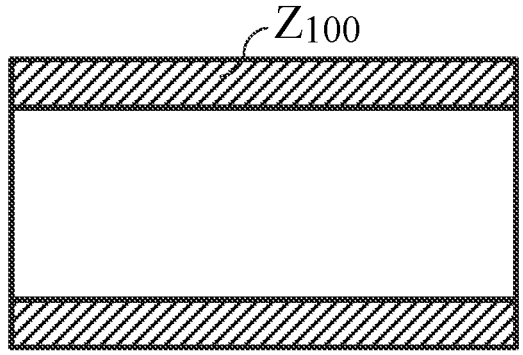

FIGS. 6A to 6D show schematic depictions of the corrugation supports such as those shown in FIG. 5A from an inlet to outlet length with washcoat coating examples like those described above. That is, FIGS. 6A to 6D show examples of different SCR substrate coatings with FIG. 6A being free of added PGM and thus has a 100% PGM-free zone Zo (for an example reference is made to the earlier noted Umicore's DNX® catalysts that are based on a corrugated fiber-reinforced titanium dioxide (TiO2) carrier plate, with the plates being homogeneously impregnated with the active components, in that the entire ceramic plate is composed of a uniform distribution of tungsten trioxide (WO3) and vanadium pentoxide (V2O5) but no PGM in this "non-dual" instance). FIG. 6B shows a dual function SCR with downstream PGM addition (in this case about 50% from outlet toward inlet inclusion of PGM, as in one for ammonia slip removal ASC in zone Z2, while zone Z1 is PGM-free and thus can have the same composition of that of Zo). FIG. 6C shows a three-zone SCR; with OC PGM no-SCR zone Z1'/SCR no-PGM zone Z2'/ASC SCR with PGM zone Z3 in sequenced zones, as in a 33⅓% each coverage arrangement. FIG. 6D shows a 100% length SCR with PGM coating example (gradient PGM being an example) represented by zone $Z_{100}$. Also, various under/over coating compositions are also contemplated for any one of the aforementioned zones, as, for example, having an ASC zone with underlying (first) SCR no-PGM layer (closer to the supporting substrate) and an overlying (second) ASC with PGM material layer (in contact or spaced outward via an intermediate coating layer from the first layer and having less, the same or more length relative to the underlying first layer).

Under examples of intended usage of the ERS of the present invention having SCR1 and SCR2 formed of stacked modular units 100, there is formed SCR walls W (such as represented by 210A and 210B in FIGS. 2A and 2B) suited to generally fill in the area represented by the noted containment space of the containment structure CS for the HRSG. For instance, there is featured modules MO comprised of a plurality of interconnected modular units 100 by attaching the modular units to each other (e.g., tack welding) preferably together with attached, peripheral frame structure SF support.

Figure 7:
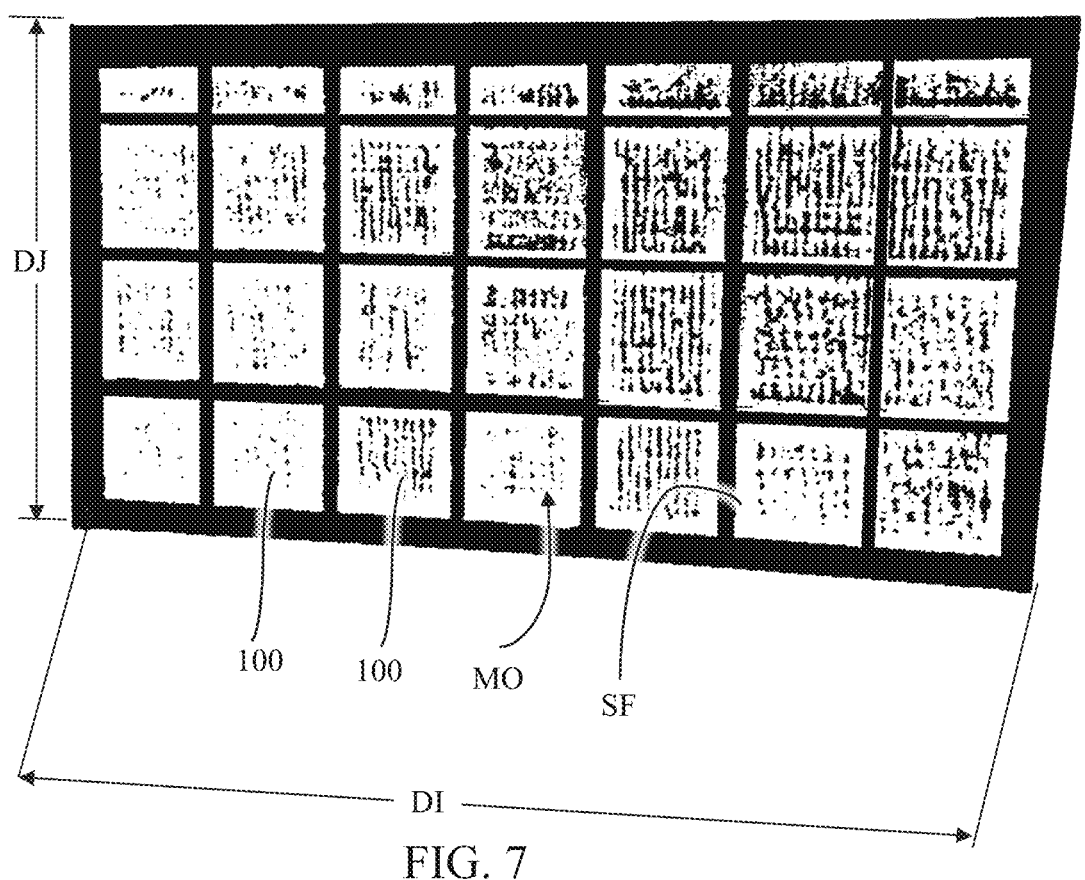
FIG. 7 shows an SCR reactor module made up of a plurality of the FIG. 5A modular units with associated module framing, which modules are, in turn, designed to be stacked and fixed within the supporting frame structure of the heat recovery system (e.g., HRSG) shown to form the SCR reactor wall within the exhaust flow stream in the HRSG.

With, for example, a cross-sectional area of the CS of the HRSG being 35 feet wide and 70 feet high, and with each modular unit about 18.4×18.4 inches (466 mm×466 mm) with framing structure SF joined to the periphery of the combined modular units 100 as per FIG. 7, there is approximately an area of 20×20 inches when considering both the modular units and framing). With such an approximation there would be needed about 21 modular units positioned across the width of the CS and 42 modular units vertically arranged to represent the height of the CS. To make such a wall formation more practical, the modules MO are provided as they represent more easily handled (e.g., crane lift and insertion into the HRSG) SCR wall subset structures. Thus with reference to FIG. 7 and using the estimated 20 inch×20 inch per modular unit occupation, the dimension DI is about 7×20 inches or about 140 inches in distance, and DJ is about 3.5×20 inches or 70 inches in length.

FIG. 7 shows an example of such a module MO that can be formed of a 3.5 modular unit×7 modular unit interconnected combination comprised of modular units 100 and framing SF. Thus upon reorientation of that which is shown in FIG. 7 such that the 7 interconnected modular unit row is arranged vertically, there can be positioned six of modules MO in a vertical stack as to provide the 70 feet height in the SCR wall (6×140 inches is 840 inches or 70 feet), and with 6 of the modules MO arranged in side by side fashion the width of 35 feet is achieved (6×70 inches is 420 inches or 35 feet). Hence, FIG. 7 shows an example of one such module MO having a 3.5 modular unit by 7 modular unit integrated sub-frame SF combination that can be inserted by crane of the like within the HRSG to define a sub-component of a to be formed SCR wall W that can be fastened (e.g., welded) to like configured modules.

SCR walls W are thus comprised of a plurality of stacked and fixed in relative position modular units 100, with the modular units also preferably being secured in multiple-set fashion prior to wall W assembly, as in the noted multiple rows and columns sub-sets represented by modules MO that are stacked/joined together to occupy the CS within the HRSG (optionally also with sealing material (e.g., sealing "pillows" or added blocking baffle plating) about the periphery of the combined sub-sets of MO, although the SCR1 and SCR2 sequence provides the benefit in many environments of the present invention of avoiding having to take such added steps in sealing relative to the general seal relationship between the containment structure and wall W of the respective SCR). The modules MO can be stacked themselves in location within the CS of the HRSG, with an on-going stacking process for MOs being depicted in process in FIG. 8 (showing modules MO1 and MO2 already secured within the HRSG, and MO3 being positioned for insertion within an HRSG to form the ultimate SCR wall W). Again, suitable wall peripheries under examples of HRSG dimensions featured under the present invention include height/width (transverse to flow direction)/depth or length (in the exhaust flow direction) of H/W/L dimensions such as H=70 to 80 feet; W=30 to 45 feet and L=120 to 130. The FIG. 7 sub-set or module M0 is suitable for formation of each of the noted SCR reactors SCR1 and SCR2.

b) Turbulence Generating Means (e.g., Static Mixer)

Figure 9:
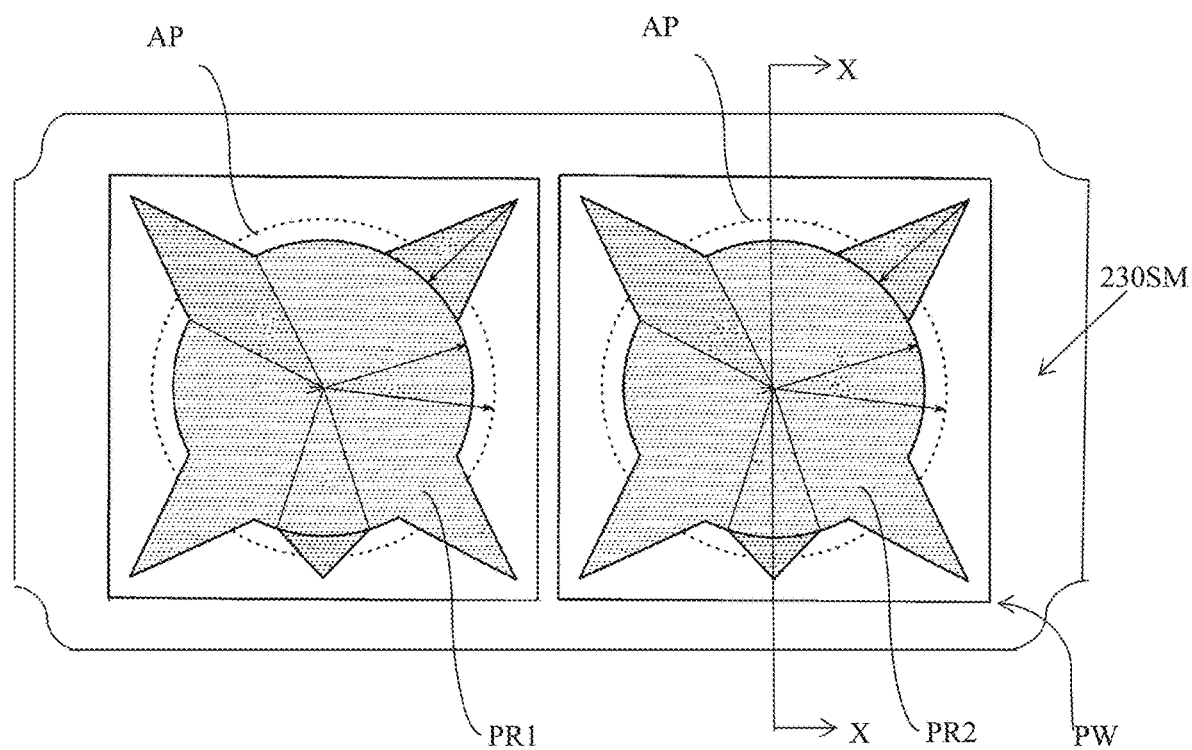
FIG. 9 shows a schematic, segment only, front elevation view (looking at the downstream wall surface) of a turbulence generator in the form of a static mixer wall with a plurality of shaped protrusion openings.
Figure 10:
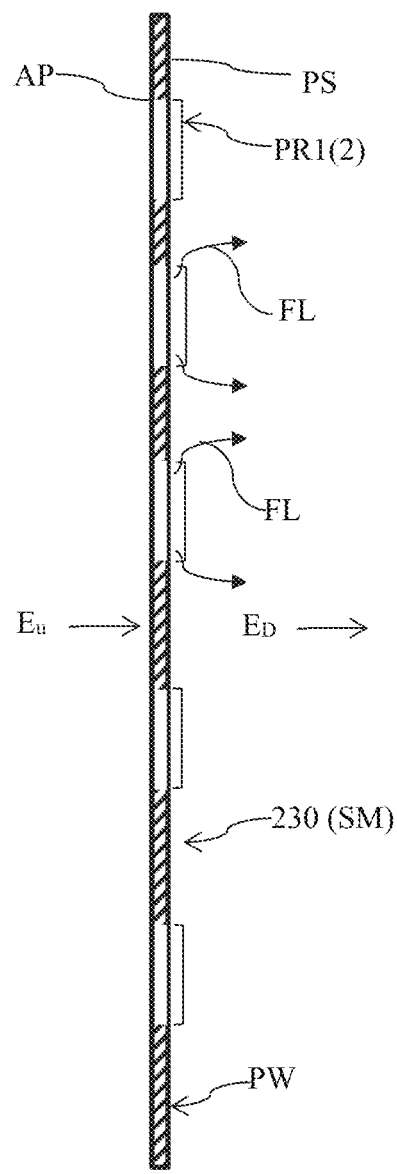
FIG. 10 shows a left side edge view taken along X-X cross section of the solid plate (less segmented) with protrusions of FIG. 9, which is designed to promote turbulence relative to flow through and by-pass NH3 and NOx in the exhaust flow without generation of too much back pressure.

As shown in FIG. 2A, between SCR1 and SCR2 there is provided turbulence generator 230 or TG. In the illustrated embodiment shown in FIG. 2A, turbulence generator 230 is a static mixer SM. Static mixer SM is well suited for handling the preferred environments for usage of the ERS of the present invention with a suitable static mixer being one that features a wall type plate(s) PW such as shown in FIGS. 9 and 10. FIG. 9 shows a schematic, partial view of a turbulence generator in the form of a static mixer (SM) and having a solid plate with projection outlets designed to enhance static mixing performance for residual reducing reagent such as residual ammonia passing through SCR1 as due to the less restrictive mal-distribution levels associated with the RRI1 (e.g., an AIG1) under the present invention. There can also be anticipated some peripheral bypass reducing reagent (e.g., ammonia) slipping past the SCR1 through passageways between the periphery of wall W and the CS of HRSG. This peripheral ammonia bypass is possible even with added sealing efforts (e.g., mechanical seals or high temperature fiber sealing material) due to, for example, the flow rates and nature of the wall W and CS interfacing (particularly flow rates associated with the noted "larger" turbines).

For example, under embodiments of the invention there is avoided the need for added sealing material such as ceramic fiber sealing material compressed between the CS and exterior periphery of wall W or added blocking plating (e.g., seal-off baffling plating) in the region of the periphery of the SCR wall. Further, in view of the CS size requirements under embodiments of the invention, plate PW preferably represents a sub-wall sized plate. As with the aforementioned modular units 100, plates PW can be sized as to be more readily handled and position in place when forming the overall turbulence generator as in turbulence generator 230 shown in FIG. 2A. For instance, when turbulence generator TG (230) is being assembled in place in the HRSG a plurality of plates can be sized in similar area coverage as modules MO and joined either directly together as by welding and/or via appropriate peripheral framing (not shown). Alternate embodiments are also featured under the present invention for TG formation as in the below described ISMs shown in FIGS. 11 and 11A that are individual static mixers that are supported by the individual modular units 100 rather than an independent downstream SM device such as the aforementioned FIG. 9 plating PW with its own support structure designed to secure it directly to the CS interior wall at a location downstream and free of direct connection with the SCR1.

Alternate embodiments of the present invention can have either or both of the above noted added sealing material (e.g., fiber sealing and/or blocking ("seal-off") plating) as when approaching higher and higher removal levels. The aforementioned fiber sealing material positioned about the periphery of the SCR and compressed against the interior surface of the CS can help cut down the peripheral reducing reagent and NOx bypass. Using ammonia as an example of reducing reagent type, it can be seen that any peripheral bypass ammonia (as well as any flow though ammonia) is first subjected to turbulence generation as by TG (SM) 230 before reaching SCR2 where the combination NH3/NOx can be further removed. Also, the presence of SCR1 and SCR2, as two walls to be confronted by the exhaust flow, also has a tendency to lessen the overall amount of peripheral NOx and ammonia leakage past the outlet end of SCR2 (whether a seal is present or not at each or any of the SCR1 and SCR2 locations) since at least a portion of any peripheral leakage around SCR1 will be absorbed in reactions at SCR2 lessening the overall amount that eventually might get past the periphery of SCR2.

With reference again to FIGS. 9 and 10 there is shown an example of a suitable turbulence generator means 230 (FIG. 2A) which has the form of a static mixer SM. FIG. 9 shows a partial section of SM which includes a planar plate structure defining a plate wall PW (which plate wall is preferably represented by a plurality of plates (each having a cross-section as shown in FIG. 10) and associated framing as to facilitate insertion into the CS of the HRSG. For example, one or more plates can have a common height and width of a module 100 and be assembled on a supporting frame structure lattice located in the CS (not shown). Thus, upon assembly of plate wall PW of the SM, the SM occupies a similar HRSG reception area as the SCR walls. FIG. 10 shows a cross section view through one row of projections PR as represented by cross-section X-X in FIG. 9. Planar wall PW preferably has each planar sheet PS having a planar exhaust flow facing upstream surface (receiving/contacting upstream exhaust flow Eu) and in which are formed a plurality of flow through apertures AP and downstream extending directional flow projections PR1, PR2 . . . arranged across the entire surface of planar sheet PS (e.g., a series of columns and rows as represented in FIGS. 9 and 10, although a variety of other locations arrangements is also contemplated, so long as sufficient turbulence is generated without introducing too much back pressure).

FIGS. 9 and 10 further show gaps being defined between support struts (the star points extending out to a circular disc with gaps between the narrowing star point supports). As shown in FIG. 10, the gaps afforded by the downstream extending projections off the downstream surface of plate wall PW leads to turbulent flow pattern generation FL in the downstream exhaust flow $E_D$ with, for example, contained ammonia and NOx being well intermingled before coming into contact with SCR2.

Figure 11:
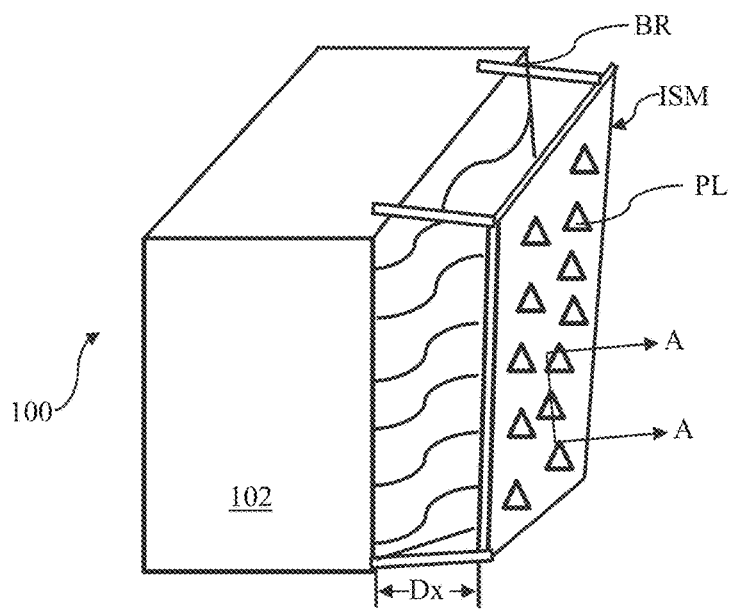
FIG. 11 shows an embodiment of a combination SCR modular unit with integrated turbulence generator in the form of a static mixer.
Figure 11A:
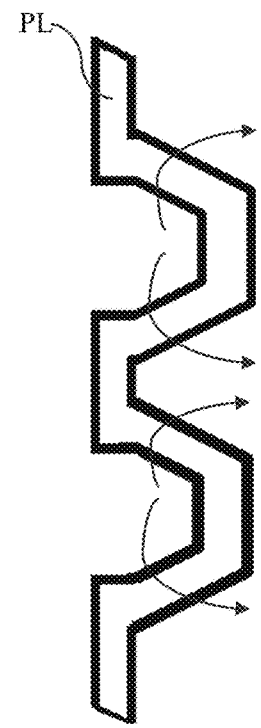
FIG. 11A shows a cross-sectional view of the static mixer along section line A-A in FIG. 11.

With reference to FIGS. 11 and 11A there is illustrated an alternate embodiment of a turbulence generator TG in association with an SCR module 100. For instance, in an illustrative aspect under the first embodiment shown in FIG. 2A, the TG is shown in FIGS. 11 and 11A as an integrated form of a static mixer SM (referenced as ISM for convenience). ISM is shown to be integrated with the downstream end of the SCR1 such that NOx and any bypassing ammonia is subject to the turbulence generator provided by ISM for each modular unit 100. Thus, unlike static mixer 230 shown in FIG. 2A and FIG. 9, which is designed as an independent plate assembly sized to preferably conform with the full CS cross-sectional area or area(s) of highest concern for improper NH3/NOx mixing, the arrangement shown in FIG. 11 allows for a plurality of static mixers of the ISM type that are individually associated with respective modular units 100 such that there is a number of ISMs that are each supported by a respective modular unit and designed to cover the desired amount of the area represented by a cross-section of the CS (e.g., all of the modular units 100 in the SCR wall having an associated ISM, or only some of the modular units having an ISM in the wall as to cover regions of the SCR wall in most need of turbulence generation as in a periphery only ISM ring).

As further seen by FIG. 11A the ISMs feature a plate PL having a plurality of partially covered apertures that act to redirect the flow though the main planar plate in which the aperture/caps are formed in similar fashion to the arranged shown in FIGS. 9 and 10 for the earlier described static mixer. The individual plates of the ISM are secured directly to the framing 102 of the modular units 100 as by added bracketing BR that can be welded, bolted etc. to both the framing 102 at one end and to the plate PL of the ISM at the other. In this way, an integrated SCR wall component and static mixer is provided. Further, this integration provides for close positioning of the static mixer ISM relative to distance Dx extending from the downstream end of the modular unit 100 to the upstream end of plate PL of the ISR. For instance, the spacing or distance Dx in FIG. 11 can be, for example, 1 inch to 6 inches. Further the integrated relationship between the two components of the SCR1 and TG represented by the connected SCR modular unit 100 and the ISM enable rapid assembly within the HRSG as, by stacking the modular units, there is simultaneously achieved a stacking of the ISM in proper positioning. Also, form a method of using standpoint, the distance Dx helps in achieving a desired level of intermixing of both pass through NOx and ammonia as well as (particularly when the modular units defining the outer periphery of the SCR wall feature ISMs) bypass slippage of the exhaust components to be removed as in NOx and ammonia bypassing the SCR1 wall.

Figure 12:
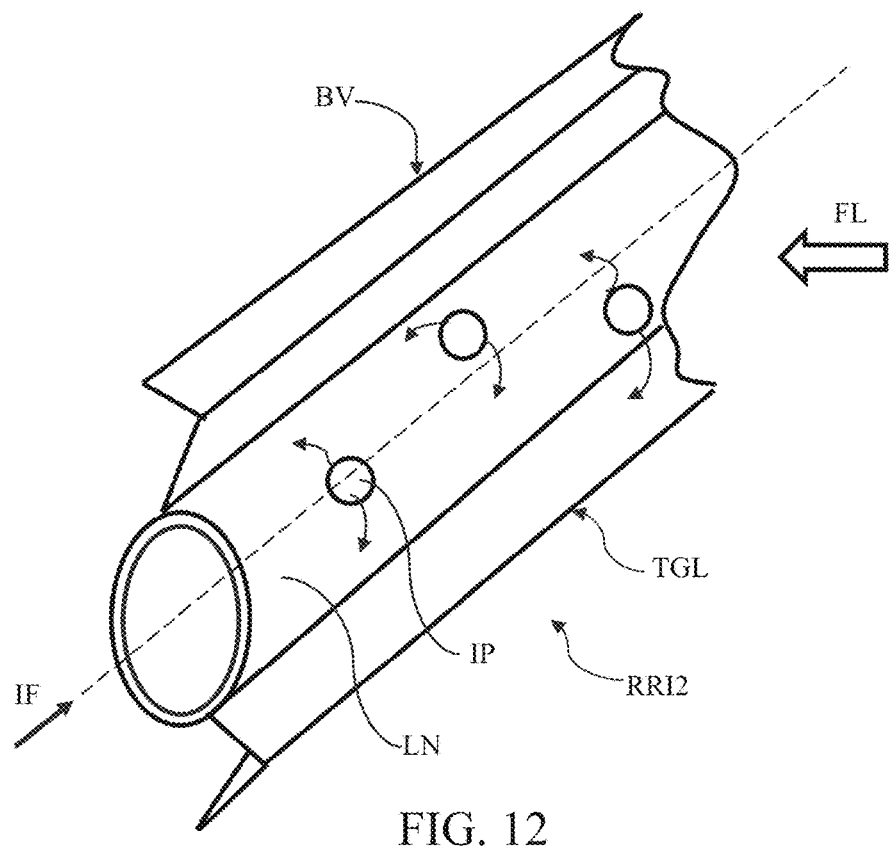
FIG. 12 shows an embodiment of a reducing reactant injector set with integrated "winged" piping supported mixing means for reductant flow turbulence generation.

FIG. 12 shows an alternate embodiment of the present invention with turbulence generating means TG in a different form and referenced as TGL. The TGL is associated with the infeed of reducing reagent and can be utilized together with the aforementioned other types of TGs or without (e.g., wherein either or both of RRI1 and RRI2 are provided with TGL and there is no SM (ISM version or otherwise) relied upon, or where SM (and/or ISM) are utilized together with a TGL associated with an (or each) RRI featured). FIG. 12 shows a reducing reactant injector lance LN with reducing reagent in-flow IF with the lance further supporting above and below V-shaped mixer plating BV that is (or are if two component) for reductant flow turbulence generation. For example, in FIG. 12 there is seen a partial view of RRI2 with reducing reagent injection lance LN such as the manifold piping extending in the X-axis direction in FIG. 3B provided with the added mixing means BV. FIG. 12 further illustrates the potential for ports IP formed in the manifold inlet lance to be circumferentially altered in angle to provide added flow variation in the injection location in the stream.

Further, since the preferred intention is to have the baffle based TGL shown in FIG. 12 as a replacement for the independent TG (as in the SM)), the baffling is limited to RRI2 and not present on RRI1 to take advantage of a less complex, low resolution RRI1. In the TGL of FIG. 12, reducing reagent exiting the lances LN will mix with turbulent exhaust flow passing past BV mixers as to facilitate sufficient NH3/NOx mixing before reaching the downstream SCR2. Thus, while the TGL is associated with an RRI (preferably only RRI2, although alternate embodiments include TGL associated with each of RRI1 and RRI2 or only with RRI1), in view of its turbulence generating function it is described in the present "turbulence generation" section.

Further T-H Combination (THC) Views

Figure 2B:
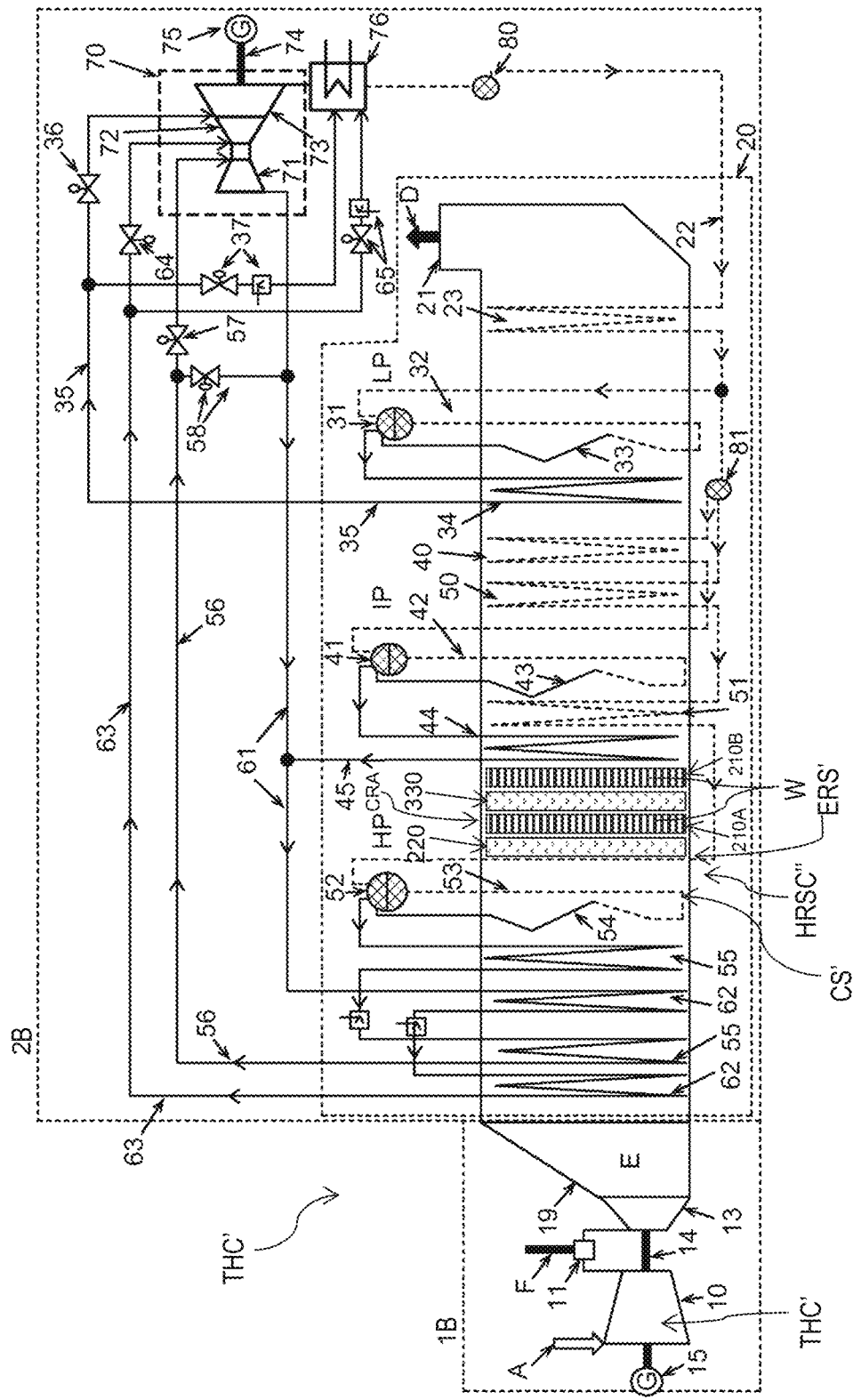
FIG. 2B shows an example of a second embodiment of the T-H combination of the present invention, inclusive of another present invention emission reduction system embodiment example having, in exhaust flow sequence, RRI1/SCR1/RRI2/SCR2.
Figure 4A:
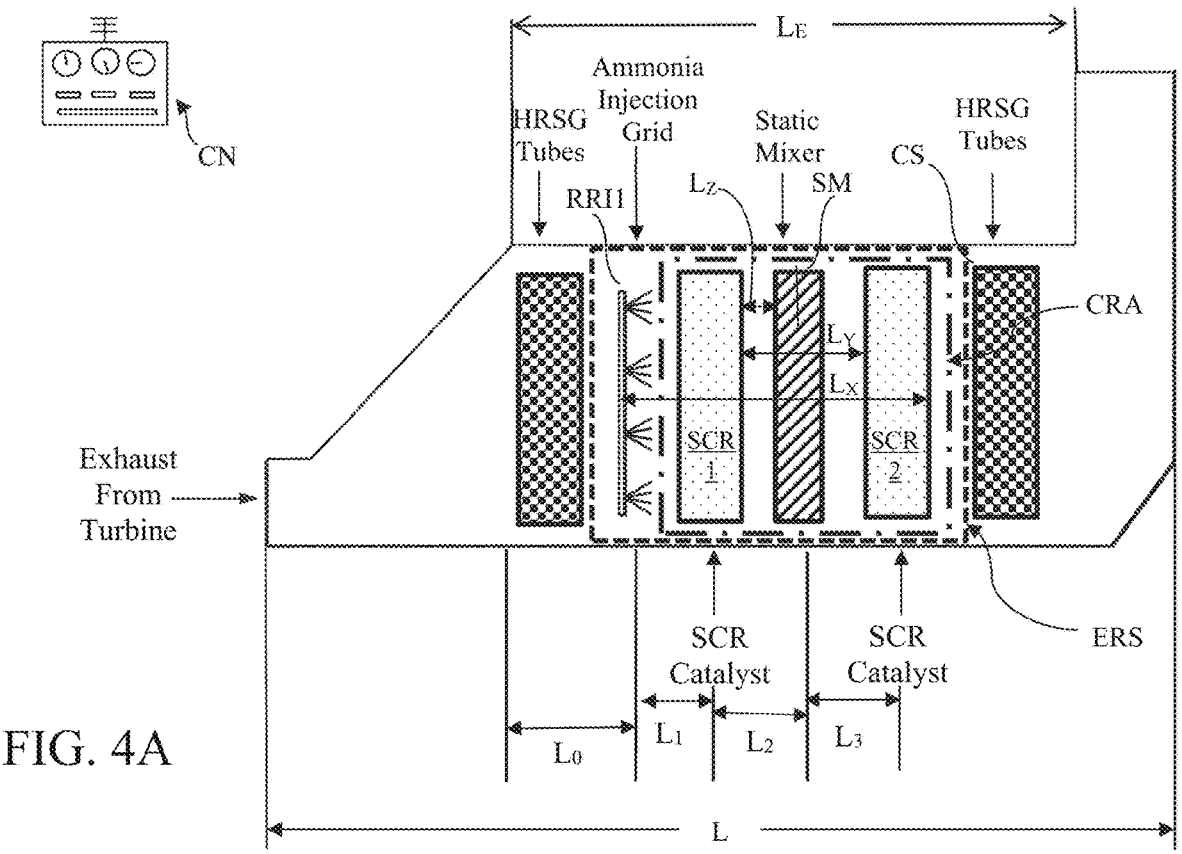
FIG. 4A shows a schematic view of the heat recovery system in the form of a horizontal HRSG with first embodiment ERS together with a controller feature (and with a more simplified view of the interior of the HRSG, with the non-ERS equipment associated with the second cycle interior components within the HRSG simplified by way of reference to "HRSG tubes" boxes only).

FIG. 4A shows a schematic view of the HRSG with first embodiment ERS together with a controller feature (and with a more simplified view of the interior of the HRSG, with the non-ERS equipment associated with the second cycle interior components within the HRSG simplified by way of reference to "HRSG tubes" boxes only and also intended to illustrate that the ERS of the present invention is well suited for a variety of different HRSG designs as well as turbine/generator combinations and not just the ones illustrated in FIGS. 2A, 2B).

In FIG. 4A there can be seen (by dashed line demarcation) ERS comprised of RRI1 (with or without TGL)/SCR1/TG (SM represented)/SCR2 in sequence in the exhaust flow direction. There can also be seen (by dot-dash demarcation) catalyst reactor assembly CRA which features SCR1/TG (SM represented)/SCR2. FIG. 4A also illustrates the aforementioned controller CN which facilitates the above/below described operation of the T-H combination (shown schematically in wireless format for this embodiment, although hardwiring to the various sensors (not shown) described above/below or a mix of hardwired and wireless is also featured under the present invention). In the FIG. 4A ERS, the RIM can be an AIG1 and the TG an SM as in the independent SM shown in FIG. 9 or an SCR1-SM(ISM(s)) combination such as shown in FIG. 11. Also, in the discussion to follow, reference is made to AIG1 and AIG2 relative to potential options for RRI1 and RRI2 (but it is intended that the usage of AIG1 and AIG2 in the discussion to follow represent only examples as to RRI1 and RRI2 and that RRI1 and RRI2 can be switched out for the references AIG1 and AIG2 in the discussion below as when utilizing alternate reducing reagent sources). For example, the discussion as to AIG1/SCR1/TG (e.g. SM)/SCR2 is understood to be replaceable with RRI1/SCR1/TG (e.g. SM)/SCR2 when opting for an alternate reducing reagent supply system to an ammonia grid injection system.

As described above, with a desire in the art to limit the overall dimensions of the HRSG there is a limited space for catalyst system insertions (with some conventional systems having 20 to 24 feet to accommodate, for instance, the SCRconv, alone or in combination with other independent OC and other SCR system components such as a high resolution AIG). As also noted, in the prior art there is a tendency to add OC and/or ASC independent catalyst bodies (those housed independently and spaced along the path of exhaust flow from the SCRconv) at perceived suitable temperature and/or functional locations (e.g., ammonia slip catalyst downstream of an SCRconv reactor). Under embodiments of the present invention, however, there is preferably lacking any independent body OC as well as any independent body ASC within the CS of HRSG (as in between the inlet end of the HRSG to the outlet end of the HRSG (or at least within the ERS volume represented by length Lx in FIG. 4A)). Alternate embodiments of the present invention, however, as where there is sufficient room and the backpressure levels are not problematic, can include additions of OC and/or ASC independent catalyst bodies (e.g., an OC "wall" spaced upstream of the SCR1).

Further while HRSG minimization is a favorable attribute under the present invention, the HRSG has to have a suitable length and volume to accommodate the exhaust output of the exhaust generation source such as a turbine associated with the T-H combination for which the ERS of the present invention acts to remove emissions. For instance, with turbine-generator combinations outputting levels such as those described above, the ERS needs to function efficiently within the noted linear length to achieve the described NOx reduction and ammonia slip avoidance levels under the present invention.

FIG. 4A shows an ERS well suited for use with such larger turbine-generator combinations, and has dimensions well suited for working within a linear length of an HRSG, as represented by the ERS linear length Lx in FIG. 4A (which is represented by, for example, a length of 20 to 24 feet positioned within the aforementioned L×W×H dimensions described above for HRSG that are suitable for use with the described "larger" turbine-generator combinations; or, alternatively, the region of the ERS within the linear length of the HRSG can be provided in an enlarged or bulging W×H region along the length of the HRSG to allow for good ERS flow surface contact without an overall W×H increase for the full linear length of the HRSG).

Further, in embodiments of the invention, there is preferably not an individual body OC or an individual body ASC between the FIG. 4A illustrated HRSG upstream and downstream tube sets (and preferably also none of the same along the full length L—as in none of the same between the inlet and outlet locations for the HRSG). With this avoidance, there is facilitated the ability to introduce a second SCR2 within, for example, the back pressure and linear HRSG reception length constraints present on such prior art systems featuring SCRconv (and typically plus one or more independent body OCs or ASCs and/or with relatively high catalyst SCRconv loading and associated added back pressure (and catalyst coating added cost)).

In FIG. 4A the total linear length occupation for the ERS is represented by Lx (extending from the most upstream point of AIG1 to the most downstream point of SCR2) which in preferred embodiments (e.g., those suited for the "larger" turbine-generator combinations) is in the noted 20 to 24 feet range (with 20 to 22 feet being more preferred for many HRSG set ups). The Table 2 below shows some preferred relative spacing of AIG1, SCR1, SM (or TG), SCR2 that is designed to be well suited for removing higher percentages of NOx (e.g., at or greater than 95% as in 97%, 98% and 99% being illustrative of higher percentage rates for NOx removal) while retaining reagent (e.g., ammonia) slip levels downstream of the outlet of SCR2 at or less than 3 ppm NH3 (more preferably less than or equal to 2 ppm NH3). Value Lo in the dimension ranges noted in Table 3 below represents the distance from an inlet plane (after the expansion phase of ducting between the turbine output and CS of HRSG) to a linear midpoint of AIG1; $L_1$ is representative of the linear distance from the midpoint of AIG1 to midpoint of SCR1; $L_2$ is representative of the linear distance from the midpoint of SCR1 to linear midpoint of SM; $L_3$ is representative of the linear distance from the midpoint of SM to midpoint of SCR2. Various other dimensional relationships are thus also represented as in the distance between the midpoint of SCR1 to midpoint of SCR2 as $L_2+L_3$.

Also represented in FIG. 4A, and ranged in Table 2, is dimension Ly which is representative of the total linear length for the output exhaust from the downstream side of SCR1 (as well as any slippage past the periphery of SCR1) till reaching the upstream surface of SCR2 which is an area where the turbulence generator means is active in intermixing the NH3 and NOx within the Ly volume. Lz is representative of the distance from the downstream surface of SCR1 to the upstream end of SM which is a value designed to achieve a desired level of intermixing relative to the NH3/NOx ratio (as in placement of the midpoint of SM within the first 25% of the length Ly, and more preferably in a range of 0% to 20% (with 0% representing a flush attachment of SM to the downstream surface of SCR1). As seen from FIG. 11, bracketing can be utilized to achieve an integrated SCR/SM inclusive of ones having a spacing Lz range of 0.5 inch to 8 inches, and more preferably 1 inch to 6 inches.

Also, in view of the desire to limit HRSG linear length/ volume, while being able to accommodate "larger" turbine-generator combinations, in preferred embodiments there is a limit of two (i.e., only SCR1 and SCR2) selective catalytic reactors directed at NOx reduction within the HRSG (as in within the length L shown in FIG. 4A).

Further, with the above described positioning of TG (e.g., SM) downstream, but preferably at or within an upstream 25% portion of Ly, there is provided a beneficial placement close to the outlet of the SCR1. This placement of the TG(SM) can include a placement within 4 feet of the outlet end of the SCR1, preferably within 2 feet inclusive of the noted FIG. 11 configuration wherein a close spacing of from 1 inch to 6 inches is made available.

TABLE 2

| FIG. 4A HRSG/ERS dimensions | | | |
|---|---|---|---|
| Dimension Ref. | General range examples | Intermediate range examples | Narrower range examples |
| L | 120 feet-160 feet | 130 feet-150 feet | 135 feet-145 feet |
| Lo | 50-80 feet | 60-75 feet | 65-70 feet |

TABLE 2-continued

FIG. 4A HRSG/ERS dimensions

| Dimension Ref. | General range examples | Intermediate range examples | Narrower range examples |
|---|---|---|---|
| L1 | 5-15 feet | 6-12 feet | 6.5-9.5 feet |
| L2 | 10 inches-36 inches | 13 inches-28 inches | 10 inches-17 inches |
| L3 | 5.0 feet-8.0 feet | 5.5 feet-7.5 feet | 6 feet-7 feet |
| Lx | 19-22 feet | 19.5-21.0 | 20.5-21.5 |
| Ly | 7-10 feet | 7.5-9.5 feet | 8-9 feet |
| Lz | 0 to 4 feet | 1 inch to 2 feet (or 0.5 inch to 8 inches for an ISM) | 1 inch to 2 feet (or .5 to 6 inches for an ISM) |

Presented below are some comparison Tables 3 and 4 to facilitate a better appreciation of the advantageous nature of the present invention.

Table 3 below provides comparison values relative to a modeled Traditional Dual Function system featuring an HRSG with a conventional SCRconv in the form of a dual "DNX" type catalyst, as compared with a set of SCR1 and SCR2 (each being modeled also as a Umicore's DNX® dual function catalyst with 50/50 loading along the common supporting substrate length together with an SM for turbulence generation modeled downstream of the SCR1 outlet). That is, rows F, G and H represent common characteristics set for the overall NOx removal (F–96%); the amount of ammonia slip allowed at the outlet (G–5.0 ppm) as well as the allowed NOx slip (H–2 ppm), respectively. With the knowledge of the final output required characteristics, and the available AIG mal-distribution capability levels (see the high resolution and low or intermediate resolution discussion above and below), computational modeling provides for a determination of the respective catalyst washcoat loading requirements and pressure drop levels associated with the compared systems (e.g., the more washcoat loading the more difficult exhaust flow through and associated increase in pressure drop across).

TABLE 3

| Ref. | Values | Traditional Dual Function | 2 Reactor in Series | Differences |
|---|---|---|---|---|
| A | Total Volume, m3 | 85.4 | 75.1 | 10.3 |
| B | SCR, m3 | 27.9 | 17.6 | 10.3 |
| C | Dual Function, m3 | 57.5 | 57.5 | 0 |
| D | DP Catalyst, in H2O | 3.03 | 3.05 | −0.02 |
| E | Ammonia to NOx maldistribution requirement | 8% RMS | 15% RMS AIG/20% RMS Mixers | |
| F | Denox, 96% | 96% | 96% | |
| G | Ammonia Slip, ppmvd @ 15% O2 | 5.0 | 5.0 | |
| H | Outlet NOx, ppmvd @ 15% O2 | 2.0 | 2.0 | |

With the foregoing fixed characteristics in place, and through computational modeling, there can be determined the volume of catalyst material (as per A, B and C) required to achieve the noted values in F, G and H as well as the pressure drop involved (D), and the mal-distribution requirements (E) needed to reach the F, G and H requirements. For instance, if the mal-distribution values in the conventional system cannot meet the 8% RMS level and there is a "looser" level, the ability to achieve the noted values in F, G and H will not be available. On the other hand, under the present invention, despite much higher or looser mal-distribution levels associated with the SCR1 and SCR2 system (and with the upstream area of SCR1 associated with an AIG1 and the upstream area of SCR2 associated with the factored in turbulence of an SM positioned close to the outlet end of the SCR1 (to achieve the benefit of an extended length to provide for more intermingling before reaching SCR2)) there can be much more easily achieved the desired levels in F, G and H with a variety of AIG system types.

Further, as seen from Table 3, the SCR catalyst material volume level for the dual function DNX SCR conventional catalyst modeling set up features a total value of 85.4 m$^3$ representing the sum of the SCR only material level of 27.9 m$^3$ coupled with the dual function "DNX" downstream catalyst material volume of 57.5 m$^3$. With the higher level amount in row C being attributed to an effort to have sufficient catalyst material to accommodate for the attempted avoidance of use of an upstream OC (a higher loading of OC catalyst material on the DNX to achieve the levels as rows F, G and H). In other words, the modeled conventional embodiment under the "Traditional—Dual Function" heading is designed with a sufficient SCR material loading to achieve the noted reduction parameters of F, G and H without the need for an OC upstream. The inclusion, however, of an OC and a lesser load on the SCRconv is also possible, but can lead to similar issues as in overall washcoat loading levels, back pressure etc.; and thus the modeled "Traditional—Dual Function" embodiment is considered to be well representative of the state of the prior art.

The row A, B and C values for catalyst loading in the present invention's modeled "2 Reactor in Series" column represent the sum of the catalyst load for SCR1 and SCR2 involved to achieve the noted levels at rows F, G and H. As the OC requirements for each system (conventional dual function downstream and SCR1/SCR2 combination) is the same, the dual function loading requirement is the same at 57.5 m$^3$. The nature of the SCR1/SCR2 combination under the present invention provides, however, for a lesser total loading at row B for the SCR directed catalyst loading. That is, as seen from the Table above, the present invention system is configured to achieve the same reduction characteristics set in F, G and H while using 10.3 m$^3$ lesser volume of catalyst material (i.e., a saving in catalyst loading requirements as compared to a conventional set up, while also providing greater flexibility in mal-distribution levels— noting the difficulty in reaching levels such as 8% RMS with AIG technology).

Row D is directed at confirming that the present dual SCR1/SCR2 system does not lead to backpressure issues as compared to a single dual DNX SCRconv system. Based on the pressure drop "DP") levels determined for each system, there can be seen that there is retained essentially the same pressure drop levels in each system (a difference of only 0.02 in H$_2$O) which is considered attributable to a "wash" between the addition of pressure drop due to the inclusion of the additional SCR2 and the benefit of a lower washcoat loading which lessens the pressure drop through the system.

Thus, from the comparison presented in Table 3, there can be seen that there is an overall drop in catalyst loading requirement, plus a loosening of the mal-distribution level, while not generating back pressure issues or an increase in spacing occupation in the combination of components. The lessening of overall washcoat load levels as well as the loosening of mal-distribution levels (allowing for less complex low or intermediate resolution RRI) presents the potential for high cost savings and a highly advantageous greater flexibility in system designing while still satisfying the more and more stringent regulated emission cap levels and while still staying within preferred minimized size constraints for such THC systems.

As a component of such flexibility, there can be seen from Table 4 below how the SCR1/SCR2 combination in the noted location within the HRSG of the THC facilitates the prevention of peripheral slippage levels, which is not available in SCRconv systems such as that featured in Table 3. That is, the combination of the SCR1 and downstream SCR2 provides for the avoidance of overall peripheral exhaust slippage (and thus an avoidance of the associated NOx and NH3 carried by that exhaust). As such, there is considered, under the present invention, an ability to meet the regulated requirements, while providing for the potential of less overall washcoat loading and/or a lessening of the complexity level of the RRI and associated mal-distribution levels needed to meet those goals.

TABLE 4

| Ref. | Bypass Comparison Outlet | Based on 1% bypass for the layer (ppm) | Based on 1% bypass for both layers (ppm) |
|---|---|---|---|
| A | 1% Ammonia Slip, ppmvd @ 15% O2 | 0.55 | 0.1162 |
| B | 1% NOx, ppmvd @ 15% O2 | 0.5 | 0.0858 |

That is, Table 4 provides a bypass analysis for slippage amounts of untreated exhaust around a first SCR wall (e.g., SCR1 or SCRconv) and then a second SCR (e.g., SCR2). More particularly, an analysis is carried out of the anticipated NOx and NH3 slippage past each noted stage under an assumption that the less than perfect seal relationship will allow for 1% slippage around the SCR module based walls (i.e., this analysis is relative to structural relationship general seal bypass slippage only, and not slippage through the SCR material due to, for example, an inadequate NH3/NOx ratio (or overabundance of NH3 or NOx in an NH3/NOx ratio) relative to the SCR reaction). It is noted that a 1% assumption is an illustrative value as to what can slip around an SCR wall without extensive added requirements to preclude slippage (e.g., added peripheral seals as in seal pillows and/or added welded on baffles put in place to block by-pass openings, etc.).

Column 2 in Table 4 shows the type of slip material relative to a mix with the noted amount of oxygen content illustrative of lean exhaust flow, and there is further an assumption of 50 ppm NOx and 55 ppm of NH3 (the added 5 ppm accommodates the typical percentage overage of injected reactant to facilitate reaction content sufficiency relative to 50 ppm of NOx being carried in the exhaust—and with 50 ppm being representative of larger turbine output, for example). Thus, with the noted 1% slippage for the 55 ppm NH3 injected and 50 ppm NOx in the turbine exhaust there is the noted 0.55 ppm and 0.5 ppm respective structural peripheral bypass amounts across the first in series SCR reactor (e.g., SCR1 or SCRconv).

Thus, there can be seen that after the first SCR reactor (absent extensive and expensive added sealing measures taken to lessen such untreated structural escape passage) a 0.5 ppm NOx bypass is experienced. This 0.5 ppm NOx level of structural slippage alone makes it difficult to meet the regulatory limits on NOx escape (noting reduction level requirements such as 96% are made difficult by the structural peripheral slip alone, even before factoring in the NOx passing through the SCR reactor as due to mal-distribution across the SCR reactor).

In similar fashion, a 0.55 ppm NH3 structural slippage past the first SCR reactor (SCR1 or SCRconv) of NH3 represents 27.5% of the 2 ppm cap, before even factoring in the slippage due to mal-distribution and the like across the SCR wall. This structural slippage of NH3 makes it difficult, if not impossible, to meet the regulatory caps such as the 2 ppm cap absent extra expensive steps as in very sophisticated high resolution AIG grids to lower the mal-distribution and hence the slippage of NH3 through the SCR as well as likely extensive sealing steps as outlined above in an effort to lower the structural bypass below the 1% level described above).

Under the present invention, however, with an SCR2 downstream, and considering that there will be experienced a reduction of the NOx (and NH3) via the SCR1 wall, there is experienced a profound reduction in overall bypass amounts relative to the ERS of the present invention. That is, the noted column 4 overall peripheral slippage of 0.1162 ppm NH3 represents only 5.8% of the 2 ppm regulated limit (as opposed to the above noted 27.5%) which allows for greater flexibility relative to SCR treatment and/or levels of peripheral HRSG sealing (if needed at all) that might be involved. For instance, when considering the Table 3 loadings for the SCR1 and SCR2, the 0.5 ppm NOx bypassing SCR1 is intermingled with that NOx that passes through the SCR1 wall following SCR reduction. For example, with the percentage reduction through SCR1 at a modeled 83.7% (representing the NOx reduction percentage attributable to the SCR1 wall with beneficial lower catalyst load amount as compared to the Table 3 SCRconv loading) there is the following formula relative to the NOx passing downstream past SCR2 (overall NOx peripheral only slippage downstream of SCR2 is represented by [0.5 ppm+(49.5 ppm*(100−83.7%))]*1%=0.0858 ppm NOx).

A similar analysis (again relative to the SCR1 modeled loading and anticipated NH3 reduction % across the SCR1) leads as well to the noted ammonia overall peripheral slippage of [0.55 ppm+(54.45 ppm*(100−78.6%))]*1%=0.1162 ppm NH3 overall peripheral slippage downstream of the SCR2.

Assembly of ESR within T-H Combination and Operation of the Same

An embodiment of the present invention is directed at assembling the emission reduction system ERS within a T-H combination, and more specifically within the HRSG of a T-H combination (e.g., accessing CS of HRSG, as during initial assembly or during a retrofit operation of a preexisting catalyst system in an HRSG). The assembly operation includes positioning each of SCR1/TG (e.g., SM)/SCR2 of CRA within HRSG (as well as AIG1, as in either a refurbish if a pre-existing ammonia sourcing structure is insufficient or in an initial installation in a new T-H combination). While the structural sequence in an upstream to downstream exhaust flow direction is AIG1/SCR1/TG (e.g. SM)/SCR2, the assembly sequence can be the same as the above noted sequence relative to exhaust flow passage or an alternative one as inserting each of SCR1 and SCR2 and then SM (or SM can be attached to SCR1 and/or TGL to AIG1 and the combination inserted together). Each of AIG1/SCR1/TG (e.g., SM)/SCR2 are fixed in position within HRSG; and, in some embodiments, added sealing material can be provided between the exterior periphery of any component of CRA that is in need of added sealing as in sealing about SCR1 and/or SCR2 to avoid exhaust bypass; as in ceramic fiber seals being pre-attached or worked in after placement of the SCR1 or SCR2 being provided with added sealing and/or the addition of blocking "seal-off" plating to block access to openings about the SCR1 and/or SCR2 periphery(ies). As noted, however, with the added mal-distribution flexibility provided by the ERS of the present invention, general seals can be suitable in many instances as well.

FIG. 8 shows an example of installation of SCR modules of the present invention being inserted into an open region of the HRSG (panel of HRSG removed to enable containment structure CS of HRSG access) showing multiple widthwise slots (see the above discussion as to larger sized CS associated with the noted larger turbine size examples) for respective modules (with MO1, MO2 and MO3 only shown). FIG. 8 shows modules MO1 and MO2 shown already in position within HRSG, and MO3 in the process of being inserted in conjunction with the completion of the assembly of a T-H combination according to the present invention. With each module made up of (for instance) 3.5 modular units with appropriate module frame structure, and their being six reception slots across the HRSG width of 35 feet and with 7 of the modules vertically stacked in the height direction to provide for a height of 70 feet, there is presented a large surface area in the SCR (SCR1 and SCR2 being similarly designed in this embodiment) receiving the flow exhaust (e.g., a surface area represented by essentially the height (e.g., 70 feet) and width (e.g., 35 feet) associated with the SCR wall W of the present invention (with one modular unit depth preferred in the linear Y-axis direction).

With reference to FIGS. 2A and 4A, a process of removing emissions from an operation T-H combination is illustrated. Under this process, exhaust gas generated by turbine T is input into the HRSG inlet and passed (in exhaust flow direction sequence) past each of AIG1/SCR/TG (e.g., SM)/SCR2, and then out the outlet of HRSG.

Thus the exhaust flow from the turbine received in the HRSG is first subjected to a reducing reagent input as in the noted ammonia compounds, then the mixture of NH3 and NOx within the exhaust flow E makes contact with the catalytic material associated with wall SCR1 (e.g., a single or multi-functioning SCR such as those described above) wherein upon contact there occurs selective catalytic reduction of the NOx under with the benefit of the selective ammonia and SCR1 wall composition (the chemistries associated with SCR reduction relative to NH3/NOx mixes in exhaust flows are, per se, well understood in the catalyst field and thus not repeated here).

Once exhaust flow E flows past SCR1 it is subject to added turbulence by turbulence generation means TG (if not already subject to a TGL with the RRI1) as by way of passing the exhaust flow through static mixer SM having the noted preferred relative spacing within length Ly described above. The exhaust flow exiting SM then travels to and through SCR2 where the emissions are further removed in an effort to have the T-H combination satisfy the aforementioned standards (e.g., NOx removal of at least 95% (more preferably at least 96% and more preferably 97% or higher NOx (e.g., 98% or 99%) reduction with at or less than 5 ppm (or more preferably at or below 4 ppm, at or below 3 ppm or at or less than 2 ppm) ammonia slip—even for the noted "larger" size turbines or turbines or like exhaust generating devices having relatively high NOx generation as explained above).

Controller CN can help in maintaining desired flow through characteristics as in monitoring for NH3 slippage and/or NOx levels at the HRSG output and making adjustments as in a lowering of AIG1 reagent input, or monitoring for temperatures with appropriate positioned temperature sensors and/or exhaust flow rate sensing. For instance, CN can receive the aforementioned mix ratio data input based on one or more (e.g., a grid) of sensors or extrapolation from known conditions to ensure that the mal-distribution does not exceed the "looser' mal-distribution levels, as in ensuring there is not an increase, for instance, beyond 15% mal-distribution value at the SCR1 inlet or 20% in SCR2.

Emission Reduction System (ERS) with SCR Reactor Assembly—Embodiment 2

Figure 4B:
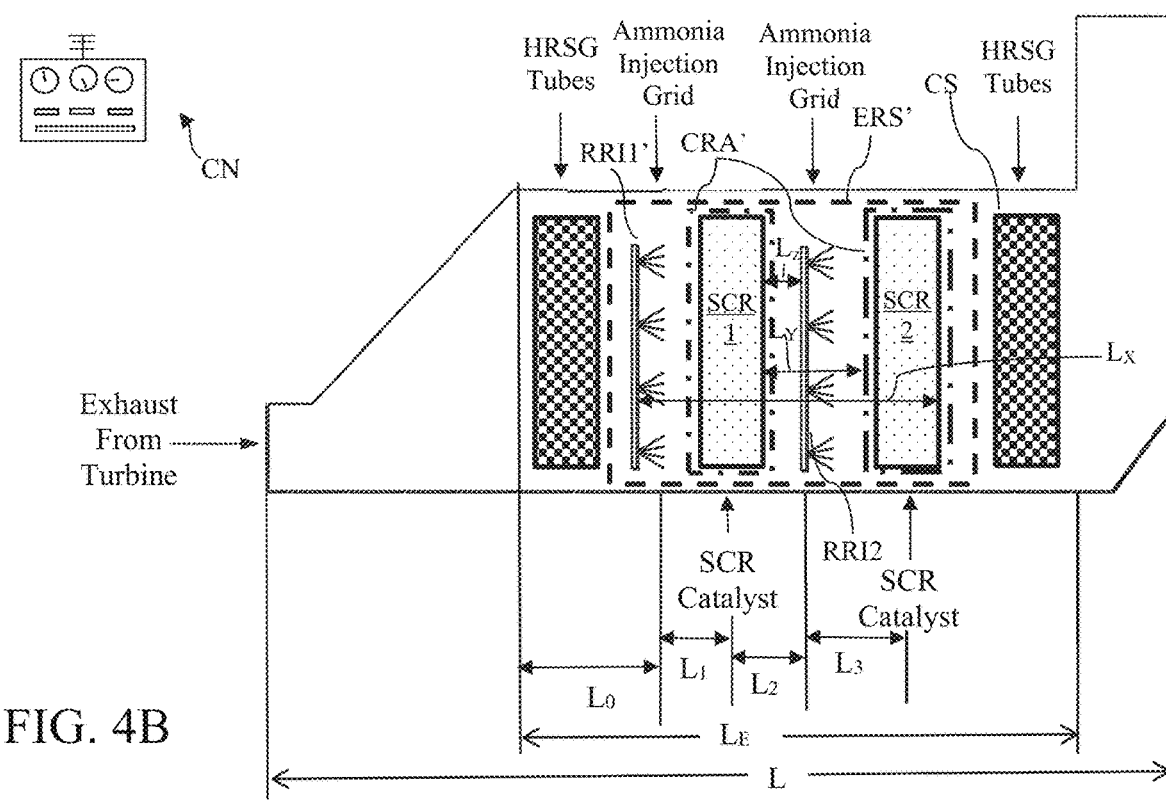
FIG. 4B shows a schematic view of the same HRSG as in FIG. 4A, but with second embodiment ERS' together with a controller feature (and with a more simplified view of the interior of the HRSG with the non-ERS equipment associated with the second cycle interior components within the HRSG simplified by way of reference to "HRSG tubes" boxes only).

With reference to FIGS. 2B and 4B there is now described an alternative embodiment of the present invention. The below discussion emphasizes the different aspects of the alternate embodiment ("embodiment 2") relative to the above described FIG. 4A embodiment in view of the numerous similarities between the two embodiments represented by FIGS. 4A and 4B, respectively (as evidenced by the common referencing in the respective FIG. sets (2A/4A) and (2B/4B)). Hence the attributes, such as those described above for the first embodiment, unless altered by the noted differences, are equally applicable here (e.g., similar benefits in usage with "larger" T-H combination). The aforementioned Lx, Ly and Lz values in FIG. 4A are equally applicable as linear length examples for embodiment 2 in FIG. 4B with the midpoint of AIG2 being utilized in place of the midpoint of SM for reference.

FIG. 2B shows the same T-H combination as in FIG. 2A, but for the inclusion of a modified ERS' having a modified CRA'. That is, in place of TG (e.g., an SM) between SCR1 and SCR2 there is positioned RRI2 (e.g., an AIG2). Due to the aforementioned present invention advantage in limiting spacing there is not an independent body SM, with the volume occupied by SM instead essentially being taken up by RRI2 (e.g., AIG2); (the noted TGL with its limited volume addition can be featured in the RRI1 (e.g., AIG1) and/or RRI2 (e.g., AIG2) (with a preferred embodiment being an RRI2 only with a TGL if utilized) locations in alternate arrangements under the invention). The relative positioning is the same as for AIG2 and the aforementioned SM. That is, the Table 2 parameters are generally still applicable with the center point of the AIG2 used in place of the center point of the SM. Further, the second embodiment, like the first embodiment, is preferably also devoid of an independent body OC or ASC in the noted locations in the HRSG described above for the FIG. 4A embodiment.

As seen in FIGS. 2B and 4B, ERS' is comprised of (again AIG used below as an example of a type of RRI and thus reference to AIG below can be seen as a reference to RRI as well) AIG1/SCR1/AIG2/SCR2 with each of AIG1/SCR1/SCR2 preferably being similar to that of the first embodiment (with AIG1 and AIG2 preferably being of similar feed (e.g. injection grid) construction; but for a feed reduction in AIG2 in this embodiment to match the slightly over one-to-one ratio of fed NH3 relative to the NOx feed level in the exhaust flowing between SCR1 and SCR2, with each of the flow amounts associated with AIG1 and AIG2 being potentially controlled (as by controller CN in FIG. 4B) in an effort to achieve the desired NH3/NOx ratio leading to the respective SCR1 and SCR2 (with the noted control also being applicable to zone adjustments to tune particular zone areas of the AIG1 and AIG2 as by the above noted FIG. 3A AIG zone valve adjustments (the same being true of the first embodiment AIG1). Again, however, with the preferred low resolution (or intermediate in some instances) the control lever requirement is less than as needed for high resolution AIGs.

The AIG1 of the first embodiment and AIG1 of the second embodiment can be structurally the same with just the noted flow output modification (flow split modification) due to the addition of AIG2 and the ability of the latter to assume some of the overall NH3 supply in the ERS' with a ratio suited for the NOx level passing between SCR1 and SCR2. Similarly, the AIG2 design can be the same as the AIG1 design of either the first or second embodiments (but again for the different split supply feature due to the difference of one reducing reagent injection source or two reducing reagent injection sources—which can be controller CN governed). Further, in alternate embodiments, AIG1 of the first and second embodiments can be structurally different and/or AIG1 and AIG2 in the second embodiment can be structurally different (as in a different reagent injection set up such as an intermediate resolution AIG1 and a low resolution AIG2, or a low resolution AIG1 and the noted TGL for AIG2 which, depending on the number of overall zones, can result in AIG2 being deemed a high or intermediate resolution RRI, as well as various other RRI1 and RRI2 resolution arrangements suited for the exhaust flow characteristics). Preferably at least one of the RRI1 and RRI2 for the FIG. 4B embodiment (and more preferably each) are of at least the intermediate resolution and more preferably the lower resolution design as described above (e.g., 18 or less injection zones over the described typical W×H area for the HRSG).

Also, an illustrative arrangement for ERS' features a common reducing reagent source (e.g., liquid urea supply tank) with appropriate injection conduit network to achieve the desired injection pattern within the HRSG'. This can include a valve arrangement (such as featured in FIG. 3A) associated with controller CN wherein the relative percentage of reagent feed to AIG1 and AIG2 of the second embodiment can be set and/or adjusted during use to facilitate the desired reduction levels at the output. In an alternate arrangement under embodiment two each of AIG1 and AIG2 in ERS' can have their own source tank supply and respective valving preferably controlled by CN to achieve the desired relative split in real time (e.g., a sensor feedback loop to controller CN and associated feed allowance input to AIG1 and AIG2 in ERS').

As with the earlier described FIG. 4A embodiment, the SCR1 and SCR2 can have the same composition (e.g., catalyst loading amounts and characteristics); as well as, for example, same or different catalyst types relative to the upstream SCR1 and downstream SCR2 positioning (e.g., having non-dual/dual functioning catalyst SCR1 and/or SCR2. as in a non-dual upstream "DNX" type SCR1 and a dual "DNX" type SCR2 catalyst downstream) as also described above for SCR1 and SCR2 of ERS (first embodiment).

An embodiment of the present invention is directed at assembling ERS' within a T-H combination, and more specifically within the HRSG' of a T-H combination. For example, accessing CS of HRSG' as during initial assembly or during a retrofit operation of a preexisting catalyst system in an HRSG'. The assembly operation includes positioning each of SCR1 and SCR2 of CRA' within HRSG' as well as AIG1 and AIG2, as in either part of a refurbish if a pre-existing AIG1 ammonia sourcing structure is insufficient or in an initial installation in a new T-H combination). This could include as well added reagent source piping using the source/flow in AIG1 as a feed to AIG2 with appropriate valving (not shown) and preferably CN controller control as described above.

While the structural sequence AIG1/SCR1/AIG2/SCR2 is in conformance with the upstream to downstream exhaust flow direction, the assembly sequence during initial assembly or a replacement retrofit sequence can be the same as the above noted sequence or an alternative one as inserting each of SCR1 and SCR2 and then AIG2. Ultimately, each of AIG1/SCR1/AIG2/SCR2 are fixed in position within HRSG with CRA' (shown as SCR1 and SCR2 in FIG. 4B with associated dot-dash boundary boxes) and with ERS' shown as being positioned within the noted limited volume region in dashed lines in FIG. 4B. Again, like with Embodiment 1, in view of the desire to limit HRSG' volume, there can be avoided the presence of one or more independent oxygen catalyst bodies (OCs) or one or more ASC individual body catalysts within the HRSG' (as in along linear line L or, at least, the ERS' length Lx); as the ERS' is considered suited to meet most emission reduction level requirements such as in the noted "larger" T-H combination environments. As with the first embodiment, the assembly of ERS' can feature general seals only or can include the adding of sealing, as in sealing material placed about SCR1 and/or SCR2 to avoid exhaust bypass, as in ceramic fiber seals and/or added "seal-off" flow block plating being pre-attached or worked in after placement of the SCR1 or SCR.

Under the present invention the ERS or ERS' described above are each representative of emission reduction means for reducing NOx content in the exhaust while avoiding ammonia slip.

FIG. 8 can also be considered to show an example of installation of SCR modules of the present invention's second embodiment via being inserted into an opened up (panel of HRSG' removed to enable CS of HRSG' access) showing multiple widthwise slots for respective modules (MO1, MO2 and MO3 only shown). That is, the assembly operation described for the first embodiment is applicable here as well but for the installation of AIG2 in CS of HRSG' instead of SM. Again, the insertion of the SCR1 and SCR2 in the FIG. 4B embodiment can be with or without ISM as the SM and with or without TGL for the RRI1 and/or RRI2, as was the case with the FIG. 4A embodiment.

With reference to FIGS. 2B and 4B a process of removing emissions from an operation T-H combination is illustrated. Under this process exhaust gas generated by turbine T is input into the HRSG' inlet and passed (in exhaust flow direction sequence) past each of AIG1/SCR/AIG2/SCR2, and then sent out the outlet of HRSG'. Thus the exhaust flow from the turbine received in the HRSG is first subjected to an initial reducing reagent input as in one of the noted ammonia compounds, then the mix of NH3 and NOx within the exhaust flow E makes contact with the catalytic material associated with SCR1 (e.g., a multi (e.g., dual or triple) or single function SCR as described above); wherein selective catalytic reduction of the NOx occurs with the benefit of the selective ammonia (again, the chemistries associated with SCR reduction relative to NH3/NOx mixes in exhaust flows are, per se, well understood in the catalyst field and thus not repeated here).

Once exhaust flow E flows past SCR1, it receives a second dose of reducing reagent as in injected ammonia (see the discussion above relative to the real time controlling of reducing reagent input relative to each of AIG1 and AIG2 such as through use of the above described controller CN control of associated valving and/or pump output). Also, the flow is relative to AIG2 having the noted preferred relative spacing within length Ly described above. The exhaust flow exiting the AIG2 injection zone shown then travels to and through SCR2 where the emissions are further removed such that the T-H combination has ERS' directed at satisfying the aforementioned standards even for the above defined "larger" sized or high NOx output turbine generators (e.g., NOx removal of 96% (more preferably at or above 97%, 98%, or 99%) with at or less than 3 ppm (or at or less than 2 ppm) ammonia slip).

Controller CN, in addition to adjustments in relative AIG1 and AIG2 reagent supply splits (inclusive of real time adjustment in the relative split) can also help in maintaining desired flow through characteristics as in monitoring for NH3 slippage levels at the HRSG' output and making adjustments as in a lowering of AIG1 and/or AIG2 reagent input (preferably on a zone to zone basis in each), or monitoring for temperatures with appropriate positioned temperature sensors and making AIG1 and/or AIG2 supply adjustments based on those temperature or chemical characteristics sensed values at locations along the gas flow. For instance, CN can receive the aforementioned mix ratio values input based on one or more sensors as in a grid of sensors to ensure that the mal-distribution does not exceed the "looser" mal-distribution levels as in ensuring there is not an increase beyond, for instance, 15% mal-distribution value at the SCR1 inlet.

Exemplary embodiments of systems, methods, and apparatus are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

In the present disclosure it is also intended that value points are inclusive of all intermediate points (and all sub-ranges within a larger specified range) at a common index unit value—as in a range of 1 to 10 is inclusive of 2, 3, 4 . . . to 9 as well and available sub-ranges therein as in 3 to 5), or as in a range of 1.0 to 10.0 is inclusive of all intermediate points 1.1, 1.2, 1.3 . . . 9.9) (and all sub-ranges within a larger specified range as in 1.3 to 1.7).

The invention claimed is:

1. A combination (T-H combination) combustion turbine power generating apparatus and heat recovery steam generator (HRSG), comprising: a combustion turbine, the HRSG, and an emission reduction system (ERS), wherein the exhaust of the combustion turbine, that is travelling through the HRSG, is treated by the ERS, and wherein the ERS includes:
   a) a first reducing reagent supplier (RRI1) that supplies a reducing reagent into exhaust output by the turbine,
   b) a first SCR reactor (SCR1) positioned downstream of the RRI1,
   c) a turbulence generator (TG) receiving exhaust from the SCR1
   d) a second SCR reactor (SCR2) downstream of the turbulence generator; and wherein the first reducing reagent supplier (RRI1) is the only exhaust output SCR reducing reagent supplier to each of the SCR1 and SCR2,
   wherein there is a steady state NH3/NOx mal-distribution level above 10% RMS reaching each of SCR1 and SCR2, and
   further comprising a first generator driven by the combustion turbine as to provide a first turbine-generator combination, and wherein the first turbine-generator combination has a power rating of at least 400 megawatts.

2. The T-H combination of claim 1, wherein the turbine of the first turbine-generator combination is designed for operation with natural gas as its fuel supply.

3. The T-H combination of claim 1, wherein the ERS includes RRI1/SCR1/TG/SCR2 capable of reducing a flow of NOx at the inlet of the HRSG by at least 95% at the outlet of the HRSG with an introduced reducing reagent slippage of at or less than 5 ppm.

4. The T-H combination of claim 1, wherein the first turbine-generator combination has a power rating of 400 to 571 megawatts.

5. The T-H combination of claim 1, wherein the HRSG is oriented in a horizontal flow with the ERS occupying at or less than 24 feet of the HRSG linear length.

6. The T-H combination of claim 1, wherein the ERS has a static mixer as the turbulence generator between the SCR1 and SCR2.

7. The T-H combination of claim 1, wherein the ERS has an upstream to downstream exhaust flow sequence of RRI1/SCR1/TG/SCR2, with an ammonia injection grid as the RRI1, and with the ERS capable of reducing a flow of NOx at the inlet of the HRSG by at least 96% at the outlet of the HRSG with an ammonia slippage of at or less than 3 ppm.

8. The T-H combination of claim 1, wherein at least one of (or both of) SCR1 and SCR2 is (are) NH3-SCR catalyst(s) that comprises oxides of vanadium and titanium.

9. The T-H combination of claim 1, wherein at least one of (or both of) SCR1 and SCR2 has (have) a corrugated support body.

10. The T-H combination of claim 1, wherein at least one of (or both of) SCR1 and SCR2 is (are) a dual function SCR catalyst reactor(s) with a downstream zone comprising a PGM of palladium, or platinum, or palladium and platinum in combination with oxides of vanadium and oxides of titanium, with the oxides of vanadium and oxides of titanium also being present in an upstream zone free of PGM.

11. The T-H combination of claim 1, wherein SCR1 is a single function catalyst containing oxides of vanadium and oxides of titanium and no PGM, and SCR2 is a multi-functional SCR catalyst with a downstream zone comprising a PGM of palladium, or platinum, or palladium and platinum in combination with the oxides of vanadium and oxides of titanium, with the oxides of vanadium and oxides of titanium also being present in an upstream zone free of PGM.

12. The T-H combination of claim 1, featuring a catalyst with a monolithic no-PGM containing washcoat loading on SCR1 and with SCR2 being at least a dual zone washcoat loading with a no-PGM upstream zone and a PGM containing downstream zone.

13. The T-H combination of claim 1, wherein the SCR1 supports an integrated TG having an SM mounted on brackets to the SCR1 framing as to provide a common integrated combination SCR1-SM that can be mounted as an integrated unit or connected in place within the HRSG.

14. The T-H combination of claim 1, wherein the HRSG is free of an independent OC body and also free of an independent ASC body located between the inlet and outlet of the HRSG.

15. The T-H combination of claim 1, wherein the SCR1 is a single function catalyst and the SCR2 is a dual function SCR catalyst.

16. The T-H combination of claim 1, wherein the RRI1 is comprised of a plurality of lances extending into a containment space defined by the HRSG, with the RRI1 being one with 24 or less injection zones across the W×H area of the HRSG.

17. The T-H combination of claim 1, wherein the reducing agent supplied by the RIM is a liquid which is sprayed by the RRI1 into a region of the HRSG upstream of the SCR1.

18. A method of operating the T-H combination of claim 1, comprising: running the combustion turbine as to generate exhaust gas and passing the exhaust gas through the HRSG.

19. A turbine power generating apparatus and heat recovery steam generator combination (T-H combination), comprising:
   a combustion turbine that generates exhaust;
   an HRSG exhaust containment structure receiving the exhaust; and
   reduction means for reducing NOx content in the exhaust while avoiding ammonia slip, and wherein said reduction means includes, in exhaust flow sequence within the HRSG, a first AIG injection outlet, a first SCR reactor (SCR1), turbulence generating means, and a second SCR (SCR2), and with the first AIG injection outlet being the only turbine exhaust SCR reagent supplier to each of the SCR1 and SCR2,
   wherein there is a steady state NH3/NOx mal-distribution level above 10% RMS reaching each of SCR1 and SCR2, and
   further comprising a first generator driven by the turbine as to provide a first turbine-generator combination, and wherein the first turbine-generator combination has a power rating of at least 400 megawatts.

20. The combination of claim 19, wherein said HRSG is free from inlet to outlet of an independent body OC and independent body ASC directed at NOx or ammonia removal.

21. The combination of claim 19, wherein the turbulence generating means includes a static mixer.

22. The combination of claim 21, wherein the static mixer is positioned within the first quadrant of the length starting from the downstream end of the SCR1 to the upstream end of the SCR2.

23. The T-H combination of claim 19, wherein the first ammonia injector sprays a liquid into a region of the HRSG upstream of the SCR1.

24. An emission reduction system configured for use with a turbine power generating apparatus and heat recovery steam generator combination (T-H combination) and sized for receipt by an HRSG, the emission reduction system comprising an ammonia supply assembly and a catalyst reactor assembly, with the emission reduction system having in sequence, and relative to turbine exhaust flow through the HRSG, a first ammonia injector AIG1 as part of the ammonia supply assembly, a first SCR reactor, a turbulence generator (TG) which is a static mixer SM, and a second SCR reactor, and with the first ammonia injector being the only ammonia injector supplier to each of the SCR1 and SCR2,
   wherein there is a steady state NH3/NOx mal-distribution level above 10% RMS reaching each of SCR1 and SCR2, and
   further comprising a first generator driven by the turbine as to provide a first turbine-generator combination, and wherein the first turbine-generator combination has a power rating of at least 400 megawatts.

25. A method of assembling a T-H combination comprising positioning the emission reduction system of claim 24 within the HRSG.

* * * * *